US 6,714,979 B1

(12) United States Patent
Brandt et al.

(10) Patent No.: US 6,714,979 B1
(45) Date of Patent: Mar. 30, 2004

(54) DATA WAREHOUSING INFRASTRUCTURE FOR WEB BASED REPORTING TOOL

(75) Inventors: Andre R. Brandt, Colorado Springs, CO (US); Barbara Frueh, Colorado Springs, CO (US); Sajan J. Pillai, Colorado Springs, CO (US); Karl Rehder, Colorado Springs, CO (US); Donald J. Shearer, Colorado Springs, CO (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/159,402

(22) Filed: Sep. 24, 1998

Related U.S. Application Data

(60) Provisional application No. 60/060,655, filed on Sep. 26, 1997.

(51) Int. Cl.⁷ .............................................. G06F 15/173
(52) U.S. Cl. ........................ 709/225; 709/205; 709/217; 709/223; 709/227; 709/229; 707/3; 707/4; 707/9; 707/10
(58) Field of Search ................................ 709/205, 225, 709/227, 224, 219, 217, 228, 229, 223; 705/26, 18, 27, 51, 34; 713/155, 201, 152; 707/102, 523, 513, 2, 9, 3, 6, 10; 379/114.01, 114.02, 114.28, 114.29

(56) References Cited

U.S. PATENT DOCUMENTS

| | | | |
|---|---|---|---|
| 4,160,129 A | 7/1979 | Peyser et al. | 379/220.01 |
| 4,345,315 A | 8/1982 | Cadotte et al. | 705/10 |
| 4,817,050 A | 3/1989 | Komatsu et al. | 707/10 |
| 4,823,373 A | 4/1989 | Takahashi et al. | |
| 4,893,248 A | 1/1990 | Pitts et al. | 705/400 |
| 4,972,504 A | 11/1990 | Daniel, Jr. et al. | 705/10 |
| 5,041,972 A | 8/1991 | Frost | 705/10 |
| 5,075,771 A | 12/1991 | Hashimoto | 725/46 |

(List continued on next page.)

FOREIGN PATENT DOCUMENTS

| | | |
|---|---|---|
| EP | 0 809 387 A2 | 5/1997 |
| JP | 09064870 A | 3/1997 |
| WO | WO97/11443 | 3/1997 |
| WO | WO 97/16911 | 5/1997 |
| WO | WO 97/23988 | 7/1997 |
| WO | WO 98/19472 | 5/1998 |
| WO | WO 99/01826 | 1/1999 |
| WO | 00/11573 | 3/2000 |

OTHER PUBLICATIONS

Quadri et al., Hewlett–Packard and Cisco Systems, Internet Usage Platform White Paper.*

HP and Cisco Deliver Internet Usage Platform and Billing and Analysis Solutions, New Platform and Solutions Allow ISPs and Carriers to Offer Value–added Sevices.*

"HP Smart Internet, Transform User Data Into Revenue".*

HP Smart Internet Usage Analysis Solution, Transform User Data Into Competitive Advantage.*

HP/Cisco, Internet Usage Platform, Transforming Internet Services Into Revenue.*

(List continued on next page.)

Primary Examiner—David Wiley
Assistant Examiner—William C. Vaughn, Jr.

(57) ABSTRACT

A data warehousing infrastructure for telecommunications priced call detail data is integrated with a Web/Internet based reporting system providing a common GUI enabling the requesting, customizing, scheduling and viewing of various types of priced call detail data reports. Such an infrastructure performs an extraction process to obtain only those billing detail records of entitled customers, and a harvesting process for transforming the billing records into a star schema format for storage in one or more operational data storage devices. The system is integrated with a database server supporting expedient and accurate access to the customer's telecommunications priced call detail data for priced call detail data report generation.

37 Claims, 23 Drawing Sheets

U.S. PATENT DOCUMENTS

| | | | | |
|---|---|---|---|---|
| 5,131,020 A | | 7/1992 | Liebesny et al. | 455/422 |
| 5,136,707 A | * | 8/1992 | Block et al. | 707/201 |
| 5,223,699 A | * | 6/1993 | Flynn et al. | 235/280 |
| 5,228,076 A | | 7/1993 | Hopner et al. | 379/93.17 |
| 5,245,533 A | | 9/1993 | Marshall | 705/10 |
| 5,262,760 A | | 11/1993 | Iwamura et al. | 345/861 |
| 5,285,494 A | | 2/1994 | Sprecher et al. | 455/423 |
| 5,287,270 A | | 2/1994 | Hardy et al. | 705/34 |
| 5,313,598 A | | 5/1994 | Yamakawa | 707/1 |
| 5,315,093 A | | 5/1994 | Stewart | 235/381 |
| 5,325,290 A | | 6/1994 | Cauffman et al. | 705/34 |
| 5,327,486 A | | 7/1994 | Wolff et al. | 379/93.23 |
| 5,361,259 A | | 11/1994 | Hunt et al. | 370/402 |
| 5,369,571 A | | 11/1994 | Metts | 705/10 |
| 5,452,446 A | | 9/1995 | Johnson | 707/1 |
| 5,475,836 A | | 12/1995 | Harris et al. | |
| 5,481,542 A | | 1/1996 | Logston et al. | 725/131 |
| 5,483,596 A | | 1/1996 | Rosenow et al. | |
| 5,490,060 A | | 2/1996 | Malec et al. | 705/10 |
| 5,491,779 A | | 2/1996 | Bezjian | |
| 5,506,893 A | * | 4/1996 | Buscher et al. | 379/111 |
| 5,526,257 A | | 6/1996 | Lerner | 705/10 |
| 5,530,744 A | | 6/1996 | Charalambous et al. | |
| 5,533,108 A | | 7/1996 | Harris et al. | 379/211.02 |
| 5,537,611 A | | 7/1996 | Rajagopal et al. | 379/221.07 |
| 5,539,734 A | | 7/1996 | Burwell et al. | 370/410 |
| 5,548,726 A | | 8/1996 | Pettus | |
| 5,551,025 A | | 8/1996 | O'Reilly et al. | 707/104.1 |
| 5,555,290 A | * | 9/1996 | McLeod et al. | 379/88.25 |
| 5,563,805 A | | 10/1996 | Arbuckle et al. | 709/204 |
| 5,566,351 A | | 10/1996 | Crittenden et al. | 710/4 |
| 5,586,260 A | | 12/1996 | Hu | 713/201 |
| 5,602,918 A | | 2/1997 | Chen et al. | 713/153 |
| 5,610,915 A | | 3/1997 | Elliott et al. | 370/259 |
| 5,621,727 A | | 4/1997 | Vaudreuil | |
| 5,623,601 A | | 4/1997 | Vu | |
| 5,630,066 A | | 5/1997 | Gosling | 709/221 |
| 5,649,182 A | | 7/1997 | Reitz | |
| 5,650,994 A | | 7/1997 | Daley | 370/259 |
| 5,659,601 A | * | 8/1997 | Cheslog | 379/121 |
| 5,666,481 A | | 9/1997 | Lewis | 714/4 |
| 5,671,354 A | | 9/1997 | Ito et al. | |
| 5,689,645 A | | 11/1997 | Schettler et al. | |
| 5,692,030 A | | 11/1997 | Teglovic et al. | |
| 5,692,181 A | | 11/1997 | Anand et al. | 707/102 |
| 5,694,546 A | | 12/1997 | Reisman | 705/26 |
| 5,696,906 A | | 12/1997 | Peters et al. | 705/34 |
| 5,699,403 A | | 12/1997 | Ronnen | |
| 5,699,528 A | | 12/1997 | Hogan | 705/40 |
| 5,706,502 A | | 1/1998 | Foley et al. | |
| 5,708,780 A | | 1/1998 | Levergood et al. | |
| 5,710,882 A | | 1/1998 | Svennevik et al. | 709/227 |
| 5,721,908 A | | 2/1998 | Lagarde et al. | 707/10 |
| 5,721,913 A | | 2/1998 | Ackroff et al. | |
| 5,727,129 A | | 3/1998 | Barrett et al. | |
| 5,734,709 A | | 3/1998 | DeWitt et al. | |
| 5,734,831 A | | 3/1998 | Sanders | |
| 5,742,762 A | | 4/1998 | Scholl et al. | |
| 5,742,763 A | | 4/1998 | Jones | 709/317 |
| 5,742,768 A | | 4/1998 | Gennaro et al. | |
| 5,742,905 A | | 4/1998 | Pepe et al. | |
| 5,745,754 A | | 4/1998 | Lagarde et al. | |
| 5,754,830 A | | 5/1998 | Butts et al. | |
| 5,757,900 A | * | 5/1998 | Nagel et al. | 379/207 |
| 5,764,756 A | | 6/1998 | Onweller | |
| 5,768,501 A | | 6/1998 | Lewis | |
| 5,774,660 A | | 6/1998 | Brendel et al. | 709/201 |
| 5,778,178 A | | 7/1998 | Arunachalam | |
| 5,778,377 A | | 7/1998 | Marlin et al. | 707/103 |
| 5,781,550 A | | 7/1998 | Templin et al. | |
| 5,781,632 A | | 7/1998 | Odom | 705/78 |
| 5,787,160 A | | 7/1998 | Chaney et al. | |
| 5,787,412 A | | 7/1998 | Bosch et al. | 707/2 |
| 5,790,780 A | | 8/1998 | Brichta et al. | |
| 5,790,789 A | | 8/1998 | Suarez | |
| 5,790,797 A | | 8/1998 | Shimada et al. | 709/224 |
| 5,790,809 A | | 8/1998 | Holmes | 709/228 |
| 5,793,762 A | | 8/1998 | Penners et al. | |
| 5,793,964 A | | 8/1998 | Rogers et al. | |
| 5,796,393 A | | 8/1998 | MacNaughton et al. | |
| 5,799,154 A | | 8/1998 | Kuriyan | 709/223 |
| 5,802,320 A | | 9/1998 | Baehr et al. | |
| 5,805,803 A | | 9/1998 | Birrell et al. | |
| 5,812,533 A | | 9/1998 | Cox et al. | 370/259 |
| 5,812,654 A | | 9/1998 | Anderson et al. | |
| 5,812,750 A | | 9/1998 | Dev et al. | 714/4 |
| 5,815,080 A | | 9/1998 | Taguchi | |
| 5,815,665 A | | 9/1998 | Teper et al. | |
| 5,819,225 A | | 10/1998 | Eastwood et al. | |
| 5,819,271 A | | 10/1998 | Mahoney et al. | |
| 5,825,769 A | | 10/1998 | O'Reilly et al. | 370/360 |
| 5,825,890 A | | 10/1998 | Elgamal et al. | 713/151 |
| 5,826,029 A | | 10/1998 | Gore, Jr. et al. | |
| 5,826,269 A | | 10/1998 | Hussey | |
| 5,832,519 A | * | 11/1998 | Bowen et al. | 707/201 |
| 5,835,084 A | | 11/1998 | Bailey et al. | |
| 5,844,896 A | | 12/1998 | Marks et al. | |
| 5,845,067 A | | 12/1998 | Porter et al. | |
| 5,845,267 A | | 12/1998 | Ronen | |
| 5,848,233 A | | 12/1998 | Radia et al. | 713/201 |
| 5,848,396 A | | 12/1998 | Gerace | 705/10 |
| 5,848,399 A | | 12/1998 | Burke | 705/27 |
| 5,850,517 A | | 12/1998 | Verkler et al. | |
| 5,852,810 A | | 12/1998 | Sotiroff et al. | |
| 5,852,812 A | | 12/1998 | Reeder | |
| 5,862,325 A | | 1/1999 | Reed et al. | 709/201 |
| 5,867,495 A | | 2/1999 | Elliott et al. | 370/352 |
| 5,870,558 A | | 2/1999 | Branton, Jr. et al. | 709/224 |
| 5,875,236 A | * | 2/1999 | Jankowitz et al. | 379/114 |
| 5,877,759 A | | 3/1999 | Bauer | 709/317 |
| 5,881,237 A | | 3/1999 | Schwaller et al. | 709/224 |
| 5,883,948 A | * | 3/1999 | Dunn | 379/14 |
| 5,884,032 A | | 3/1999 | Bateman et al. | 709/204 |
| 5,884,312 A | | 3/1999 | Dustan et al. | 707/10 |
| 5,892,900 A | | 4/1999 | Ginter et al. | 713/200 |
| 5,907,681 A | | 5/1999 | Bates et al. | 709/228 |
| 5,909,679 A | | 6/1999 | Hall | 707/4 |
| 5,909,682 A | | 6/1999 | Cowan et al. | 707/9 |
| 5,915,001 A | | 6/1999 | Uppaluru | 379/88.22 |
| 5,920,542 A | | 7/1999 | Henderson | 370/217 |
| 5,923,016 A | * | 7/1999 | Fredregill et al. | 235/380 |
| 5,930,764 A | | 7/1999 | Melchione et al. | 705/10 |
| 5,930,804 A | | 7/1999 | Yu et al. | 707/104.1 |
| 5,933,142 A | | 8/1999 | LaStrange et al. | 345/788 |
| 5,937,165 A | | 8/1999 | Schwaller et al. | 709/224 |
| 5,938,729 A | | 8/1999 | Cote et al. | 709/224 |
| 5,949,976 A | | 9/1999 | Chappelle | 709/224 |
| 5,953,389 A | * | 9/1999 | Pruett et al. | 370/9 |
| 5,956,714 A | * | 9/1999 | Condon | 707/201 |
| 5,958,016 A | * | 9/1999 | Chang et al. | 709/202 |
| 5,960,411 A | | 9/1999 | Hartman et al. | 705/26 |
| 5,961,602 A | | 10/1999 | Thompson et al. | 709/229 |
| 5,963,925 A | | 10/1999 | Kolling et al. | 705/40 |
| 5,966,695 A | * | 10/1999 | Melchione et al. | 705/10 |
| 5,970,467 A | | 10/1999 | Alavi | 705/10 |
| 5,974,396 A | | 10/1999 | Anderson et al. | 705/10 |
| 5,974,441 A | | 10/1999 | Rogers et al. | 709/200 |
| 5,982,864 A | | 11/1999 | Jagadish et al. | 379/120 |
| 5,982,891 A | * | 11/1999 | Ginter et al. | 380/4 |
| 5,983,350 A | | 11/1999 | Minear et al. | 713/201 |
| 5,991,733 A | * | 11/1999 | Aleia et al. | 705/8 |

| | | | |
|---|---|---|---|
| 5,991,746 A * | 11/1999 | Wang | 705/40 |
| 5,991,806 A | 11/1999 | McHann, Jr. | 709/224 |
| 5,999,525 A | 12/1999 | Krishnaswamy et al. | 370/352 |
| 5,999,965 A | 12/1999 | Kelly | 709/202 |
| 5,999,972 A | 12/1999 | Gish | 709/219 |
| 5,999,973 A | 12/1999 | Glitho et al. | 709/223 |
| 6,003,079 A | 12/1999 | Friedrich et al. | 709/224 |
| 6,006,265 A | 12/1999 | Rangan et al. | 709/226 |
| 6,011,844 A | 1/2000 | Uppaluru et al. | 379/220.01 |
| 6,012,090 A | 1/2000 | Chung et al. | 709/219 |
| 6,014,647 A | 1/2000 | Nizzari et al. | 705/39 |
| 6,014,702 A | 1/2000 | King et al. | 709/227 |
| 6,018,768 A | 1/2000 | Ullman et al. | 709/218 |
| 6,021,409 A | 2/2000 | Burrows | 707/102 |
| 6,023,762 A | 2/2000 | Dean et al. | 713/193 |
| 6,029,182 A | 2/2000 | Nehab et al. | 707/523 |
| 6,031,904 A | 2/2000 | An et al. | 379/201.02 |
| 6,032,132 A | 2/2000 | Nelson | 705/34 |
| 6,032,184 A | 2/2000 | Cogger et al. | 709/223 |
| 6,041,325 A | 3/2000 | Shah et al. | 707/10 |
| 6,041,357 A | 3/2000 | Kunzelman et al. | 709/228 |
| 6,044,144 A | 3/2000 | Becker et al. | 379/265.02 |
| 6,044,362 A | 3/2000 | Neely | 705/34 |
| 6,049,602 A | 4/2000 | Foladare et al. | 379/265.04 |
| 6,049,786 A | 4/2000 | Smorodinsky | 705/59 |
| 6,052,450 A * | 4/2000 | Allison et al. | 379/127 |
| 6,058,170 A | 5/2000 | Jagadish et al. | 379/119 |
| 6,058,381 A | 5/2000 | Nelson | 705/40 |
| 6,064,667 A | 5/2000 | Gisby et al. | 370/352 |
| 6,065,002 A | 5/2000 | Knotts et al. | 707/4 |
| 6,065,059 A | 5/2000 | Shieh et al. | 709/233 |
| 6,072,493 A | 6/2000 | Driskell et al. | 345/854 |
| 6,073,105 A | 6/2000 | Sutcliffe et al. | 705/1 |
| 6,073,122 A | 6/2000 | Wool | 705/51 |
| 6,073,241 A | 6/2000 | Rosenberg et al. | 713/201 |
| 6,078,891 A | 6/2000 | Riordan et al. | 705/10 |
| 6,078,924 A | 6/2000 | Ainsbury et al. | 707/101 |
| 6,084,953 A | 7/2000 | Bardenheuer et al. | 379/114.01 |
| 6,085,171 A | 7/2000 | Leonard | 705/26 |
| 6,085,190 A | 7/2000 | Sakata | 707/6 |
| 6,088,451 A | 7/2000 | He et al. | 380/255 |
| 6,088,796 A | 7/2000 | Cianfrocca et al. | 713/152 |
| 6,091,808 A | 7/2000 | Wood et al. | 379/201.04 |
| 6,094,655 A * | 7/2000 | Rogers et al. | 707/10 |
| 6,104,704 A | 8/2000 | Buhler et al. | 370/252 |
| 6,105,131 A | 8/2000 | Carroll | 713/155 |
| 6,108,700 A | 8/2000 | Maccobee et al. | 709/224 |
| 6,108,782 A | 8/2000 | Fletcher et al. | 713/153 |
| 6,112,238 A | 8/2000 | Boyd et al. | 709/224 |
| 6,112,242 A | 8/2000 | Jois et al. | 709/225 |
| 6,115,040 A * | 9/2000 | Bladow et al. | 345/335 |
| 6,115,458 A | 9/2000 | Taskett | 379/114.2 |
| 6,115,693 A | 9/2000 | McDonough et al. | 705/10 |
| 6,115,737 A | 9/2000 | Ely et al. | 709/203 |
| 6,119,109 A | 9/2000 | Muratani et al. | 705/400 |
| 6,122,258 A | 9/2000 | Brown | 370/256 |
| 6,128,624 A | 10/2000 | Papierniak et al. | 707/104.1 |
| 6,130,933 A | 10/2000 | Miloslavsky | 379/90.01 |
| 6,131,095 A | 10/2000 | Low et al. | 707/10 |
| 6,131,116 A | 10/2000 | Riggins et al. | 709/219 |
| 6,134,584 A | 10/2000 | Chang et al. | 709/219 |
| 6,137,869 A | 10/2000 | Voit et al. | 379/114.01 |
| 6,145,001 A | 11/2000 | Scholl et al. | 709/223 |
| 6,154,744 A | 11/2000 | Kenner et al. | 707/10 |
| 6,161,102 A | 12/2000 | Yanagihara et al. | 707/3 |
| 6,161,126 A | 12/2000 | Wies et al. | 709/203 |
| 6,161,128 A | 12/2000 | Smyk | 709/205 |
| 6,163,597 A | 12/2000 | Voit | |
| 6,173,311 B1 | 1/2001 | Hassett et al. | 709/209 |
| 6,205,456 B1 | 3/2001 | Nakao | 707/531 |
| 6,212,506 B1 | 4/2001 | Shah et al. | 705/418 |
| 6,212,558 B1 | 4/2001 | Antur et al. | 709/221 |
| 6,240,450 B1 | 5/2001 | Sharples et al. | 709/224 |
| 6,182,113 B1 | 6/2001 | Peterson et al. | |
| 6,253,239 B1 | 6/2001 | Shklar et al. | 709/217 |
| 6,275,490 B1 | 8/2001 | Mattaway et al. | 370/352 |
| 6,286,050 B1 | 9/2001 | Pullen et al. | 709/229 |
| 6,292,481 B1 * | 9/2001 | Voit et al. | 370/352 |
| 6,295,551 B1 | 9/2001 | Roberts et al. | 709/205 |
| 6,337,858 B1 | 1/2002 | Petty et al. | |
| 6,377,993 B1 | 4/2002 | Brandt et al. | 709/227 |
| 2001/0003828 A1 | 1/2001 | Narayanaswami | |
| 2001/0001014 A1 | 5/2001 | Atkins, III et al. | 380/239 |

OTHER PUBLICATIONS

Release Note for Netflow FlowCollector Release 2.0, Copyright Jul. 1998 and Release Notes for Netflow FlowAnalyzer Release 1.0, Copyright Sep. 1997.*

HP Invent, Capturing the Usage Biling Advantage.*

Kenney, Kathleen, "American Management Systems Launces Internet–Based Customer Care and Billing Tool for Telecom Firms", PR Newswire, New York, Oct. 9, 1996, extracted from http://proquest.umi.com on internet Feb. 28, 2002.

Morgan, Rick, "When Used Right, Internet can be Effective Marketing Tool", Madison Capital Times, Madison, WI, Nov. 8, 1996, extracted from http://proquest.umi.com on internet on Feb. 28, 2002.

Edwards, Morris, "The Electronic Commerce Juggernaut", Communication News, Nokomis, Sep. 1997, vol. 34, Issue 9, extracted from http://proquest.umi.com on Internet on Feb. 28, 2002.

"Cryptography and the Internet", www.echonyc.com/~ysue/crypt.html, 1995.

Lee et al., "Supporting Multi–User, Multi–Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

"Cryptography and the Internet", www.echonyc.com/~ysue/crypt.html, 1995.

Lee et al., "Supporting Multi–User, Multi–Applet Workspaces in CBE", Computer Supported Cooperative Work 1996, Cambridge, MA.

"Netscape 2.0 Beta Hip or Hype?", www.plant.net.au/innovations/20beta.html, Planet Internet, 1995.

*Computer Networks*, Andrew S. Tanenbaum, pp. 410–412.

"XIIR6.3 (Broadway) Overview", http://www.x.org/broadway.htm.

"Stac Unveils Windows NT 4.0 and Web Browser Support in New ReachOut 7" http://www.stac.com/news/pressrel/pr_ro7_unveil.html.

Biggs, M., "Help for the Web enhances customer support, reduces help desk load" *Inforworld*, Jun. 16, 1997, v. 19, No. 24, pp. 82+.

Burch, B., "AT&T, MCI to release new management tools", *Network World*, Jan. 17, 1994, p. 19.

Low, C., "Integrating Communication Services", *IEEE Communication Magazine*, Jun. 1997, pp. 164–169.

"McAfee's New 'Self–Service' Help Desk Web Suite Makes PCs Help Desk–Ready", Newswire Association Inc., Oct. 13, 1997.

Niemeyer, R., "Using Web Technologies in Two MLS Environments: A Security Analysis." *IEEE*, pp. 205–214, 1997.

Porter, T., "MCI offers tracking system: Direct Dispatch lets users eye problems remotely", *Service News*, Apr. 1994, p. 17.

Shklar, L., et al., "MetaMagic: Generating Virtual Web Sites Through Data Modeling," http://www.scope.gmd.de/info/www6/posters/714/poster714.html.

Vizard, M. et al., "MCI to Pilot Convergence Billing Service", *InfoWorld*, v. 18, Issue 37, Sep. 9, 1996.

Yager, T., "Mixed Messages", *UNIX Review*, v. 16, n. 2, p. 29, Feb. 1998.

"Carriers Improve Net Management Services", *Communications Week*, May 2, 1994, p. 74.

"Network management; new software platform enhances network management capabilities; MCI ServiceView offers greater cost savings, increased flexibility ", Product Announcement, *Edge*, Oct. 2, 1995, on & about AT&T, v. 10, n. 375, p. 11(1).

"New software platform enhances network management capabilities . . . ", *Business Wire*, Sep. 28, 1995 p. 9281122.

"User's Guide: Microsoft Access", Microsoft Corporation, 1994, pp. 378,594,599, 630–632 (13).

Jainschigg, J., "Billing confirmed: this easy–to–use box turns guest calls into revenue." *Teleconnect*, vol. 12, No. 9, p. 39(4).

Chapman, D. Brent et al., "Building Internet Firewalls", Nov. 1995, O'Reilly & Associates, p. 58.

He, Taniguchi, "Internet Traffic Control and Management Architecture", IEEE, Oct. 22–24, 1998, pp. s46–03–1–s46–03–5.

Sixth International Conference on Network Protocols, IEEE, Technical Communication Services, Oct. 13–16, 1998, Table of Contents.

Markovich, Robert, "WAN Service Level Management Could Keep Your Feet Out of the Fire, Ensure Carriers Dilligence", Network World, Jul. 7, 1997.

Meteorology; Databases, "Inforonics offers controlled access to Web Meteorology", Information Today, Apr. 1997, vol. 14 Issue 4, p53, 2p. This article reports that Inforonics has developed a controlled access gateway to MGA (Meteorological and Geoastrophysica).

Rosen,Michele,"BPCS steps into new millennium", Midrange Systems; Spring House; May 10, 1996. This article informs about the new release of BPCS Client/Server Software as the most extensive upgrade of the product since 1980s. It incorporates onject tech.

Anonymous, "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro–Tel's Microcall for Windows 95/NT", Teleconnect, vol. 15, No. 12, p. 35, Dec. 1997.

Help–Desk Market Seeks Suite Success, Computer Reseller News, Jan. 5, 1998, p. 49.

* cited by examiner

DATA WAREHOUSING INFRASTRUCTURE FOR WEB BASED REPORTING TOOL

CROSS-REFERENCE TO RELATED APPLICATIONS

The following patent application is based on and claims the benefit of U.S. Provisional Patent Application Serial No. 60/060,655, filed Sep. 26, 1997. This application is also related to the following applications which were all filed on Sep. 24, 1998. The related applications are U.S. application Ser. No. 09/159,695 (allowed); U.S. application Ser. No. 09/159,515 (issued Sep. 5, 2000 as U.S. Pat. No. 6,115,040); U.S. application Ser. No. 09/159,512; U.S. application Ser. No. 09/159,408; U.S. application Ser. No. 09/159,514; U.S. application Ser. No. 09/159,684; U.S. application Ser. No. 09/159,516; and U.S. application Ser. No. 09/159,409.

FIELD OF THE INVENTION

The present invention relates generally to information delivery systems and, particularly, to a novel, World Wide Web/Internet-based, telecommunications network data management reporting and presentation service for customers of telecommunications service entities.

BACKGROUND OF THE INVENTION

Telecommunications service entities, e.g., MCI, AT&T, Sprint, and the like, presently provide for the presentation and dissemination of customer account and network data management information to their customers predominantly by enabling customers (clients) to directly dial-up, e.g., via a modem, to the entity's application servers to access their account information, or, alternately, via dedicated communication lines, e.g., ISDN, T-1, etc., enabling account information requests to be initiated through their computer terminal running, for example, a Windows®-based graphical user interface. The requests are processed by the entity's application servers, which retrieves the requested customer information, e.g., from one or more databases, processes and formats the information for downloading to the client's computer terminal.

Some types of data, e.g., "priced" call detail data pertaining to a customer's telecommunications number usage, is made available for customers in an aggregated or processed form and provided to customers, e.g., on a monthly basis. This type of data is analyzed to determine, for example, asset usage and trend information necessary, which is required for network managers to make critical business decisions. As an example, the assignee telecommunications carrier MCI Corporation provides an MCI ServiceView ("MSV") product line for its business customers which includes several client-server based data management applications. One of these applications, referred to as "Perspective," provides call usage and analysis information that focuses on the presentation of and priced call detail data and reports from an MCI Perspective Host Server ("PHost"). Another client-server based data management application, referred to as "Traffic View," focuses on the presentation of real time call detail data and network traffic analysis/monitor information as provided from an MCI Traffic view server. Particularly, with respect to MCI's Perspective system, customers are provided with their monthly priced and discounted raw call detail data, call detail aggregates, and statistical historical summary data. As such, the Perspective architecture is organized primarily as a batch midrange-based server data delivery mechanism with the data being typically delivered on a monthly basis, allowing for "delayed" trending, call pattern analysis, repricing and invoice validation based on the customer's call detail data. The trending, analysis, and repricing functionality is maintained in workstation-based software provided to customers for installation at customer sites on their PCS.

FIG. 1 illustrates the current architecture 10 for Perspective and Traffic View Systems which presently run on separate environments and are maintained independently of each other. The StarPR server provides a batch reporting mechanism focused primarily on providing billing data to 1-800/8xx, VNET, Vision, and other MCI customers and is used by MCI customers predominantly to do internal charge backs and to analyze billing usage. Alternately, or in addition, the customers use the data provided to them to do call traffic analysis, similar to TVS.

With specific reference to FIG. 1, the data collected is in the form of call detail records which are created by various MCI/Concert switches (not shown) whenever a telephone call is attempted in the MCI network and which includes information about call type, call origination and termination locations, date and time, added intelligent network services, any hop information, product type and other relevant information about the call. The Network Information Concentrator ("NIC") component 15 is a network element that collects the CDRs and sends them to appropriate locations via a Global Statistical Engine 17. The Global Statistical Engine 17 collects the CDRs and transforms, processes, and sends them to the TVS 20. The TVS provides access to this data through various statistical reports and real time monitoring engine 22 ("RTM").

The CDRs are also sent to the billing system which applied billing based on call detail values. These "priced" CDRs are known as Billing Detail Records ("BDRs") and are sent to a Perspective Host("Phost") server 25. The Phost server 25 filters out the BDRs not pertaining to the "Perspective" customers, applies various transformations to the customer's raw call detail data to generate summary data, and generates and formats the data for the various Perspective customers. This data is then compressed, sent to a document service center ("DSC") and CD-ROM dispatcher ("CDD") 34 entities which respectively, uncompresses the data and burns CD-ROMs comprising the customer's raw call detail data and summary data, in addition to reference files and possibly application software (if not previously owned) enabling customers to perform analysis and trending of their Perspective data. These CD-ROMs are sent to the customers, usually on a billing cycle or monthly basis, who view their data through a Perspective workstation-based software application residing on that customer's CPE, e.g., PC or workstation 36.

As shown in FIG. 1, the existing Perspective Host 25 mainframe-based data delivery system interfaces with all Perspective upstream feed systems, including billing systems and order entry, and processes the data, e.g., creates canned aggregates, for delivery to the document service center.

The following upstream feed systems include: 1) order entry information from a customer order entry system 19 ("CORE") and which information is used by the Perspective Host to determine what customer data to process and where to send it; 2) VNET and Vision monthly billing data feeds from a commercial billing system ("NBCS") system 23; 3) a Tollfree monthly billing data feed from a T/F database feed 27; and, a Concert Virtual Network Services ("CVNS") product feed from a CVNS database 31. In order for all the CDR and data feed information to be processed by the Phost server 25, various reference files and processing rules are provided including: alphanumeric translation reference files from the NCBS billing system 23 and an NPA/NXX-state-city and country code lookup reference file originating from a calling area data base ("CADB") 35.

While effective for its purpose, the current data management and data storage legacy platform infrastructure only provides customers with their priced call detail data on a monthly basis, usually in the form of a canned report. This is not sufficient for an increasing number of customers who, to remain competitive, are required to have updated daily access to their data to enable them to make their critical business decisions quicker. Moreover, these legacy platforms including reporting data are reaching the architectural limits of scalability in terms of the total customers they can support, total online data they can present, total historical data they can keep and type and number of applications they can support.

Thus, a data warehousing approach that would support the daily processing and storage of customer's priced call detail data in a form suitable for expedient access and presentation as a report for customers over the World Wide Web/Internet would be highly desirable.

SUMMARY OF THE INVENTION

The present invention is a telecommunications data management/system architecture integrated with a novel Web/Internet based reporting system. Referred to as networkMCI Interact ("nMCI Interact"), the data management/system architecture implements a data warehouse approach to maintaining data obtained from upstream billing systems, i.e., priced call detail data, and which data may be made readily available for reporting on a daily basis. In this approach, priced call detail data is maintained in data marts, i.e., operational data stores, capable of meeting real-time processing and storage requirements. Particularly, these data marts may be partitioned based on various criteria, e.g., customer id, to enable easier management of data by providing scalability, and enabling more control of over hardware and software resources, in a cost-effective way. Additionally, this data mart approach may implement a back-end server component that receives data access requests from various users in the form of a report request, interactive data analysis request or data mining request. This server routes the query to the appropriate data marts, data warehouse or operational data store and responds to the requestor with the result set.

The nMCI Interact Reporting system and data warehousing infrastructure is a layer functioning to enable customers to request reporting functionality across the Web/Internet. This report request functionality includes routing requests to appropriate data marts, e.g., real-time reporting requests may be satisfied by real-time database. Additionally, the interface provides customers with the ability to schedule and prioritize reports, format report request result sets, and provides for load balancing, report request validation, query generation and execution. Through a common GUI, customers are enabled to access their own billing call detail data.

In accordance with the principles of the invention, there is provided a Web/Internet based reporting system for providing timely delivery of a customer's priced telecommunications call detail data to a client workstation running a web browser application, the system comprising: a data warehousing infrastructure including: a process for generating a current customer list on a daily basis comprising customers entitled to receive daily telecommunications call detail data; a device for receiving customer's raw telecommunications call detail data records from one or more telecommunications network switch mechanisms, and extracting certain call detail records for predetermined customers; a harvest device for receiving the extracted call detail data records and replacing a call detail data item therein with a corresponding dimension key found in an associated dimension build table for that call detail item; and, a device for generating an output fact table comprising customer records having the unique key structures for enabling consolidated storage of specific customer call detail data; at least one secure server for managing client sessions over the Internet, the secure server supporting secure communication of customer request messages between the browser application client and the secure server; and, a device for receiving the customer requests from the secure server and generating corresponding database queries implementing the dimension keys for application against the output fact table to obtain a specific call customer's call detail data, the accessed call detail data being transmitted back to the client web browser via the secure server; whereby expedient and updated web/Internet-based access to the customer's daily call detail data is assured.

Advantageously, the data warehousing infrastructure for the Web/Internet based reporting system provides incremental, daily updates to data and allows users to report on either daily or monthly data. BDR's may be processed and loaded into data marts on a daily basis. On a monthly basis this daily data is replaced with records produced in the monthly billing run, after an audit approval. The goal of this replace operation is to replace daily priced records with the actual records used to compute monthly billing. This is necessary because a large percentage of the daily records, priced on a daily basis at tariff, may be repriced based on monthly discounts. Additionally, monthly data may also be updated based on audit anomalies. The monthly replace operation thus ensures the accuracy of the data used by customers.

Furthermore, the data management system permits use of existing hardware while allowing future growth to utilize new equipment at less cost and further, allows for incremental expansion as applications and database capacities grow.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, filed Sep. 24, 1998 (D#11038), the nMCI Interact system architecture is basically organized as a set of common components comprising the following:

1) an object-oriented software architecture detailing the client and server based aspect of nMCI Interact;

2) a network architecture defining the physical network needed to satisfy the security and data volume requirements of the networkMCI System;

3) a data architecture detailing the application, back-end or legacy data sources available for networkMCI Interact; and 4) an infrastructure covering security, order entry, fulfillment, billing, self-monitoring, metrics and support.

Each of these common component areas will be generally discussed hereinbelow. A detailed description of each of these components can be found in a related, co-pending U.S. patent application Ser. No. 09/159,695, filed Sep. 24, 1998 entitled INTEGRATED CUSTOMER INTERFACE SYSTEM FOR COMMUNICATIONS NETWORK MANAGEMENT, the disclosure of which is incorporated herein by reference thereto.

Figure 1:
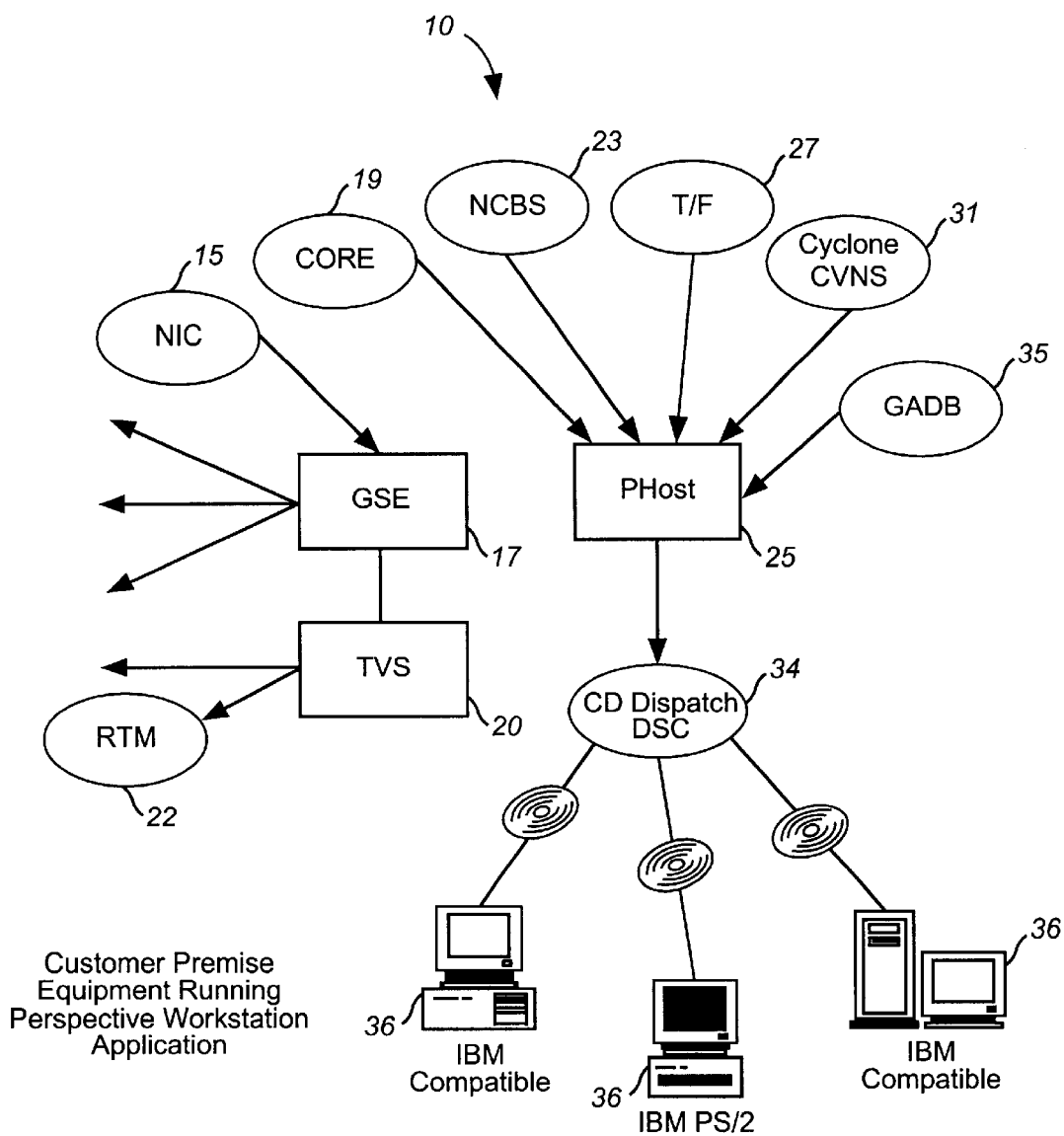
FIG. 1 illustrates conceptually an existing mainframe-based data delivery system 10 providing customer's call detail data.
Figure 2:
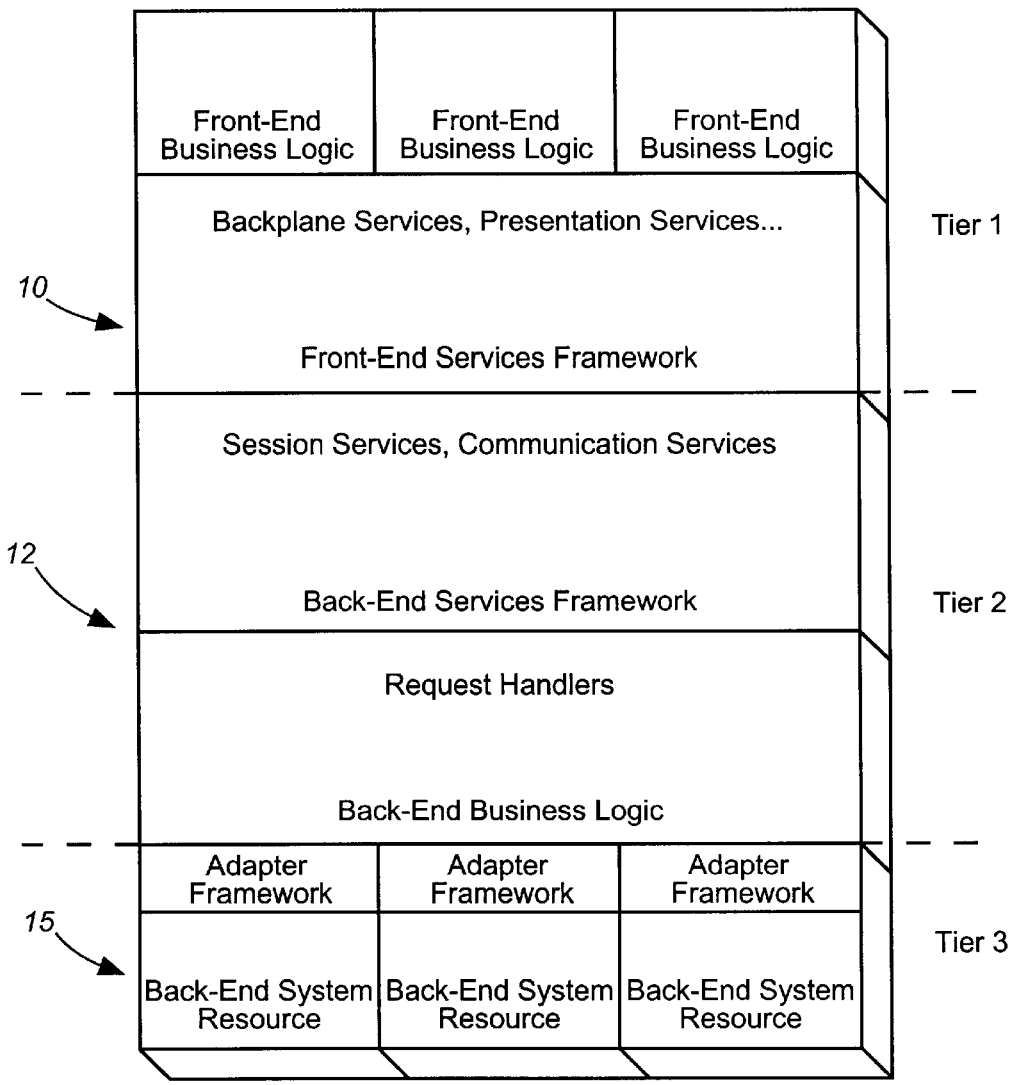
FIG. 2 illustrates the software architecture component comprising a three-tiered structure.

FIG. 2 is a diagrammatic illustration of the software architecture component in which the present invention functions. A first or client tier 40 of software services are resident on a customer work station and provides customer access to the enterprise system, having one or more downloadable application objects directed to front end business logic, one or more backplane service objects for managing sessions, one or more presentation services objects for the presentation of customer options and customer requested data in a browser recognizable format and a customer supplied browser for presentation of customer options and data to the customer and for Internet communications over the public Internet. Additionally applications are directed to front end services such as the presentation of data in the form of tables and charts, and data processing functions such as sorting and summarizing in a manner such that multiple programs are combined in a unified application suite. A second or middle tier 42, is provided having secure web servers and back end services to provide applications that establish user sessions, govern user authentication and their entitlements, and communicate with adaptor programs to simplify the interchange of data across the network.

A third or back end tier 45 having applications directed to legacy back end services including database storage and retrieval systems and one or more database servers for accessing system resources from one or more legacy hosts.

Generally, as explained in commonly owned, co-pending U.S. patent application Ser. No. 09/159,515, filed Sep. 24, 1998 (issued as U.S. Pat. No. 6,115,040 on Sep. 5, 2000), entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the clienttier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or Call Manager functions. The system is capable of delivering to customers the functionality appropriate to their product mix.

Figure 3:
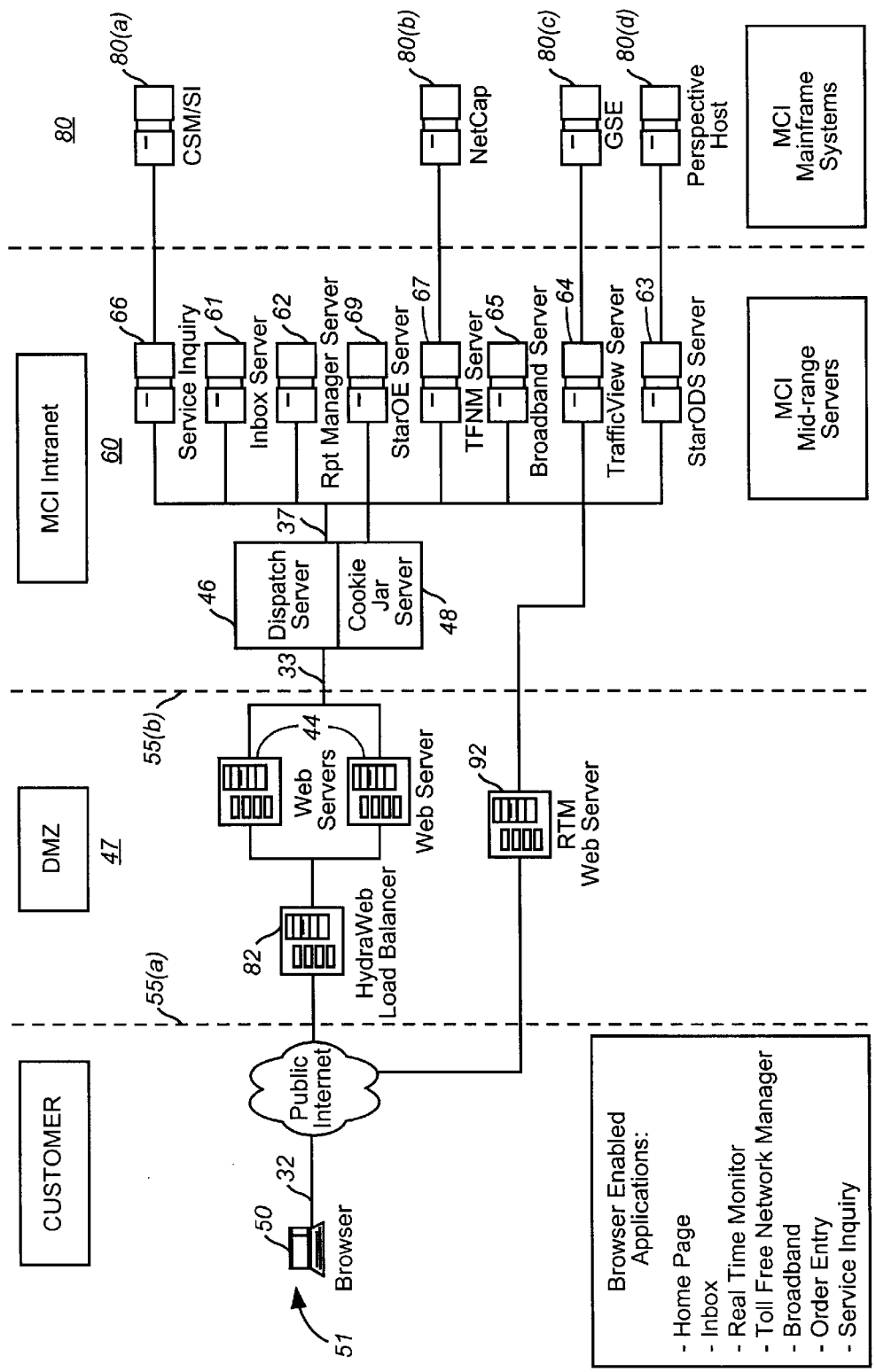
FIG. 3 is a diagrammatic overview of the software architecture of the networkMCI Interact system.

FIG. 3 is a diagrammatic overview of the software architecture of the networkMCI Interact system including: the Customer Browser (a.k.a. the Client) 50; the Demilitarized Zone (DMZ) 47 comprising a Web Servers cluster 44; the MCI Intranet Dispatcher Server 46; and the MCI Intranet Application servers 60, and the data warehouses, legacy systems, etc. 80.

A customer workstation 51 employs a Web Browser 50 implementing client applications responsible for presentation and front-end services. Its functions include providing a user interface to various MCI services and supporting communications with MCI's Intranet web server cluster 44. As illustrated in FIG. 3, and more specifically described in the above-mentioned, co-pending U.S. patent application Ser. No. 09/159,515, filed Sep. 24, 1998 (issued as U.S. Pat. No. 6,115,040 on Sep. 5, 2000) entitled GRAPHICAL USER INTERFACE FOR WEB ENABLED APPLICATIONS, the client tier software is responsible for presentation services to the customer and generally includes a web browser 50 and additional object-oriented programs residing in the client workstation platform 51. The client software is generally organized into a component architecture with each component generally comprising a specific application, providing an area of functionality. The applications generally are integrated using a "backplane" services layer 52 which provides a set of services to the application objects which provide the front end business logic and manages their launch. The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

Figure 4:
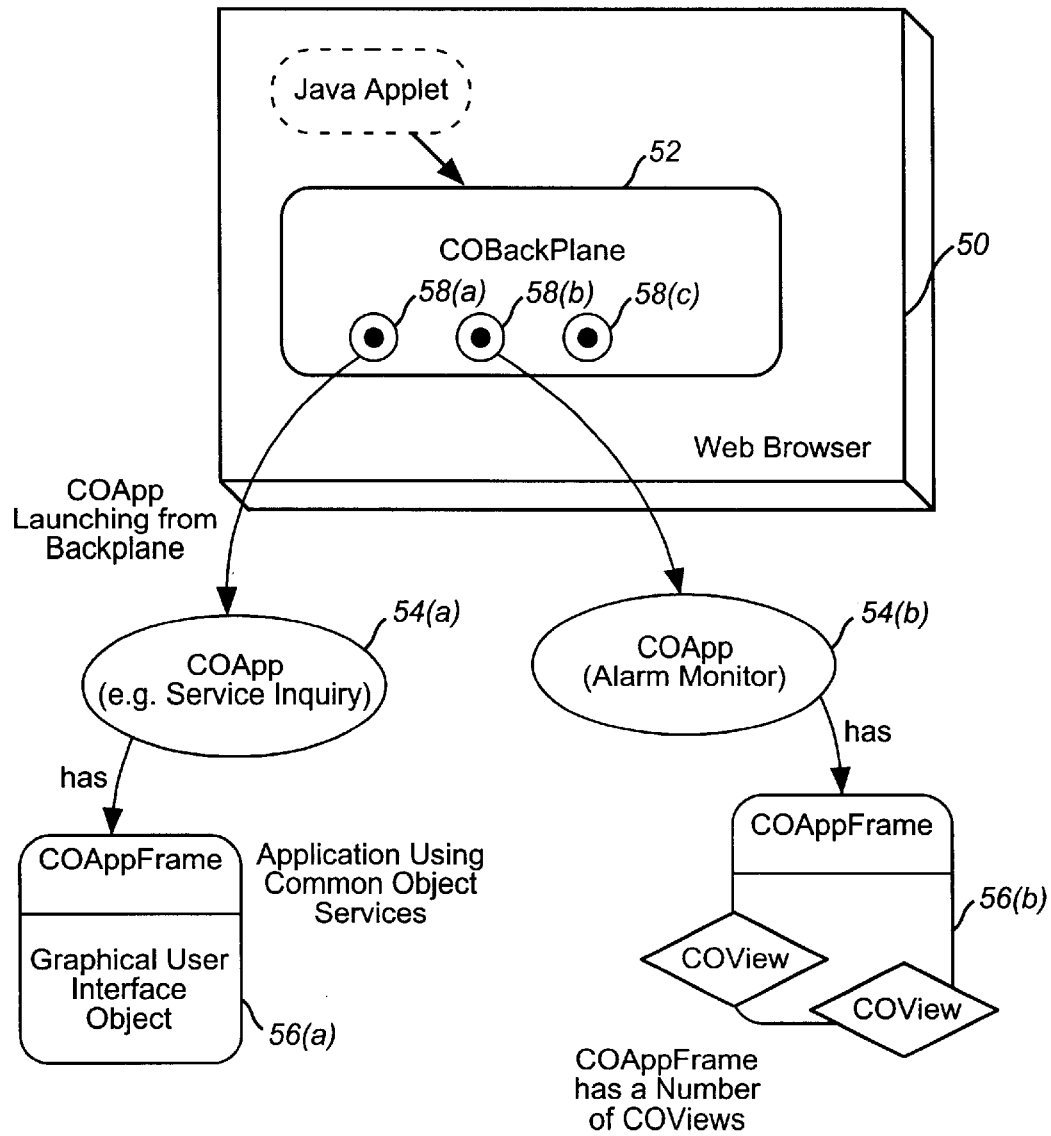
FIG. 4 is an illustrative example of a backplane architecture schematic.

FIG. 4 is a diagrammatic example of a backplane architecture scheme illustrating the relationship among the common objects. In this example, the backplane services layer 52 is programmed as a Java applet which can be loaded and launched by the web browser 50. With reference to FIG. 4, a typical user session starts with a web browser 50 creating a backplane 52, after a successful logon. The backplane 52, inter alia, presents a user with an interface for networkMCI Interact application management. A typical user display provided by the backplane 52 may show a number of applications the user is entitled to run, each application represented by buttons depicted in FIG. 4 as buttons 58a,b,c selectable by the user. As illustrated in FIG. 4, upon selection of an application, the backplane 52 launches that specific application, for example, Service Inquiry 54a or Alarm Monitor 54b, by creating the application object. In processing its functions, each application in turn, may utilize common object services provided by the backplane 52. FIG. 4 shows graphical user interface objects 56a,b created and used by a respective application 54a,b for its own presentation purposes.

Figure 5:
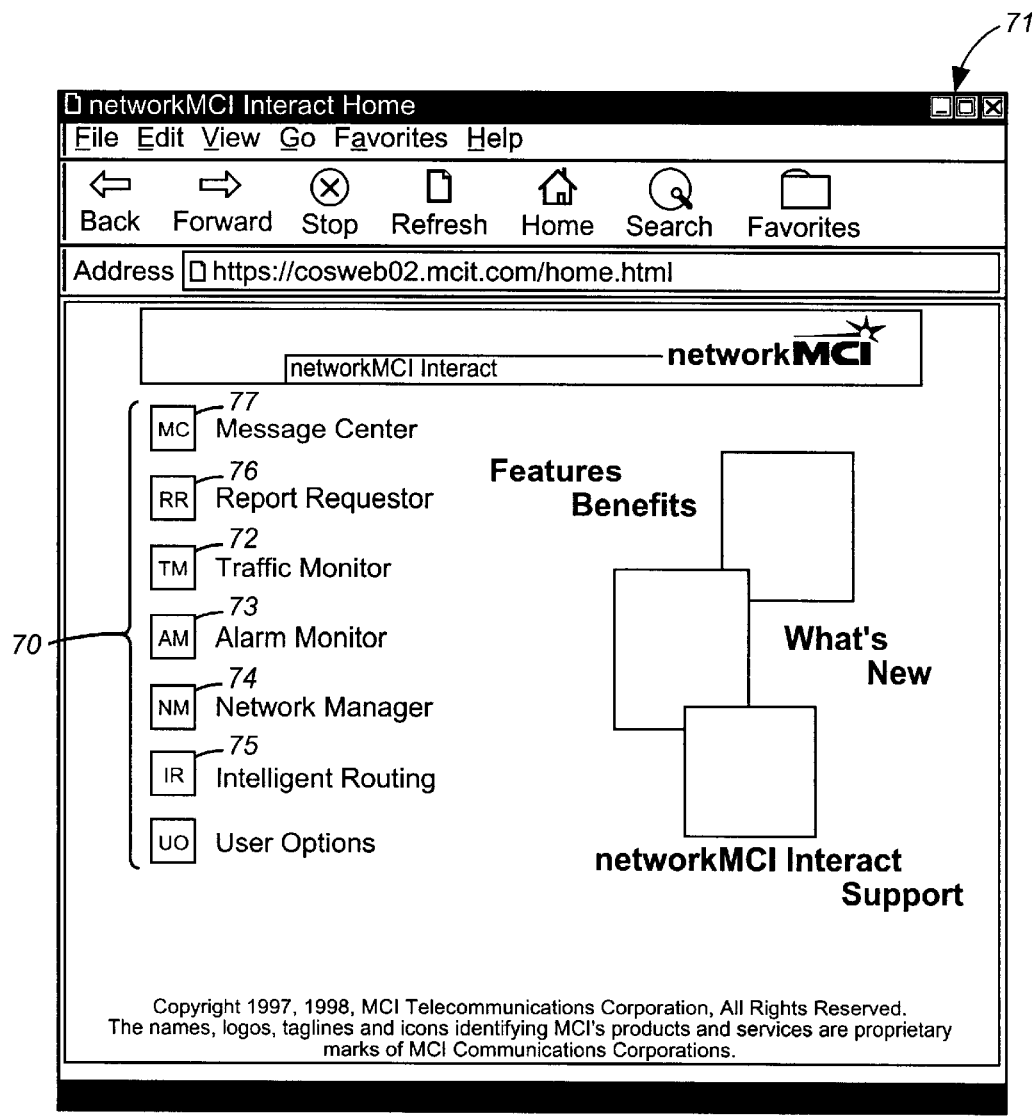
FIG. 5 illustrates an example client GUI presented to the client/customer as a browser web page.

FIG. 5 illustrates an example client GUI presented to the client/customer as a browser web page 71 providing, for example, a suite 70 of network management reporting applications including: MCI Traffic Monitor 72; an alarm monitor 73; a Network Manager 74 and Intelligent Routing 75. Access to network functionality is also provided through Report Requester 76, which provides a variety of detailed reports for the client/customer and a Message Center 77 for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 52 and the client applications use a browser 50 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm, and COAppFrame classes. COBackPlane 52 is an application backplane which launches the applications 54a, 54b, typically implemented as COApp. COBackPlane 52 is generally implemented as a Java applet and is launched by the Web browser 50. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp( ) method. The launched application then may use the backplane for inter-application communications, including retrieving Inbox data.

The COBackPlane 52 includes methods for providing a reference to a particular COApp, for interoperation. For example, the COBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application GRAPHICAL USER INTERFACE FOR WEB ENABLED APPLICATIONS.

As shown in FIG. 3, the aforesaid objects will communicate the data by establishing a secure TCP messaging session with one of the DMZ networkMCI Interact Web servers 44 via an Internet secure communications path 32 established, preferably, with a secure sockets SSL version of HTTPS. The DMZ networkMCI Interact Web servers 44 function to decrypt the client message, preferably via the SSL implementation, and unwrap the session key and verify the users session. After establishing that the request has come from a valid user and mapping the request to its associated session, the DMZ Web servers 44 will re-encrypt the request using symmetric encryption and forward it over a second socket connection 33 to the dispatch server 46 inside the enterprise Intranet.

As described in greater detail in commonly owned, co-pending U.S. patent application Ser. No. 09/159,514, filed Sep. 24, 1998 entitled SECURE CUSTOMER INTERFACE FOR WEB-BASED DATA MANAGEMENT, the contents and disclosure of which is incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 48 to generate a "cookie" which is a unique server-generated key that is sent to the client along with each reply to a HTTPS request. The client holds the cookie and returns it to the server as part of each subsequent HTTPS request. As desired, either the Web servers 44, the cookie jar server 48 or the Dispatch Server 46, may maintain the "cookie jar" to map these keys to the associated session. A separate cookie jar server 48, as illustrated in FIG. 3 has been found desirable to minimize the load on the dispatch server 46. This form of session management also functions as an authentication of each HTTPS request, adding an additional level of security to the overall process.

As illustrated in FIG. 3, after one of the DMZ Web servers 44 decrypts and verifies the user session, it forwards the message through a firewall 55b over a TCP/IP connection 33 to the dispatch server 46 on a new TCP socket while the original socket 32 from the browser is blocking, waiting for a response. The dispatch server 46 will unwrap an outer protocol layer of the message from the DMZ services cluster 44, and will reencrypt the message with symmetric encryption and forward the message to an appropriate application proxy via a third TCP/IP socket 37. While waiting for the proxy response, all three of the sockets 32, 33, 37 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 46 from StarOE server 69 at logon time and cached.

If the requester is authorized to communicate with the target service, the message is forwarded to the desired service's proxy. Each application proxy is an application specific daemon which resides on a specific Intranet server, shown in FIG. 3 as a suite of mid-range servers 60. Each Intranet application server of suite 60 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 3 may also include a variety of application specific proxies having associated Intranet application servers including: a StarOE proxy for the StarOE application server 69 for handling authentication order entry/billing; an Inbox proxy for the Inbox application server 61, which functions as a container for completed reports, call detail data and marketing news messages, a Report Manager Proxy capable of communicating with a system-specific Report Manager server 62 for generating, managing and scheduling the transmission of customized reports including, for example: call usage analysis information provided from the StarODS server 63; network traffic analysis/monitor information provided from the Traffic view server 64; virtual data network alarms and performance reports provided by Broadband server 65; trouble tickets for switching, transmission and traffic faults provided by Service Inquiry server 66; and toll free routing information provided by Toll Free Network Manager server 67.

As partially shown in FIG. 3, it is understood that each Intranet server of suite 60 communicates with one or several consolidated network databases which include each customer's network management information and data. In the present invention the Services Inquiry server 36 includes communication with MCI's Customer Service Management legacy platform 80(*a*). Such network management and customer network data is additionally accessible by authorized MCI management personnel. As shown in FIG. 3, other legacy platforms 80(*b*), 80(*c*) and 80(*d*) may also communicate individually with the Intranet servers for servicing specific transactions initiated at the client browser. The illustrated legacy platforms 80(*a*)–(*d*) are illustrative only and it is understood other legacy platforms may be interpreted into the network architecture illustrated in FIG. 3 through an intermediate midrange server 60.

Each of the individual proxies may be maintained on the dispatch server 46, the related application server, or a separate proxy server situated between the dispatch server 46 and the midrange server 30. The relevant proxy waits for requests from an application client running on the customer's workstation 50 and then services the request, either by handling them internally or forwarding them to its associated Intranet application server 60. The proxies additionally receive appropriate responses back from an Intranet application server 60. Any data returned from the Intranet application server 60 is translated back to client format, and returned over the Internet to the client workstation 50 via the Dispatch Server 46 and at one of the web servers in the DMZ Services cluster 44 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 60 quickly. Thus, a single TCP connection will be made and kept open until the full response has been retrieved.

Asynchronous transaction is supported generally for situations in which there may be a long delay in application server 60 response. Specifically, a proxy will accept a request from a customer or client 50 via an SSL connection and then respond to the client 50 with a unique identifier and close the socket connection. The client 50 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 6:
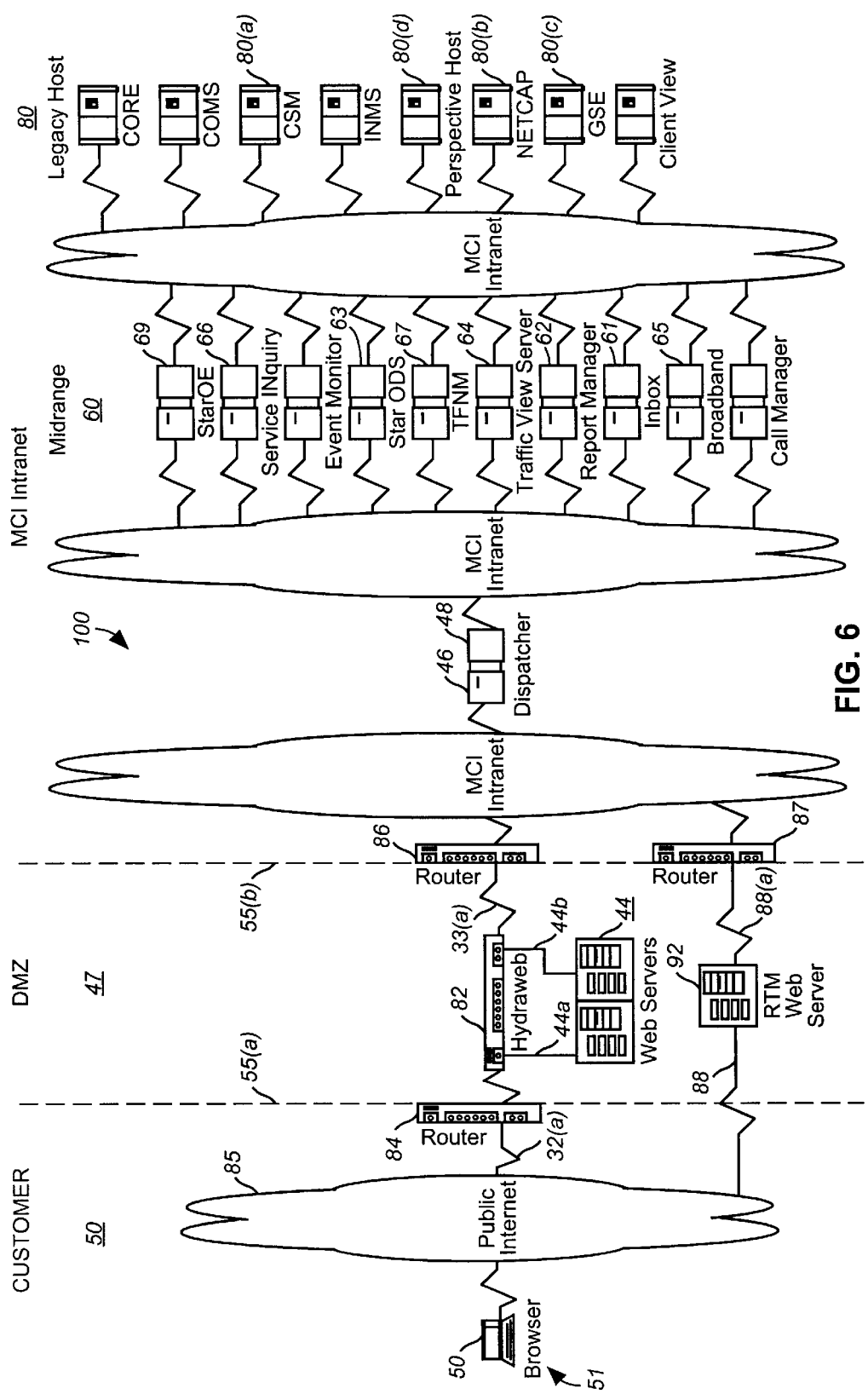
FIG. 6 is a diagram depicting the physical networkMCI Interact system architecture.

FIG. 6 is a diagram depicting the physical networkMCI Interact system architecture 100. As shown in FIG. 6, the system is divided into three major architectural divisions including: 1) the customer workstation 50 which include those mechanisms enabling customer connection to the Secure web servers 44; 2) a secure network area 47, known as the DeMilitarized Zone "DMZ" set aside on MCI premises double firewalled between the both the public Internet 85 and the MCI Intranet to prevent potentially hostile customer attacks; and, 3) the MCI Intranet Midrange Servers 60 and Legacy Mainframe Systems 80 which comprise the back end business logic applications.

As illustrated in FIG. 6, the present invention includes a double or complex firewall system that creates a "demilitarized zone" (DMZ) between two firewalls 55a, 55b. In the preferred embodiment, one of the firewalls 55b includes port specific filtering routers, which may only connect with a designated port address. For example, router 84 (firewall 55(a)) may connect only to the addresses set for the HydraWeb® (or web servers 44) within the DMZ, and router 86 (firewall 55(b)) may only connect to the port addresses set for the dispatch server 46 within the network. In addition, the dispatch server 46 connects with an authentication server, and through a proxy firewall to the application servers. This ensures that even if a remote user ID and password are hijacked, the only access granted is to one of the web servers 44 or to intermediate data and privileges authorized for that user. Further, the hijacker may not directly connect to any enterprise server in the enterprise Intranet beyond the DMZ, thus ensuring internal company system security and integrity. Even with a stolen password, the hijacker may not connect to other ports, root directories or application servers within the enterprise system, and the only servers that may be sabotaged or controlled by a hacker are the web servers 44.

The DMZ 47 acts as a double firewall for the enterprise Intranet because of the double layer of port specific filtering rules. Further, the web servers 44 located in the DMZ never store or compute actual customer sensitive data. The web servers only transmit the data in a form suitable for display by the customer's web browser. Since the DMZ web servers do not store customer data, there is a much smaller chance of any customer information being jeopardized in case of a security breach. In the preferred embodiment, firewalls or routers 84,86 are a combination of circuit gateways and filtering gateways or routers using packet filtering rules to grant or deny access from a source address to a destination address. All connections from the internal application servers are proxied and filtered through the dispatcher before reaching the web servers 44. Thus it appears to any remote site, that the connection is really with the DMZ site, and identity of the internal server is doubly obscured. This also prevents and direct connection between any external and any internal network or intranet computer.

The filtering firewalls 55(a),(b) may also pass or block specific types of Internet protocols. For example, FTP can be enabled only for connections to the In-Box server 61, and denied for all other destinations. SMTP can also be enabled to the In-Box server, but Telnet denied. The In-box server 61 is a store and forward server for client designated reports, but even in this server, the data and meta-data are separated to further secure the data, as will be described.

As previously described, the customer access mechanism is a client workstation 51 employing a Web browser 50 for providing the access to the networkMCI Interact system via the public Internet 85. When a subscriber connects to the networkMCI Interact Web site by entering the appropriate URL, a secure TCP/IP communications link 32a is established to one of several Web servers 44 located inside a first firewall 55a in the DMZ 47. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 44 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB® unit 82, manufactured by HydraWEB Technologies, Inc., which provides the DMZ with a virtual IP address so that subscriber HTTPS requests received over the Internet will always be received. The Hydraweb® unit 82 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb® unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 44 may be easily added as customer requirements and usage increases.

As shown in FIG. 6, the most available Web server 44 receives subscriber HTTPS requests, for example, from the HydraWEB® 82 over a connection 44b and generates the appropriate encrypted messages for routing the request to the appropriate MCI Intranet midrange web server over connection 44a, router 86 and connection 44b. Via the Hydraweb® unit 82, a TCP/IP connection 38 links the Secure Web server 44 with the MCI Intranet Dispatcher server 46.

Further as shown in the DMZ 47 is a second RTM server 92 having its own connection to the public Internet via a TCP/IP connection 88. As described in co-pending U.S. patent application Ser. No. 09/159,516, filed Sep. 24, 1998 entitled INTEGRATED PROXY INTERFACE FOR WEB BASED TELECOMMUNICATIONS MANAGEMENT TOOLS, this RTM server provides real-time session management for subscribers of the networkMCI Interact Real Time Monitoring system. An additional TCP/IP connection 88a links the RTM Web server 92 with the MCI Intranet Dispatcher server 46. As further shown in FIG. 6, a third router 87 is provided for routing encrypted subscriber messages from the RTM Web server 92 to the Dispatcher server 46 inside the second firewall. Although not shown, each of the routers 86, 87 may additionally route signals through a series of other routers before eventually being routed to the nMCI Interact Dispatcher server 46. In operation, each of the Secure servers 44 function to decrypt the client message, preferably via the SSL implementation, and unwrap the session key and verify the users session from the COUser object authenticated at Logon.

After establishing that the request has come from a valid user and mapping the request to its associated session, the Secure Web servers 44 will re-encrypt the request using symmetric RSA encryption and forward it over a second socket connection 38 to the dispatch server 46 inside the enterprise Intranet.

As described herein, and in greater detail in co-pending U.S. patent application Ser. No. 09/159,695, filed Sep. 24, 1998 the data architecture component of the networkMCI Interact system is focused on the presentation of real time (un-priced) call detail data, such as provided by MCI's TrafficView Server 64, and priced call detail data and reports, such as provided by MCI's StarODS Server 63 in a variety of user selected formats.

All reporting is provided through a Report Requestor GUI application interface which support spreadsheet, a variety of graph and chart types, or both simultaneously. For example, the spreadsheet presentation allows for sorting by any arbitrary set of columns. The report viewer may also be launched from the inbox when a report is selected.

A common database may be maintained to hold the common configuration data which can be used by the GUI applications and by the mid-range servers. Such common data will include but not be limited to: customer security profiles, billing hierarchies for each customer, general reference data (states, NPA's, Country codes), and customer specific pick lists: e.g., ANI's, calling cards, etc. An MCI Internet StarOE server will manage the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data will be resident in an Inbox server database and managed by the Inbox server.

The Infrastructure component of the nMCI Reporting system includes means for providing secure communications regardless of the data content being communicated. As described in detail in above-referenced, co-pending U.S. patent application Ser. No. 09/159,514, filed Sep. 24, 1998 the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the Order Entry ("StarOE") server. The general categories of features to be ordered include: 1) Priced Reporting; 2) Real-time Reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; 14) Portfolio; and, 15) Client View.

The Self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of means to monitor throughput and volumes at the Web servers, dispatcher server, application proxies and mid-range servers. Metrics monitoring helps in the determination of hardware and network growth.

To provide the areas of functionality described above, the client tier 50 is organized into a component architecture, with each component providing one of the areas of functionality. As explained in further detail in co-pending U.S. patent application Ser. No. 09/239,115, the client-tier software is organized into a "component" architecture supporting such applications as inbox fetch and inbox management, report viewer and report requester, TFNM, Event Monitor, Broadband, Real-Time Monitor, and system administration applications. Further functionality integrated into the software architecture includes applications such as Outbound Network Manager, Call Manager, Service Inquiry and Client View.

Figure 7:
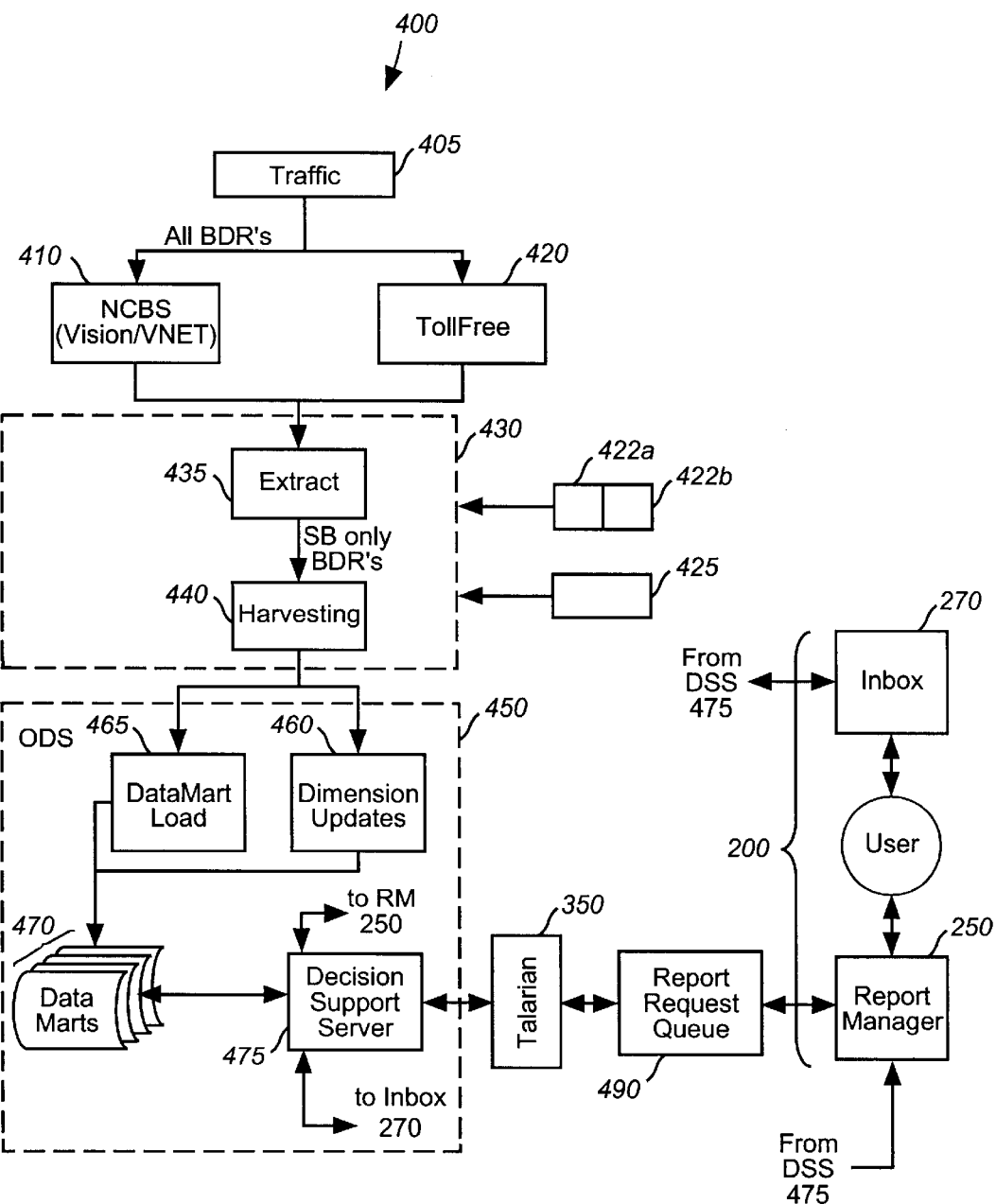
FIG. 7 illustrates the primary data warehousing components implemented in the StarODS priced reporting component 400.

The present invention relates to a data warehousing infrastructure for the StarODS Priced call detail data reporting component of the nMCI Interact system 200. The diagram of FIG. 7 illustrates, at a very high level, the systems involved in modifying and delivering BDRs to the StarODS priced call detail data reporting system, and in requesting, creating and delivering reports to the customer based upon those records. The systems and their functions are described in greater detail below.

As shown in FIG. 7, the StarODS data management architecture, which is integrated with the StarWRS component of the nMCI Interact architecture, comprises a data warehousing infrastructure 400 for providing customers with their priced call detail data. Although the description herein pertains to priced data, it should be understood that the principles described herein could apply to any type of data, e.g., traffic call detail data.

Preferably, the StarODS system provides reporting and customization of priced call detail data and implements a data marts approach for maintaining the data used for customer reporting. StarODS stores and incrementally processes customer's priced data contained in call detail records, and loads this processed data in operational data stores or data marts. From these data marts customer's priced reporting data are provided to customers on a daily basis via the StarWRS reporting system in the manner as described in co-pending U.S. patent application Ser. No. 09/159,684, filed Sep. 24, 1998 entitled INTEGRATED PROXY INTERFACE FOR WEB-BASED DATA MANAGEMENT TOOL, the contents and disclosure of which is incorporated by reference as if fully set forth herein.

As shown in FIG. 7, the data warehousing infrastructure 400 comprises the following system components: a traffic component 405 for receiving call detail records, sorting CDRs into billable records, error and suspense records, expands records, CustID's, prices at tariff; 2) a National Commercial Billing System "NCBS" mainframe process 410 that performs pricing at tariff for nMCI Interact virtual network ("Vnet") and Vision customers and, processes by runstream at one or more datacenters; 3) a Tollfree Billing mainframe process 420 that performs pricing at tariff for Tollfree customers and, processes by runstream at one or more datacenters; 4) Common Data Gateway (CDG) 430 comprising: a) an Extract process 500 for creating selection tables including all current nMCI Interact customers, compressing files for transmission to service centers, and extracting (Priced Reporting enabled) records from divisions or runstreams; and, b) a Harvesting component 600 including processes for creating dimension tables based on data within selected BDRs, applying business rules to the data, transforming the data into centralized fact table, creating load files for data marts, and compressing files for transmission; 5) Operational Data Store (ODS) component 450, including a process 465 for loading transformed billing detail records as a centralized fact table in one or more data marts storage devices, and integrating both static and dynamic dimension tables 460 according to a star-schema structure so that on-demand reports may be efficiently produced; 6) data marts 470 for storing the billing detail records in a fact table database, e.g., Informix, organized in a star-schema structure to facilitate priced call detail reporting; 7) a Decision Support Server 475 executing a combination of logic programs such as C++ and Information Advantage® software for use as the reporting engine. This component reads metadata, translates into queries, runs queries against harvested data fact tables in data marts, formats query results into a format readable by Message Center viewers, transmits complete reports to directory on Inbox server, and, additionally, performs cost estimation, scheduling, transaction logging and generates report metrics; and, 8) Talarian Smart Sockets interface between the decision support server and the StarWRS report requester reporting system comprising messaging middleware used to coordinate report requests transmitted from StarWRS to DSS.

Additionally, as shown in the FIG. 7, other external systems and applications may interface with the common data gateway component 430 including: Cyclone Billing system 422a and Concert Virtual Network Services 422b which provide additional billing detail records; and, a calling area database 425 which provides geographical reference information, i.e., identify city, state and country information.

Additionally shown in FIG. 7, and explained in greater detail in co-pending U.S. patent application Ser. No. 09/159, 684, filed Sep. 24, 1998, is the StarWRS web based reporting system 200 including: Report Manager for storing report definitions, metadata; Report requestor for providing the interface used by the customer to enter report criteria, and submit report metadata to Decision Support Server; and, StarWRS Inbox or Message Center for holding completed reports, providing an interface notifying customer that reports are available, and supplying metadata to a Report Viewer component so that user can view a report.

As will be explained, the data warehousing process is a two fold approach including the provision of incremental, daily updates to the data marts for customer's priced billing data, and, a monthly audit/reconciliation to ensure that daily totals for priced data closely tracks monthly totals, within a predetermined variance, for the same data that may have been subject to re-pricing efforts. For example, daily priced call detail data totals, e.g., total call amount, duration and count, for a customer may match to within 5 percent variance, of their corresponding monthly data that is used for invoicing.

Figure 8:
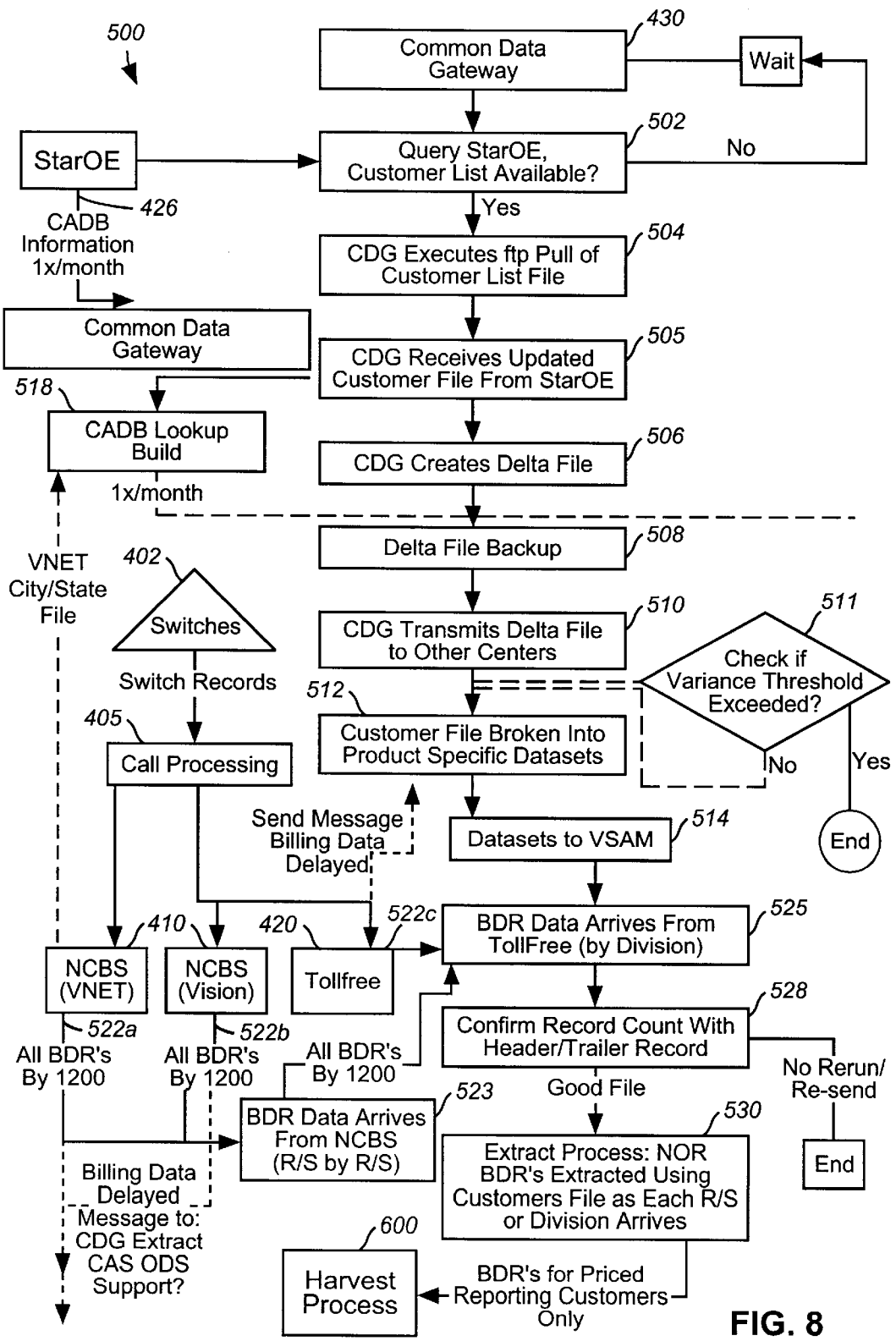
FIG. 8 illustrates the StarODS data extract process 500.

FIG. 8 illustrates a detailed overview of the extracting process 500 of the StarODS CDG component 430 of the data warehousing infrastructure of the invention. With regard to FIGS. 8 and 9, the call processing/traffic component 405 performs the following steps: receiving binary switch records from switch Adjunct Processors and Storage and Configuration elements ("SAVE") 402; translating switch records from binary to EBCDIC format so they can be read, for example, by an IBM mainframe; determining the date and time of each switch record; expanding on the record; calculating call duration and adds to each record; validating each record to determine if it is billable, and dropping unbillable records; validating each record to determine if it is billable, and, dropping unbillable records; determining the switch type and adding NPA/NXX information; determining the call type; determining which division each record belongs to, i.e., which data center from among one or more processing datacenters should receive the record if a plurality of data centers exist; determining service type; performing distance calculations; identifying and segregating any billable calls with errors and adding these records to a "error" file, for example, for future processing; adding the account number and billing cycle to each record; and, pricing all records destined for NCBS 410 at tariff.

The NCBS component particularly produces new daily call detail feed files 522a, 522b for MCI Vnet/Vision customers, e.g., generated by product and divisional runstream. Tollfree processing system 420 also creates new daily call detail feed files 522c by product and divisional runstream.

With regard to the daily mainframe server extract process 500 shown in FIG. 8, the first step 502 is triggered by the availability of a customer selection list file which, in the preferred embodiment, represents those nMCI Interact customers entitled to receive priced call detail data via their web browsers and consequently, which customer BDRs are to be extracted. Specifically, the CDG component is a mainframe process running at a primary datacenter which first executes an FTP pull of the customer list file from the nMCI Interact StarOE server 280, as indicated at step 504, and receives the updated customer file list at step 505. This customer list file may be used to drive subsequent extract processing at other data centers (not shown). In the preferred embodiment, the extract granularity in the daily customer list file is to the service location level, allowing extract of subsets of customer data down to service location level. Once retrieved from the StarOE server 280, the customer selection list may be transferred via network data mover "NDM" to the CDG extract processes which may be awaiting this file at other datacenters to trigger BDR extract processes at those other centers, assuming daily billing feeds are available at those data centers. In the preferred embodiment, the StarOE customer selection list file is used to extract Vnet, Vision, and Tollfree daily billing call data records for nMCI Interact/StarODS priced reporting customers from the daily feeds from Tollfree/NCBS. Daily BDR's are available by division for Tollfree and by runstream from NCBS (Vision/VNET).

The various divisional/runstream files may be consolidated in each CDG extract process, to generate a single extracted daily data file 523 per division in a data center. Furthermore, as indicated at step 506, a customer delta file is created which comprises a list of the new nMCI Interact priced reporting customers who were not in the previous day's customer selection list file. This customer delta file is backed up to at step 508 and, as indicated at step 510, may be transmitted to other data centers, e.g., for reporting purposes, or, to enable synchronization among the one or more datacenters.

As shown in FIG. 8, a determination is made at step 511 as to whether the number of new customers in the customer delta file has exceeded a predetermined threshold, e.g., greater than a 20% addition. If a threshold is exceeded, the extract process terminates until a manual override is performed to check out confirm the variance. Otherwise, the process continues at step 512.

At step 512, the customer file may be further broken down into billing products, e.g., Toll free, Vnet, and having product identifiers such as Corp ID or Service ID, and may be loaded into a virtual storage access ("VSAM") system for enabling quick retrieval, as indicated at step 514.

As CDG mainframe daily and monthly extract processing are triggered, on a division basis, by the completion of the appropriate corresponding billing daily or monthly division job(s), CDG maintains an audit point based on data extracted on a daily or monthly basis. Audit totals are used to match back to billing summary totals which may trigger a monthly data replace operation, as will hereinafter be explained in greater detail. CDG also provides summary totals by customer to be used to verify data harvesting and database load totals.

Next, as indicated at step 523, the raw billing detail records are input from the runstreams, e.g. Toll free, and a reconciliation is performed at step 528 to ensure that all BDR records from the runstreams are received files for the current customer list. Then, as indicated at step 530, the extract process is performed for the BDR datasets as they become available from the run streams. In the preferred embodiment, a SyncSort process is used to select only the customer data needed by the nMCI Interact StarODS system based on the customer selection list. Particularly, certain fields of the daily feed file are rearranged, and a value, e.g., determined by the production run date, is written to each daily record processed in the billing period and is used by the DSS in the data load process to replace daily records with their audited, final monthly counterparts, as will be explained. As part of extraction, the fields in each record are rearranged to the format usable by the DSS server, and identical to those produced by the daily process. In the event that invalid data types are encountered, the invalid data is replaced with designated valid values and invalid fields of any records may be blocked out based upon pre-determined criteria. Additionally input to the BDR record is an invoicing period value, e.g., "bill_period" which may be used as a text tag, to facilitate the above-mentioned monthly replace operation. More particularly, BDR records are rearranged so that the Corp ID, Service ID, Invoicing Period, Call Minutes and Call Amount are the first five fields of each record. Output BDR records are adjusted to have a structure and size which corresponds to the monthly data and, preferably are of constant length. In the preferred embodiment, the output BDR records have a constant length per record, with the output file defined as a variable blocked file with a record length of, for example, 1024 bytes. This allows dissimilar BDR output files to be concatenated for later reporting purposes, i.e., records produced by Vision may be commingled and reported with records from VNET or Tollfree.

As previously mentioned, for the monthly audit process, the final step is the production of an audit file which is used as a control by the data Harvest process. This is accomplished by reading in the processed BDR extract file and producing an audit file comprising all of the Corp ID & Service ID combinations for which BDR data was extracted, and the record counts, total minutes and total amounts for these records.

As further shown in the FIG. 8, there is shown a CADB/Geography build process 518 which receives a calling area database file (CADB) file 426 input from the StarOE server and a Vnet billing system City Name file input to determine if new records need to be added to a NPA/NXX dimension table. This is accomplished by first SyncSorting the CADB file down to unique country code, NPA, Nxx, bill_code, City Name, and State Code combinations. The CADB file is read and compared to the NPA/NXX table and the country code (CC), NPA, NXX, City Name, and State Name are used to see if that exact combination exists. If it does not, then it will be added to the NPA/NXX table and added to the dimension add file. A Key Sequence file (not shown) may be used to generate the key. Then, the billing system name file is read and bill code, City Name and State Code, will be compared against the NPA/NXX tables bill code, City2, and State Code. If the exact combination does not exist then it will be added to the NPA/Nxx table and the dimension add file, using the Key Sequence file to generate the key. Continuing with the process, a SyncSort may be used to sort the NPA/NXX table first by NPA/Nxx, then by City2. Finally, the dimension add file is FTP'd to the database server.

As mentioned, the ODS Data Harvesting Agent 600, e.g., Prism™ Warehouse Executive, is the component of the Priced Reporting system that focuses on the transformations and manipulations of billing data. Harvesting is the set of functionality that describes the form raw billing data must assume to be useable by customers to satisfy their questions and analysis requests. Common data gateway (CDG) mainframe system extracts raw Billing Detail Records (BDRs) for those entitled NMCI Interact/ODS customers, and Data Harvesting transforms the Billing Detail Records based on a set of business rules applied to the call data. The final result of harvesting is call detail data ready to be loaded into the ODS data marts for customer access and analysis.

Like the extract process, daily data harvesting is accomplished on a divisional/runstream basis, distributed across one or more datacenter mainframe sites. It is triggered by the completion of the corresponding division extract in the CDG mainframe extract process at the data center. During data harvesting the extracted billing call detail records are transformed based on the star-schema data model, which incorporates a central Fact table of call records surrounded by appropriately (foreign key) referenced satellite dimension tables. All dimensional table elements are available prior to harvesting as dimension-based lookups and, preferably, harvesting logic enables creation of new dimension keys for any dimension value(s) not found in dimension lookup tables.

Figure 9:
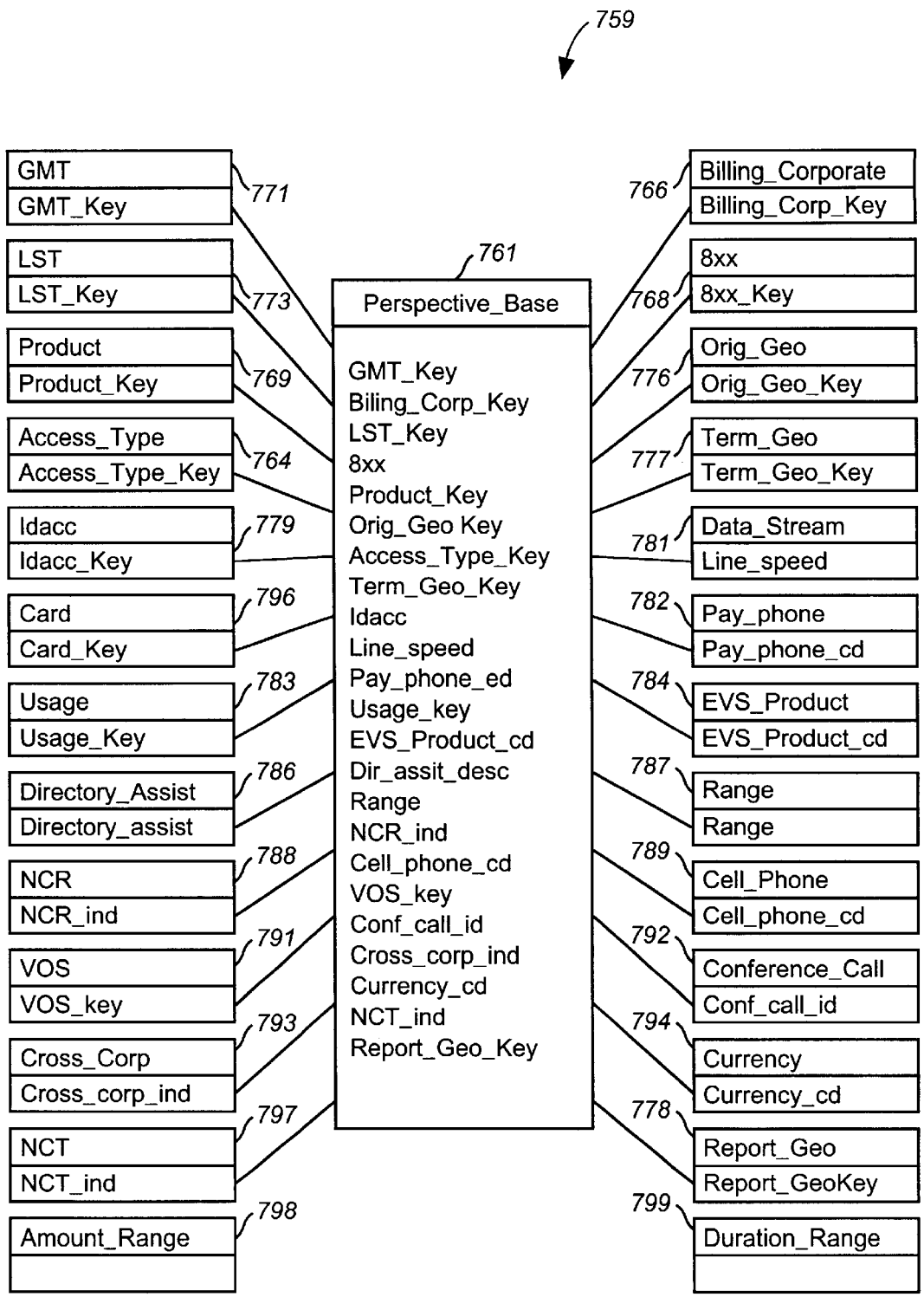
FIG. 9 illustrates the data model implemented for accessing information used in priced reporting system of nMCI Interact.

As illustrated in FIG. 9, the data model 759 implemented in StarODS is a dimensional or "star schema" model, including a central fact table multiply joined to a number of attendant tables, i.e., dimensions. The relationships between the fact table and the dimensional tables are either enforced through keys, which may be generated, or as lookup codes. As shown in FIG. 9, the central fact table 761 is known as "Perspective Base" and provides access to a collection of attributes or facts concerning a call. The dimensional tables include the following: an Access Termination table 762 comprising data indicating whether a call was charged to recipient (inbound) or originator (outbound); an Access Type table 764 comprising data indicating the type of access (for outbound calls) or egress (for inbound calls) characteristics of a call; a Billing Corp table 766 comprising data indicating the hierarchical status of a customer for the purposes of billing charges for products and features; a Toll Free Number table 768 comprising toll-free numbers i.e., 800# or 888# (in the USA); a Product Type table 769 comprising data indicating the product for which services are bundled for the purpose of invoicing; a GMT table 771 comprising date and time data adjusted to the Greenwich Mean Time Zone; a LST table 773 comprising date and time data adjusted to the local MCI switch which permitted access to the MCI network; an Orig_Geo table 776 comprising data indicating the geographic characteristics of a call's origination; a Term_Geo table 777 comprising data indicating the geographic characteristics of a call's termination; a Report Geo table 778 comprising data indicating the geographic characteristics of a call's origination or termination; an Idacc table 779 comprising data indicating a customer's defined id and/or accounting code; a Data Stream table 781 comprising data relating to the line speed characteristics of a data (non-voice) call; a Pay Phone table 782 comprising data denoting calls originating from a payphone; a Usage table 783 comprising data indicating the geographic attributes of a call which affect Tariff rates; an EVS Product table 784 comprising data representing Enhanced Voice Services products; a Directory Assistance table 786 comprising data indicating those calls requesting Directory assistance; a Range table 787 comprising data indicating distance bands a call may fall into; an NCR table 788 indicating Network Call Redirect calls; a Cell Phone table 789 comprising cellular call characteristics data; a VOS table 791 indicating Voice Operator Services calls; a Conference Call table 792 having data pertaining to characteristics of conference calls; a Cross Corp table 793 comprising data indicating inbound cross corporate routing of calls; a Currency table 794 indicating the unit of currency for call prices; a card table 796 comprising data for billing calls to a location that may not be the one which originated the call; an NCT table 797 comprising data representing Network Call Transfers; an Amount Range table 798 indicating call usage ranges based upon amounts; and, a Duration Range table 799 indicating call usage durations based on amounts. This star schema model is optimized for decision support and the retrieval of large amounts of data. Appendix H provides the data attributes of each of these dimension tables. As known, in the dimensional model, the grain of data stored in the fact table determines what level of data can be drilled down into. It should be understood that the grain of the data stored in the Perspective Base table is at the singular call level.

In the preferred embodiment, all dimension lookup tables must be built. Dimensions, such as Access Type Dimension, Product Type Dimension, and Date-time Dimension, are manually built one time prior to migration to production and are infrequently, if ever, updated, and are hence referred to as static dimensions. The Access Type and Product Type Dimensions are updated or added to only as new business requirements are brought to light. For example, the Access Type Dimension is updated only if new access types are created or added and, the Product Type Dimension is updated only if new products are supported by nMCI Interact priced reporting. The Date-Time Dimension on the other hand may be updated, or rebuilt each year.

The remaining dimensions, such as, the Billing Dimension, Geography Dimension, 800 Number Dimension, the Calling Card Dimension, and the ID and accounting codes ("IDACC") Dimension (if implemented), are dynamically built and maintained by the harvesting programs. Thus, if a lookup to one of these dynamic dimensions encounters a "Not Found" condition, the offending call record may be pended to an unprocessed calls file in the same format as input by the harvesting program. In that scenario, the dimensional value that was not available in the lookup dimension is written to a dimension delta file which may be later used to update that dynamic dimension. The pended and unprocessed call records may then be rerun through the same Harvesting process. In this way, these dynamic dimensions are automatically maintained and updated by harvesting processes. In the preferred embodiment, a new key is generated and the dimension table automatically updated when a dimension look up can not be found, thus obviating the need to create delta files and running these unprocessed records a second time through harvesting. Note that if a look-up to a static dimension is not found, that record may be rejected.

For example, after availability of the StarOE customer list file, a customer delta file provided during extraction and comprising all new customer list records added since the previous day's StarOE customer list file, provides the basis for a Billing/Customer Dimension "build" process. That is, since Billing/Customer is a dynamic dimension which incorporates new customer list records into the previous day's Billing/Customer Dimension Lookup File. The newly updated Billing/Customer Dimension Lookup File is subsequently used by the harvesting programs to associate the appropriate Billing/Customer Dimension keys with the corresponding central fact table records being generated.

Figure 10:
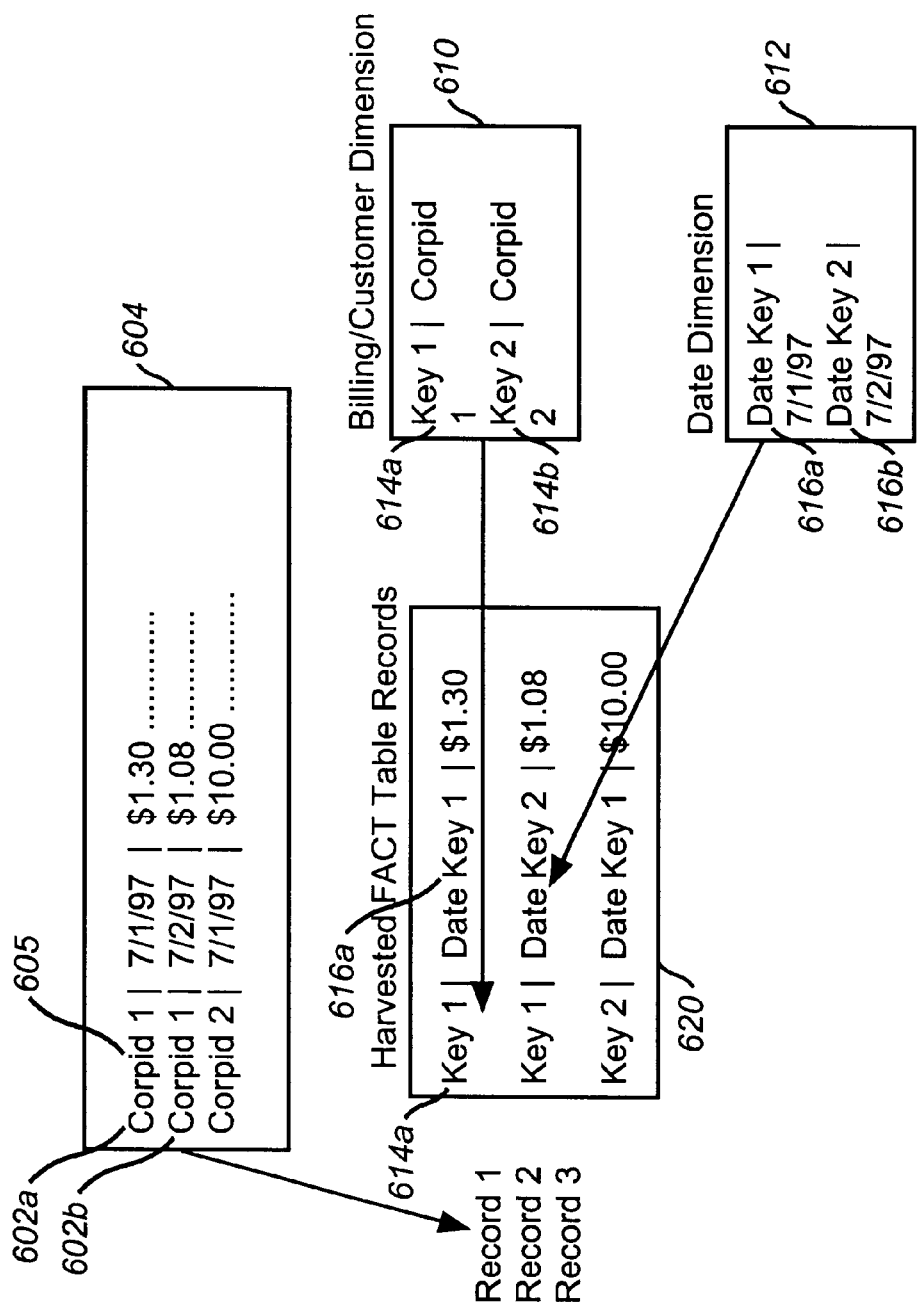
FIG. 10 depicts generally the creation of the BDR record fact table during the harvest process.

The association of dimension tables to a centralized fact table through a foreign key structure is created for each defined dimension or dimensional lookup, and is graphically represented in FIG. 10 by the simplified example as follows:

As shown in FIG. 10, each record 602*a,b*, . . . of the extracted BDR 604 includes the Corp ID field 605 along with other arranged data pertaining to that particular call, e.g., date, time, call amount. An example billing/customer dimension table 610 and Date dimension table 612 are also shown in FIG. 10. In the example, the billing/customer dimension table include keys 614*a*, and 614*b*, corresponding to respective customers Corp ID 1, Corp ID 2. The date dimension table includes date keys 616*a* and 616*b*, corresponding to respective dates Jul. 1, 1998 and Jul. 2, 1998. After running the BDR 604 against the dimension tables 610, 612 as shown in FIG. 10, the harvesting process generates a FACT table record 620 having a mix of dimension keys, e.g., 614*a*, 616*a*, and data corresponding to the extracted BDR. The combination of these entities represents how data is to be stored in data marts for the operational data store component of StarODS and, further enables subsequent queries against the data to be formed by the decision support servers. In the preferred embodiment, the granularity of the data in the fact table or "Perspective base," is at the singular call level.

According to the invention, harvesting of daily and monthly customer billing data for Priced Reporting may occur in a distributed manner, i.e., across many production data centers or wherever an upstream billing systems and data processing takes place. Like upstream billing systems and the Common Data Gateway, extract processing and data harvesting may be distributed across these data centers by geographic-based divisions and runstreams. Product and frequency typically distinguish harvesting processing. While the basic process logic is similar for all products regardless of whether it involves daily or monthly data harvesting, different dimensional processing as well as distinct business rules implementation are associated with each distinct product. As such, distinct data harvesting program modules are implemented for each of the following: Daily data; Monthly Vnet data; Monthly Vision data; Monthly domestic Tollfree data; Monthly international Tollfree data; and, Monthly CVNS data.

The daily harvesting process will now be described with reference had to FIG. 11. For purposes of explanation, it is assumed that Fact and Dimension tables are being created for Tollfree and/or Vnet/Vision BDR records (daily and monthly). As mentioned, the daily data harvesting process is triggered to run the moment the customer list file fromthe Common DAta Gateway mainframe becomes available. The program is triggered to run the moment the BDR file from the Extract process becomes available. In a first step, the file is opened and the extracted and modified billing detail record is read. Then, the following steps are performed to write dimension data to the (FACT) record, and/or to add a record to each Dimension table: first, as indicated at step 625, a search is made in a "GEO Dimension Table— Originating" where the Geo (originating) Dimension is read.

If a matching record is found, the GEO RECORD KEY is moved to the created fact table (ORIG GEO RECORD KEY); if no record is found, the CDG component preferably generates a new GEO RECORD KEY and moves it to the fact table. Otherwise, spaces may be written to the fact table (ORIG GEO RECORD KEY) and a "DELTA" record is written using GEO KEY. Next, as indicated at step 630, a search is made in a "GEO Dim Table—Terminating" where the Geo Dimension (Terminating) is read. If a matching record is found, the GEO RECORD KEY is moved to the fact table. (TERM GEO RECORD KEY); if no record is found, the CDG component preferably generates a new GEO RECORD KEY and moves it to the fact table. Otherwise, spaces may be written to the fact table (TERM GEO RECORD KEY) and a DELTA record is written using GEO KEY. Next, as indicated at step 635, a search is made in the Billing Dimension Table where the BILLING Dimension is read. If a matching record is found, the BILLING DATETIME RECORD KEY is moved to the fact table (BILLING KEY). If no record is found, the CDG harvest component preferably generates a new BILLING RECORD KEY and moves it to the fact table, otherwise spaces may be written to the fact table (BILLING RECORD KEY) and a DELTA record written for the BILLING KEY. Next, as indicated at step 640, a search is made in a Calling Card Dimension Table where the CARD Dimension is read. If a matching record is found, the CARD RECORD KEY is moved to the fact table (CARD KEY). If no record is found, the CDG harvest component preferably generates a new CARD RECORD KEY and moves it to the fact table, otherwise spaces are written to the fact table (CARD RECORD KEY) and a DELTA record is written using CARD KEY. The look-up process continues for each call detail product that is present in the extracted BDR including: a look-up 645 in the local DATETIME DimensionTable (DATETIME KEY); a look-up 650 in the TOLLFREE NUMBER Dimension table (TFNUMBER RECORD KEY); a look-up in the IDAC Dimension table (IDAC RECORD KEY); a look-up in the USAGE Dimension table (USAGE RECORD KEY); a look-up 655 in the GMT Dimension table (GMT RECORD KEY); a look-up 660 in an ACCESS Dimension table (ACCESS RECORD KEY); a look-up 665 in the PRODUCT Dimension table (PRODUCT KEY); a RANGE Dimension table look-up (RANGE RECORD KEY); and, a DURATION Dimension table look-up (DURATION RECORD KEY). With respect to the GMT Dimension table, the "switch_trnk" field and the "switch_trnk_grp" field is taken from the BDR to find an offset, which will be added to, or subtracted from, the time of the call. With respect to the RANGE Dimension table look-up, if a RANGE Dimension Finding Record Value is greater than (">") a RANGE KEY value, then the RANGE RECORD KEY is moved to the fact table. Likewise, if a DURATION Dimension Finding Record Value is greater than (">") a DURATION KEY value, then the DURATION RECORD KEY is moved to the fact table.

As all Dimension tables are populated with keys, the record is written to the FACT Table (FIG. 10). Otherwise, the record is placed into suspense (DELTA) for reprocessing. The process outlined above continues for each BDR record received in the bill stream. If dynamic dimension tables have not been updated, then after all records are read, all dynamic dimension tables are updated with the written deltas. If the file is complete the error file is read, and each record reprocessed to add dimension keys for each record. When the error file has been processed, the harvest process for that file ends and notification is sent to the StarODS database server that "files are ready."

It should be understood that similar daily harvesting procedures are implemented for those BDR records for other products besides Toll free, e.g., Vnet/Vision customers. For VISION/VNET (Monthly or Daily) the following steps are executed for each BDR record to create the Fact and Dimension tables: First, the file is opened and a billing detail record is read: As an example, the following steps are performed to write a billing dimension key to the (FACT) record, or to add a record to each dynamic dimension table: first the following business rules are applied to the BILLING Dimension Table: 1) Moving STK-ENT-ID-CD to BILLING KEY CORP; 2) moving STK-BILL-ID to BILLING KEY BILL (If STK-BILL-ID=SPACES MOVE ZERO); and, 3) moving SVC-LOCN-ID to BILLING KEY SVCLOC. Then, the BILLING Dimension is read. If a matching record is found, the BILLING RECORD KEY is moved to the Fact table (BILLING RECORD KEY). If no record is found, a new key may be generated for input to the fact table and billing dimension table (BILLING RECORD KEY). Each available file from the upstream billing systems is processed as it is available. As a result, multiple runstream files are processed simultaneously, and Decision Support Server 475 (FIG. 6) ftp pulls hundreds of daily files from the harvesting (Common Data Gateway mainframe), as indicated at steps 669a, 669b in FIG. 11.

Following completion of daily data harvesting processing for a given division or runstream but prior to file transfer and load of division harvested data into the priced reporting database(s), i.e., data marts,—all dimension adds for that division or runstream are transferred and loaded into the appropriate database, as indicated at step 666. Other data transformations may occur prior to loading, for instance, conversion of data from IBM Mainframe EBCDIC character set data to mid-range server readable ASCII file format is performed for the output fact table records as indicated at step 665. Additionally, the central BDR fact table records are properly formatted for querying by DSS. Finally, the Data Harvesting Process provides notification to the Priced Reporting database server(s) regarding availability and size of harvested data files. It should be understood that, prior to data loading, an approval is required to ensure that appropriate space is allocated to the databases.

Figure 11:
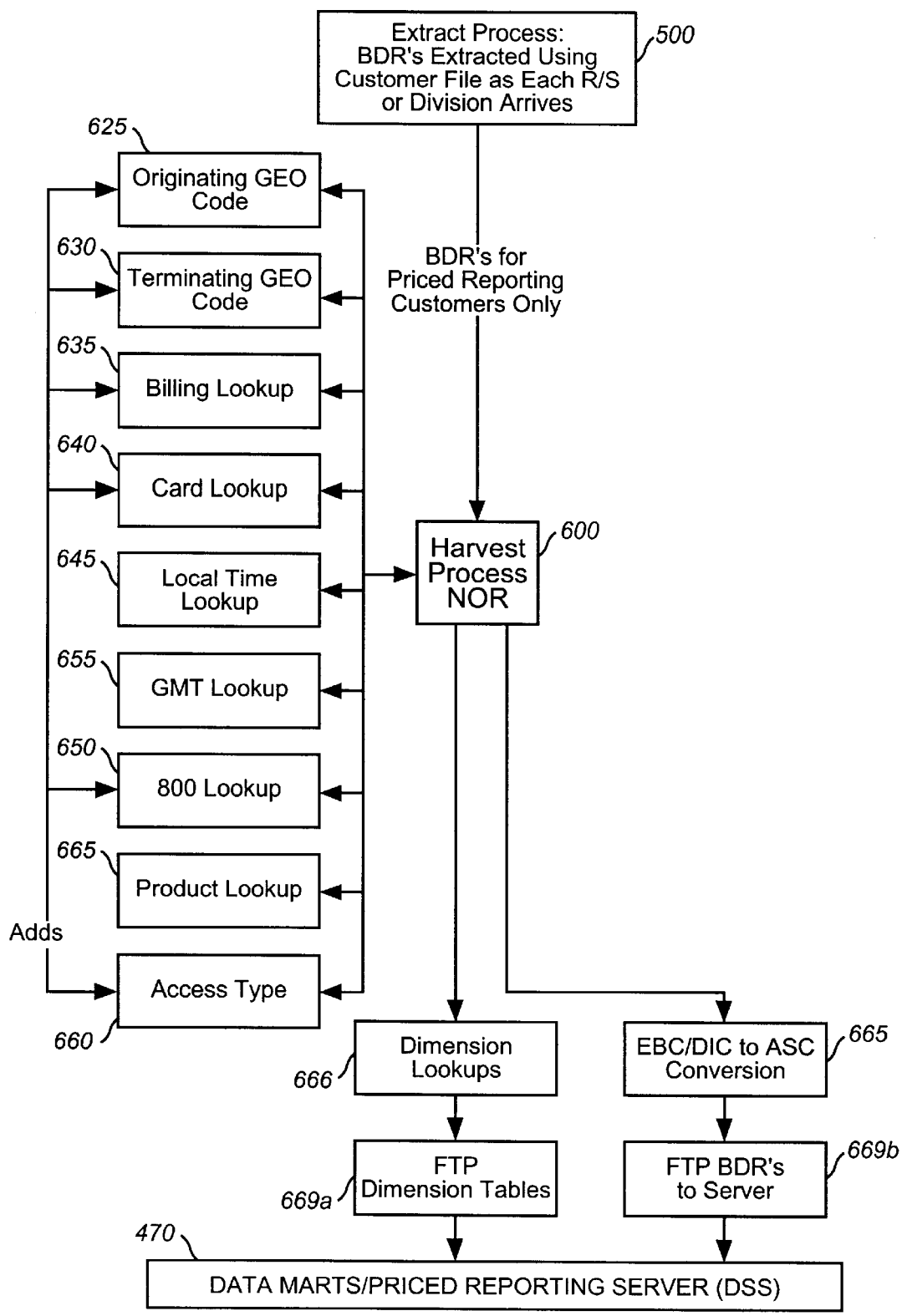
FIG. 11 illustrates the StarODS data harvest process 600.

The FTP loading of various daily divisional/runstream harvested data files is initiated as soon as the data harvesting for a division or runstream is completed, as indicated in FIG. 11 at steps 669a,b. Daily harvested data files are transferred or available in the datacenter in the appropriate ASCII file format. Furthermore, loading of a given monthly divisional/ runstream harvested data file is triggered by the corresponding formal invoicing approval for that division or runstream.

Appendix I is a listing in DDL representing the star topology organization of the fact tables, dimension tables, and their associations in the operational data storage devices or data marts, i.e., an Informix™ database. Included in the file listing of Appendix I, is the organization of the fact table "informix.iopers_base," associations with the above-described dimension tables in a star-schema relation, and, the format for the corresponding customer specific data information, e.g., dialed number, duration, call amount, etc., included in the fact table from the BDRs. The database is provided with ancillary tables used providing additional quality assurance functionality including: a file tracking table "informix.file_tracking" which tracks and maintains all files that are input from harvesting mainframe process; and, request tracking tables "informix.request," "informix.request_hist" and "informix.request_status" which are used to track customer report requests and the status of reports during the report generation process.

With regard to the availability of monthly billing call detail records, the elements of the monthly extract, harvest, load and report production processes are the same as the corresponding daily routines. On days when a monthly processing is occurring, daily processing simultaneously occurs. The major difference is that monthly processing is triggered by the receipt of a monthly BDR file from the appropriate billing system, not the receipt of daily customer list information. At a high level, the sequence is as follows: the monthly extract process runs; the monthly harvest process runs; monthly file sizing is completed; output files are retained pending audit approval of billing system feeds from which call records were extracted and harvested. Information about file names, sizes and locations is retained by the Harvest process 600 for later transmission to StarODS DSS server. After audit approval is received, the data harvesting agent executes notification of ODS. Notification includes availability, name, location and file size. StarODS load process executes ftp pull for each file and DSS confirms that each compressed file fragment is complete. DSS loads files in the appropriate operational data store or data mart by executing a replace operation of all daily records for that product, invoice period and day with their equivalent records from the monthly file. Granularity of the replace operation is on a daily level, i.e., daily blocks of BDR's are replaced, not individual BDR's. Completion of entire monthly replace operation for specific invoice period and product triggers the DSS server to begin running monthly reports which have been queued up.

It should be understood, that the monthly replace operation is key to providing accurate data for use by DSS in reporting.

More particularly, on a monthly basis, the priced reporting system extracts monthly billing data from the upstream billing systems, including NCBS and Tollfree. From NCBS, monthly division extracts are produced for Vnet and Vision. Monthly division extracts for domestic and international Tollfree are generated from the output of the Tollfree billing cycle. Extract of nMCI Interact specific call detail records from the full output of the billing system is accomplished on a divisional level.

As part of the monthly extract process, a value determined by the production run date is added to the BDR, and is used by the DSS in the data load process to replace daily BDR records with their audited, final monthly counterparts. As part of extraction, fields in each record are re-arranged to the format usable by the DSS, and identical to those produced by the daily process. In the event that invalid data types are encountered, the invalid data is replaced with designated valid values.

In addition, a statistical summary of the results of the Monthly Extract process is produced. This output is compared to the grand total of daily summaries produced by the daily extract process in the same billing period. The sum of daily BDR counts is compared to the grand total of BDR counts for the bill period/product/division, as well as daily counts from the daily process to daily counts per the monthly extract. This is done as a monthly reconciliation to ensure the completeness and accuracy of the monthly file prior to the monthly replace operation which is accomplished by the DSS server 475.

Referring back to FIG. 8, after the daily and monthly harvest and monthly replacement operations have been performed, the data is input to an operational data store component ("ODS") 450 that stores the billing detail records and dimension tables as a data model. This ODS layer 450 is comprised of all data harvested from all applications in the data harvesting layer 430, and feeds report-supporting data marts 470 in a manner which supports customized data access. The data marts may be engineered to pre-process data, create aggregates, and otherwise perform transformations on the data prior to data mart 465 in order to implement a defined data model, e.g., star schema key structures, fact and dimension tables depicted as block 460. In the preferred embodiment, as shown in FIG. 8, the Operational Data Store 450 includes multiple datamarts 470 each for storing and retrieving daily and monthly priced data on a periodic basis. It primarily is responsible for hosting highly current data, typically at least 72 hours old. In accordance with customer-reporting needs, data marts 470 are partitioned in accordance with partitioning schemes which may be based on customer-ID. Particularly, each data mart is engineered for servicing specific customers or specific product sets, as well as engineered for the specific requirements of the customer/product such as high insert activity, heavy reporting requirements, etc. As data is volatile and changing and may not produce consistent results for the same query launched at multiple times, ODS is engineered for high performance through appropriate storage technologies and parallel processing.

From these data marts customer's priced reporting data can be provided to customers on a daily basis via the StarWRS reporting system as described in detail in above-mentioned co-pending U.S. patent application Ser. No. 09/159,684, filed Sep. 24, 1998. Reporting categories from which a variety of reports can be generated include: a) Financial category—for providing priced data reports relating to longest calls, most expensive calls, Off Peak Calls, payphone report, usage summary, calling card summary, and area code summary for Toll Free, VNET, Vision, and CVNS customers; b) Marketing category—for providing priced data reports relating to country code summary, state summary, frequent numbers, frequent area code summary, frequent state, and frequent cities; c) Telecommunications category—for providing priced data reports relating to call duration summary, IDAC/Supp Code Summary and Call Access Summary for Toll Free, VNET, Vision, CVNS customers; d) Call Center report category—for providing priced data reports relating to most active toll free numbers, Hourly Distribution, Day of Week Distributions, state summary, and country code summary for their Toll Free, VNET, Vision, CVNS customers; e) Monitor Usage—for providing priced data reports relating to longest calls, most expensive calls, most active calling card and most active toll free numbers for their Toll Free, VNET, Vision, CVNS customers; f) Analyze Traffic—area code summary, country code summary, state summary, range summary, city summary, frequent numbers, payphone report, usage summary, calling card summary, IDAC/Supp Code Summary, Day of Week Distributions, Hourly Distribution, Call Access Summary and review calls; and, a g) Check Calling Frequencies category—for reporting on frequent numbers, frequent area code, frequent country codes, frequent state and frequent cities.

Additionally, referring back to FIG. 7 there is provided a decision support server ("DSS") reporting engine component 475 that performs the following functions: 1) receives data access requests from various users in the form of a report request from the StarWRS GUI Report Requestor component; 2) routes the query to the appropriate data marts 470, data warehouse or operational data store; and, 3) responds to the requestor with the result set. The DSS server 475 may also perform cost estimation, agent scheduling, workflow broadcasting interface, and transaction logging functions. In the preferred embodiment, the DSS 475 is a cluster of DEC (Digital Equipment Corp.) UNIX 8400 servers running Information Advantage® software accessing an Informix database distributed across multiple data marts.

Figure 12:
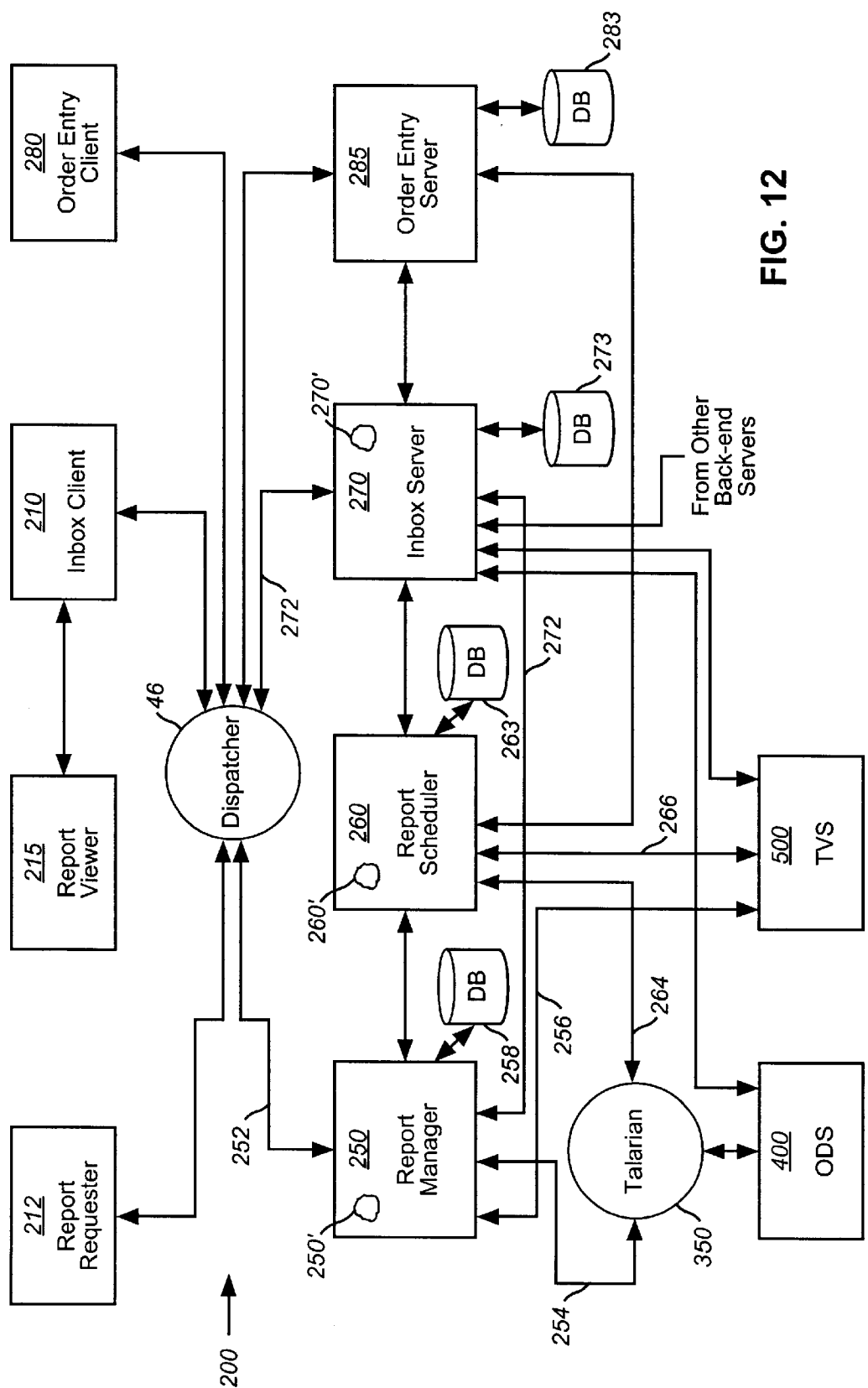
FIG. 12 is a block diagram depicting the physical architecture of the StarWRS component of networkMCI Interact Reporting system.

Thus, the present invention is integrated with a client and middle-tier service and application proxy component that enable customers to request, specify, customize, schedule and receive their telecommunications network call detail data and account information in the form of reports that are generated by the various back-end application servers. Referred to herein as "StarWRS," this WWW/Internet Reporting System 200, as shown in FIG. 12, comprises the following components and messaging interfaces:

1) those components associated with the Client GUI front end including a report requestor client application 212, a report viewer client application 215 and, an Inbox client application 210 which implement the logical processes associated with a "Java Client," i.e., employs Java applets launched from the backplane (FIG. 4) that enable the display and creation of reports and graphs based on the fields of the displayed reports, and, allows selection of different reporting criteria and options for a given report; and, 2) those middle-tier server components enabling the above-mentioned reporting functionality including: a Report Manager server 250, a Report scheduler server 260, and an Inbox Server 270. Also shown in FIG. 7 are the system Order Entry client application 280 and a corresponding Order Entry Server 285 supporting the StarWRS reporting functionality as will be described.

Each of these components will now be described with greater particularity hereinbelow.

The Report Manager ("RM") server 250 is an application responsible for the synchronization of report inventory with back-end "Fulfilling" servers 400, 500; retrieval of entitlements, i.e., a user's security profiles, and report pick list information, i.e., data for user report customization options, from the system Order Entry server 280; the transmission of report responses or messages to the Dispatcher server 46 (FIG. 3); the maintenance of the reporting databases; and, the management of metadata used for displaying reports. In the preferred embodiment, the RM server 250 employs a Unix daemon that passively listens for connect requests from the GUI client applications and other back-end servers and deploys the TCP/IP protocol to receive and route requests and their responses. Particularly, Unix stream sockets using the TCP/IP protocol suite are deployed to listen for client connections on a well-known port number on the designated host machine. Customers desiring to submit requests connect to RM 250 via the dispatcher 46 by providing the port number and host name associated with RM 250. For the particular back-end server 400 providing priced reporting data, a Talarian smart socket connection 255 is provided. Request messages received by the RM server are translated into a "metadata" format and are validated by a parser object built into a report manager proxy 250' that services requests that arrive from the GUI front-end. If the errors are found in the metadata input, the RM 250 will return an error message to the requesting client. If the metadata passes the validation tests, the request type will be determined and data will be retrieved in accordance with the metadata request after which a standard response will be sent back to the requesting client. As shown in FIG. 12, interface sockets 252 are shown connecting the Dispatcher server 26 and the RM server 250 and, other socket connections 254, 256 are shown interfacing the RM 250 with respective back end servers 400 and 500. For instance, in one embodiment, fulfilling server 400 provides a customer's priced billing data through a Talarian smart socket messaging interface 254 to the Report Manager. Additionally, as part of the StarWRS web reporting system 200 shown in FIG. 12, unpriced traffic data may be sent directly to the report manager 250 from the Traffic View server ("TVS") 500, as described in commonly-owned, co-pending U.S. patent application Ser. No. 09/159,684 entitled INTEGRATED PROXY INTERFACE FOR WEB BASED DATA MANAGEMENT REPORTING TOOL. Although not shown in FIG. 12, it should be understood that the RM 250 server may manage reporting data for customer presentation from other back-end and legacy servers including, e.g., Broadband, Toll Free Network Management, and Event Monitor servers, etc. in order to present to a customer these types of billing/management data.

The report manager server additionally utilizes a database 258, such as provided by Informix, to provide accounting of metadata and user report inventory. Preferably, an SQL interface is utilized to access stored procedures used in processing requests and tracking customer reports. A variety of C++ tools and other tools such as Rogue Wave's tools.h++ are additionally implemented to perform metadata message parsing validation and translation functions.

The Report Manager server 250 additionally includes the scheduling information which is passed to the back-end fulfilling servers 400, 500 and stored by them. At times, the Report Manager will request this information from the fulfilling servers in order to reconcile.

The Report Scheduler ("RS") server component 260 is, in the preferred embodiment, a perpetually running Unix daemon that deploys the TCP/IP protocol to send requests to the back-end fulfilling servers such as the StarODS server 400, or TVS server 500, and receive their responses. More particularly, the RS server 260 is a Unix server program that is designed to handle and process report requests to the fulfilling servers by deploying Unix stream sockets using the TCP/IP protocol suite, and sending the report request to client connections on a well-known port number on the designated host machine. As shown in FIG. 12, interface socket connections 264, 266 are shown interfacing with respective back end servers 400 and 500. In the case of priced billing data from ODS 400, report requests are published by the RS server 260 to a pre-defined subject on the Talarian Server. When handling other incoming messages published by back end servers using Talarian Smart-Sockets 4.0, another daemon process is necessary that uses Talarian C++ objects to connect their message queue and extract all messages for a given subject for storage in a database table included in database 263. Each message includes the track number of the report that was requested from the fulfilling server.

From the report scheduler interface, the user may specify the type of reporting, including an indication of the scheduling for the report, e.g., hourly, daily, weekly or monthly. For priced data the user has the option of daily, weekly, or monthly. For real-time, or unpriced data, the user has the option of hourly, daily, weekly or monthly. The report scheduler interface additionally enables a user to specify a page or E-mail account so that an e-mail or page message may be sent to indicate when a requested report is in the Inbox server 270.

As shown in FIG. 12, the report scheduler server 260 interfaces directly with the Report Manager server 250 to coordinate report request processing. It should be understood that the respective report management and scheduling functions could be performed in a single server. An overview of the report request/scheduling process implemented by StarWRS Report Manager and Report Requestor tools may be found in commonly owned, co-pending U.S. patent application Ser. No. 09/159,409, filed Sep. 24, 1998 entitled INTEGRATED PROXY INTERFACE FOR WEB BASED REPORT REQUESTOR TOOL SET, the contents and disclosure of which is incorporated by reference as if fully set forth herein.

The Inbox Server component 270 serves as the repository where the completed user report data is stored, maintained, and eventually deleted and is the source of data that is uploaded to the client user via the dispatcher over a secure socket connection 272. It is also a Unix program that is designed to handle and process user requests submitted in metadata format using an Informix® database. Once report results are received from the StarODS 400 or any other back-end or fulfilling servers (not shown), the Inbox server 270 requests the metadata from the Report Manager server 250 as indicated by the socket connection 272 in FIG. 12. The metadata is stored in the Inbox server database 273 along with the report results. Thus, if the metadata is required to be changed, it will not interfere with the information needed to display the reports included in the Inbox. Additionally, as shown in FIG. 12, the Inbox server interfaces with the report scheduler to coordinate execution and presentation of reports.

The StarOE server 280 is the repository of user pick lists and user reporting entitlements as shown in database 283. Particularly, it is shown interfacing with the Inbox server 270 and report scheduler servers 260. The Report Manager does not interface with or include metadata for StarOE. It will, however, include information in the report metadata that will tell the Report Requestor it needs to get information (i.e., Pick Lists) from StarOE server 285. Particularly, the StarOE server supports pick lists for the selection of priced data based on the following list: Date, Time (Provide in GMT offset), ID Accounting Code (IDAC)/Supp code, Access Type, Corp ID, Service Location w/Service Location Names, Bill Payer w/Bill Payer Names, 8XX Number, City, State/Province, Numbering Plan Area (NPA), NXX (Exchange code where N=2–9 and X=0–9), and Country Code.

With regard to the front-end client GUI components, the above-mentioned Inbox client application 210 functions as an interface between the client software and the Inbox server 270 for presenting to the customer the various type of reports and messages received at the Inbox including all completed reports, call detail, alarms, and flashes. Preferably, the messages for the user in the inbox is sorted by type (e.g., report, call detail, alarms) and then by report type, report name, date, and time. A more detailed description of the StarWRS Inbox Server component may be found in commonly-owned, co-pending U.S. patent application Ser. No. 09/159,512, filed Sep. 24, 1998 entitled MULTI-THREADED WEB BASED USER IN-BOX FOR REPORT MANAGEMENT, the contents and disclosure of which is incorporated by reference as if fully set forth herein.

Particularly, the Inbox client application uses the services of the backplane (FIG. 4) to launch other applications as needed to process report messages. The inbox will also use the services of the data export objects to provide a save/load feature for inbox messages, and, is used to provide a user-interface for software upgrade/download control. Inbox messages are generated by the versioning services of the backplane; actual downloads will be accomplished by a request through the inbox.

In the preferred embodiment, the inbox client is able to receive information on multiple threads to allow a high priority message to get through even if a large download is in progress. Typically, the browser is configured to allow more than one network connection simultaneously, i.e., the polling thread on the client uses a separate connection to check for new messages, and start a new thread on a new connection when a new message was detected. In this way, multiple messages may be downloaded simultaneously.

The Report Requestor application 212 is a GUI Applet enabling user interaction for managing reports and particularly includes processes supporting: the creation, deletion, and editing of the user's reports; the retrieval and display of selected reports; the display of selected option data; and the determination of entitlements which is the logical process defining what functionality a user can perform on StarWRS. In the preferred embodiment, a Report request may be executed immediately, periodically, or as "one-shots" to be performed at a later time. As described herein, the report scheduler service maintains a list of requested reports for a given user, and forward actual report requests to the appropriate middle-tier servers at the appropriate time. Additional functionality is provided to enable customers to manage there inventory, e.g., reschedule, change, or cancel (delete) report requests.

The Report Viewer application 215 is a GUI Applet enabling a user to analyze and display the data and reports supplied from the fulfilling servers such as StarODS 400, Traffic View ("TVS") 500, and other systems such as Broadband and toll free network manager. Particularly, the Report Manager 250 includes and provides access to the metadata which is used to tell the Report Requestor what a standard report should look like and the "pick-list" options the user has in order for them to customize the standard report. It is used to tell the Report Viewer client how to display the report, what calculations or translations need to be performed at the time of display, and what further customization options the user has while viewing the report. It additionally includes a common report view by executing a GUI applet that is used for the display and graphing of report data and particularly, is provided with spreadsheet management functionality that defines what operations can be performed on the spreadsheet including the moving of columns, column hiding, column and row single and multiple selection, import and export of spreadsheet data, and printing of spreadsheet, etc. It is also provided with report data management functionality by defining what operations can be performed on the data displayed in a spreadsheet including such dynamic operations as sorting of report data, sub-totaling of report data, etc. Furthermore, the report viewer 215 is provided with functionality enabling the interpretation of metadata; and, functionality enabling communication with the Backplane (FIG. 4). The report viewer application 215 is able to accept messages telling it to display an image or text that may be passed by one of the applications in lieu of report data (e.g., Invoice, Broadband report, etc.)

All reporting is provided through the Report Viewer interface which supports spreadsheet, a variety of graphic and chart types, or both types simultaneously. The spreadsheet presentation allows for sorting by any arbitrary set of columns. The report viewer 215 is launched from the inbox client 210 when a report is selected and may also be launched from the inbox when a report is selected.

By associating each set of report data which is downloaded via the Inbox server 270 with a "metadata" report description object, reports can be presented without a report-specific presentation code. At one level, these metadata descriptions function like the catalog in a relational database, describing each row of a result set returned from the middle tier as an ordered collection of columns. Each column has a data type, a name, and a desired display format, etc. Column descriptive information will be stored in an object, and the entire result set will be described by a list of these objects, one for each column, to allow for a standard viewer to present the result set, with labeled columns. Nesting these descriptions within one another allows for breaks and subtotaling at an arbitrary number of levels. The same metadata descriptions can be used to provide common data export and report printing services. When extended to describe aggregation levels of data within reporting dimensions, it can even be used for generic rollup/drilldown spreadsheets with "just-in-time" data access.

The metadata data type may include geographic or telecommunications-specific information, e.g., states or NPAs. The report viewer may detect these data types and provide a geographic view as one of the graph/chart types.

As mentioned herein with respect to FIGS. 7 and 12, the StarODS component 400 interfaces with StarWRS web reporting tool 200 for specific customer reporting requirements. As described, the Report Requester 260 communicates with the user client 201 and controls navigation and requests for customization criteria via the Web browser. The Report Requestor receives from StarOE any billing hierarchies and static pick lists needed by the client to customize report requests. Report request customizations are then passed to the Report Manager, which acts as repository of report requests, both adhoc and recurring, that are submitted for processing by the client. Along with the necessary customization criteria selected for report customization, the Report Manager 250 stores metadata about the report request, including report format information, sort, and display specifics. The Report Manager is responsible for passing report requests to the back end DSS and data marts for processing, and provides the entity against which the list of report requests known to the data marts are validated.

The Inbox server component 270 is the store and forward repository of all completed reporting requests, requests for call detail data, and any communications to the customer. As will be described, the Decision Support Server 475 ships formatted data in a compressed comma delimited format ("CDF") to the Inbox. Customers are then responsible for retrieving their report data held in the Inbox.

In accordance with the invention, the primary function of the DSS 475 is to generate priced billing report data in accordance with the customer's request. To accomplish this, the DSS interfaces with two StarWRS systems: Report Manager 250, and Inbox 270, as shown in FIG. 7. The Report Manager formats the customer's request in accordance with a defined set of rules and sends the request to the DSS. The DSS 475 reads customer's requests which are metadata descriptions of the type of priced data report requested by a customer, translates the metadata into database queries, and implements commercial off-the-shelf ("COTS") tools to run the queries against the data in the data marts, format the query results into a form readable by StarWRS report viewing components, and transmits the completed reports to the directory of the customer's Inbox, e.g., via FTP. In the preferred embodiment, Talarian Smart-Sockets™ messaging middleware is used to coordinate report requests transmitted from the StarWRS report Manager to DSS, and report completion notification from DSS to the StarWRS Report Manager. The Report Manager formats the customer's request in accordance with a defined set of rules and sends the request to the DSS as a Talarian message with the Report Manager 250 maintaining the Talarian Sender program, and the Decision Support Server 475 maintaining the Talarian Receiver program. Messages are sent with guaranteed message delivery ("GMD"), thus assuring all request data sent by RM is received by the DSS.

Figure 13A:
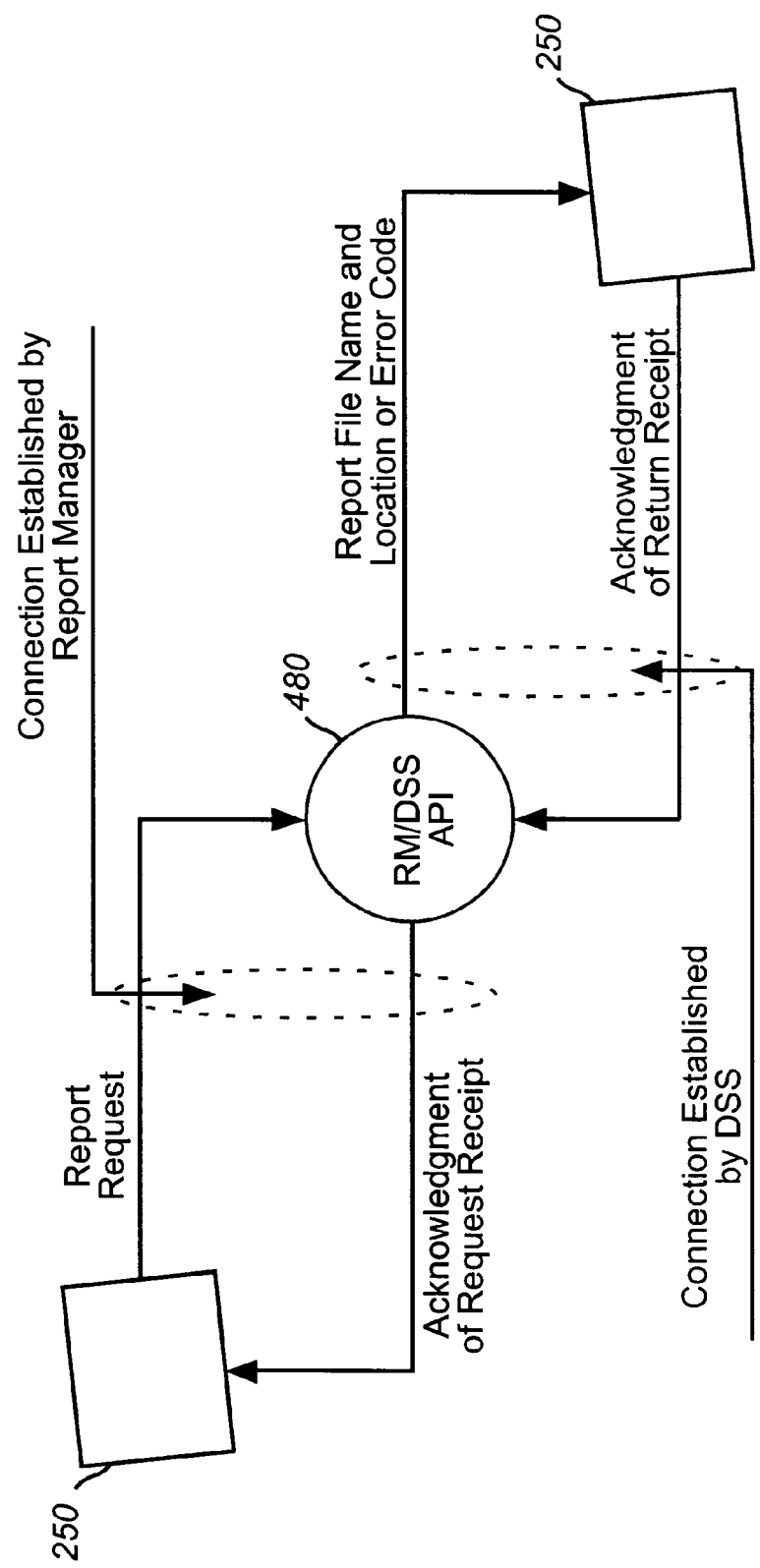
FIG. 13(a) illustrates the logical Report Manager/DSS application programming interface.

As depicted in greater detail in FIG. 13(a), a Report Manager/DSS application programming interface "API" 480 is provided whereby the RM server 250 publishes the message to the Decision Support Server in response to its receipt of a report request. Subsequently, the DSS 475 returns a "Message Received" message. When the DSS has processed the request, it publishes the message to the RM 250 with the name and location of the report file or an error message to the Report Manager, via an "NRL" metadata message as described herein.

Figure 13B:
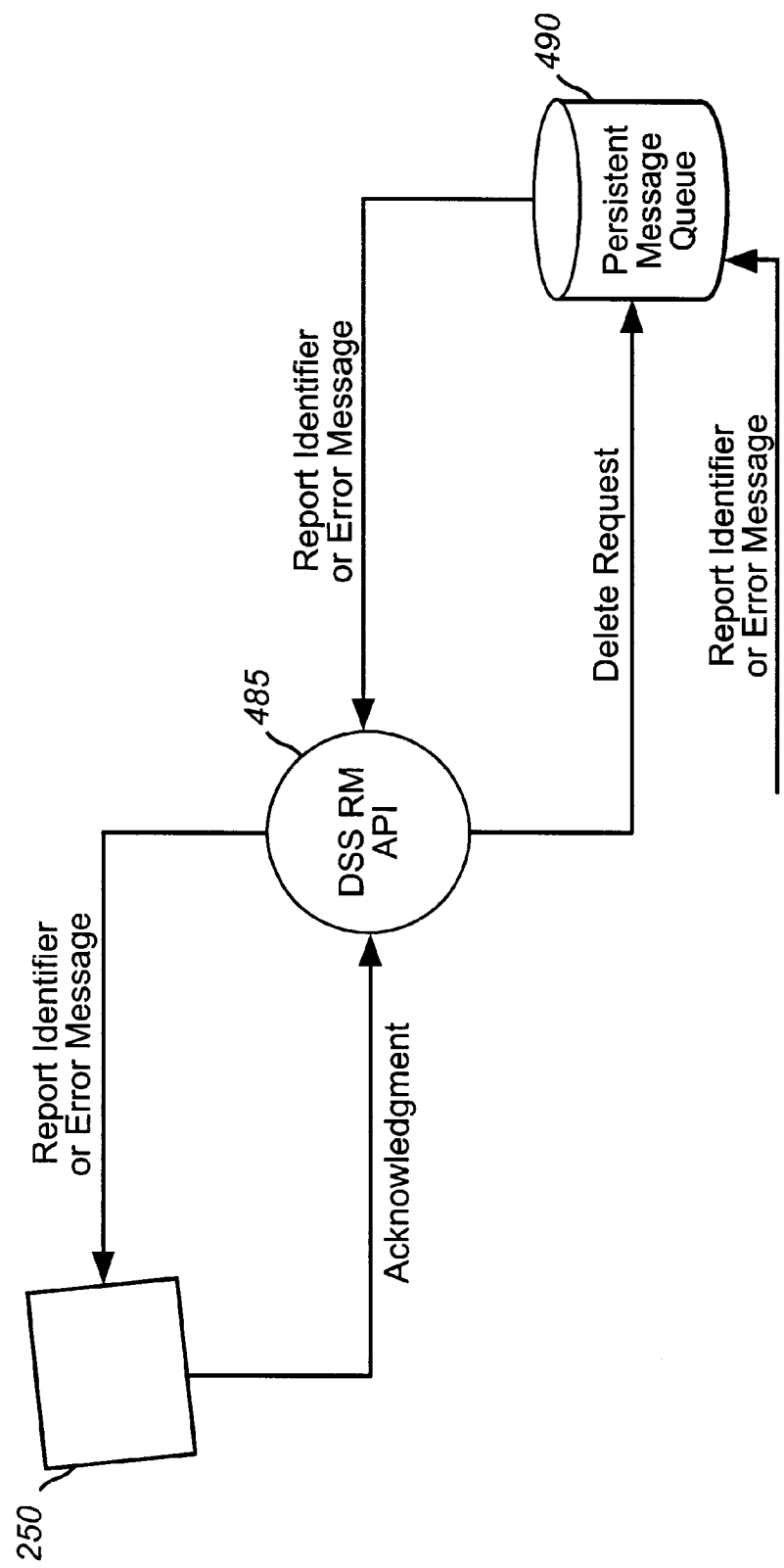
FIG. 13(b) illustrates the logical DSS/Report Manager application programming interface.

FIG. 13(b) illustrates an DSS/Report Manager application programming interface "API" 485. In the preferred embodiment, all return messages are persistent. Thus, as shown in FIG. 7 the DSS incorporates a Talarian message queue 490 operating on a First-In-First-Out (FIFO) basis. If the DSS is unable to establish the connection with Talarian, or there is an error in transmission, the DSS queues all messages, and continues to retry until a successful send is executed.

Similarly, a DSS/Inbox API is provided to manage FTP file transmissions including: error handling, retry logic, and the ability to maintain the file name and location of where report files are stored. Particularly, the DSS/Inbox API sends the report file to the inbox (FIG. 7). If the DSS has generated an error condition, and the report is unable to be generated, an error message will be sent to the inbox in place of the report file. In either case, a return message will be delivered to the DSS/Report Manager API 485 indicating a successful or unsuccessful generation and transmission of the report file.

Figure 15A:
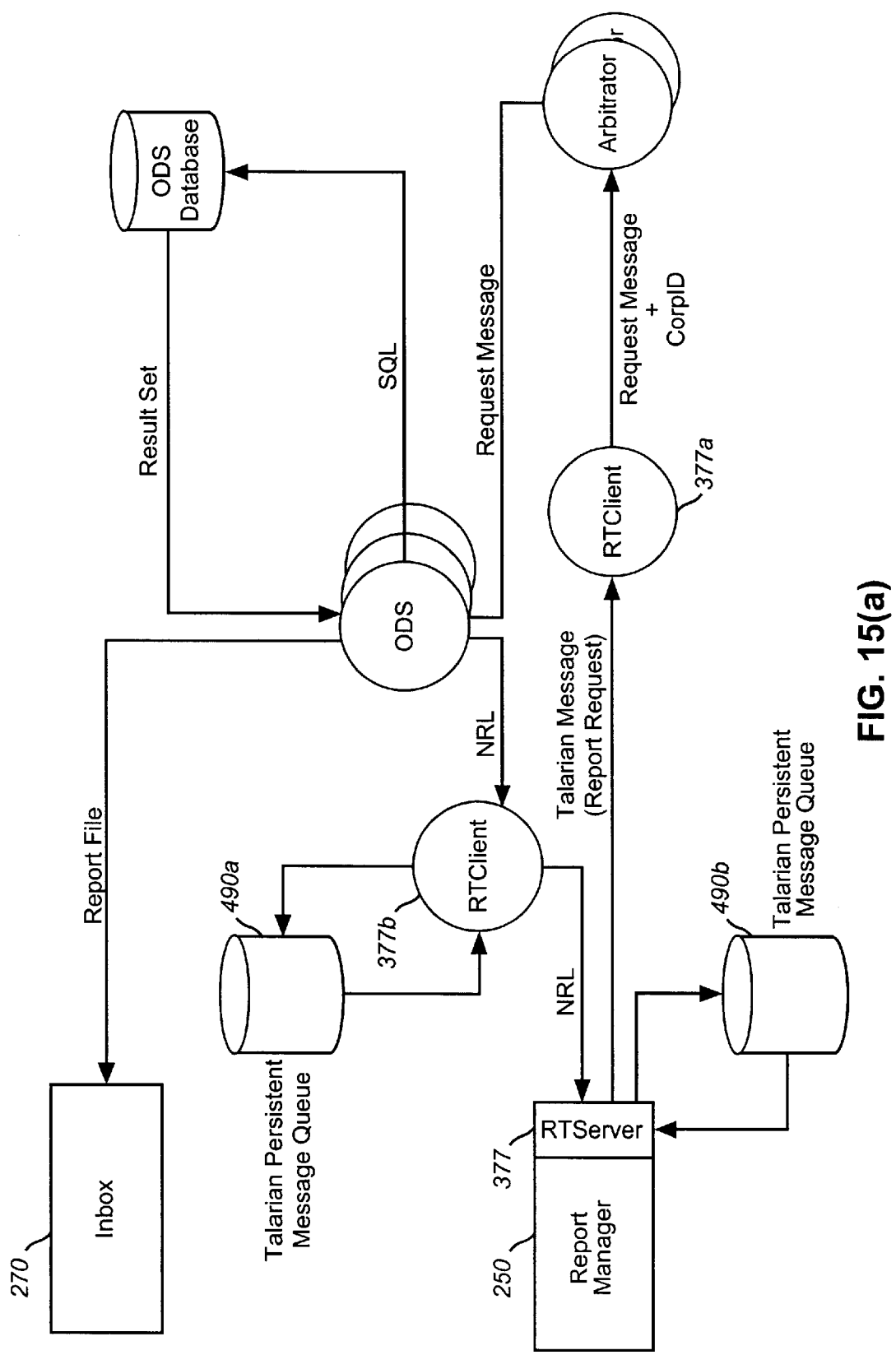
FIG. 15(a) illustrates an overview of the DSS connections enabling guaranteed message delivery in the nMCI Interact System.

More particularly, as shown in FIG. 15(a), an RTServer process 377 is provided for maintaining connections, ensuring guaranteed message delivery, and tracking the success of all messaging operations. As the Report Manager interfaces with multiple systems, the RTServer 377 processes are located in the RM. The DSS is provided with RTClient processes 377a,b that provides the API to RTServer: one RTClient 377a for providing the API to Report Manager for receiving messages; and, a second RTClient 377b for providing the API for the NRL. However, it should be understood that other ODS boxes can have one RTClient. The RM and Arbitrators 360a,b use the GMD feature of Talarian to deliver messages. RM/Inbox communication is not affected by outages of ODS server as the arbitrator and ODS communication is independent of RM/Inbox communication.

In the preferred embodiment, the DSS architecture is transparent to the Report Manager which publishes Talarian messages to which the DSS will subscribe. In addition to the tokenized character string request message which specifies report type, filters, and any customer request-specific information, RM server provides additional fields as part of the Talarian request message including: a Corp_ID, Priority, and RequestID. Corp_ID allows the DSS to route the request to the appropriate data store without having to invoke a parser. Data are partitioned on Corp_ID in the ODS database warehouse. Request_id is used to send back an ARDA failure message, in the event of an invalid message. The Priority field allows DSS to pickup the next high priority request from a queue of non-processed requests, without invoking the parser.

Figure 14A:
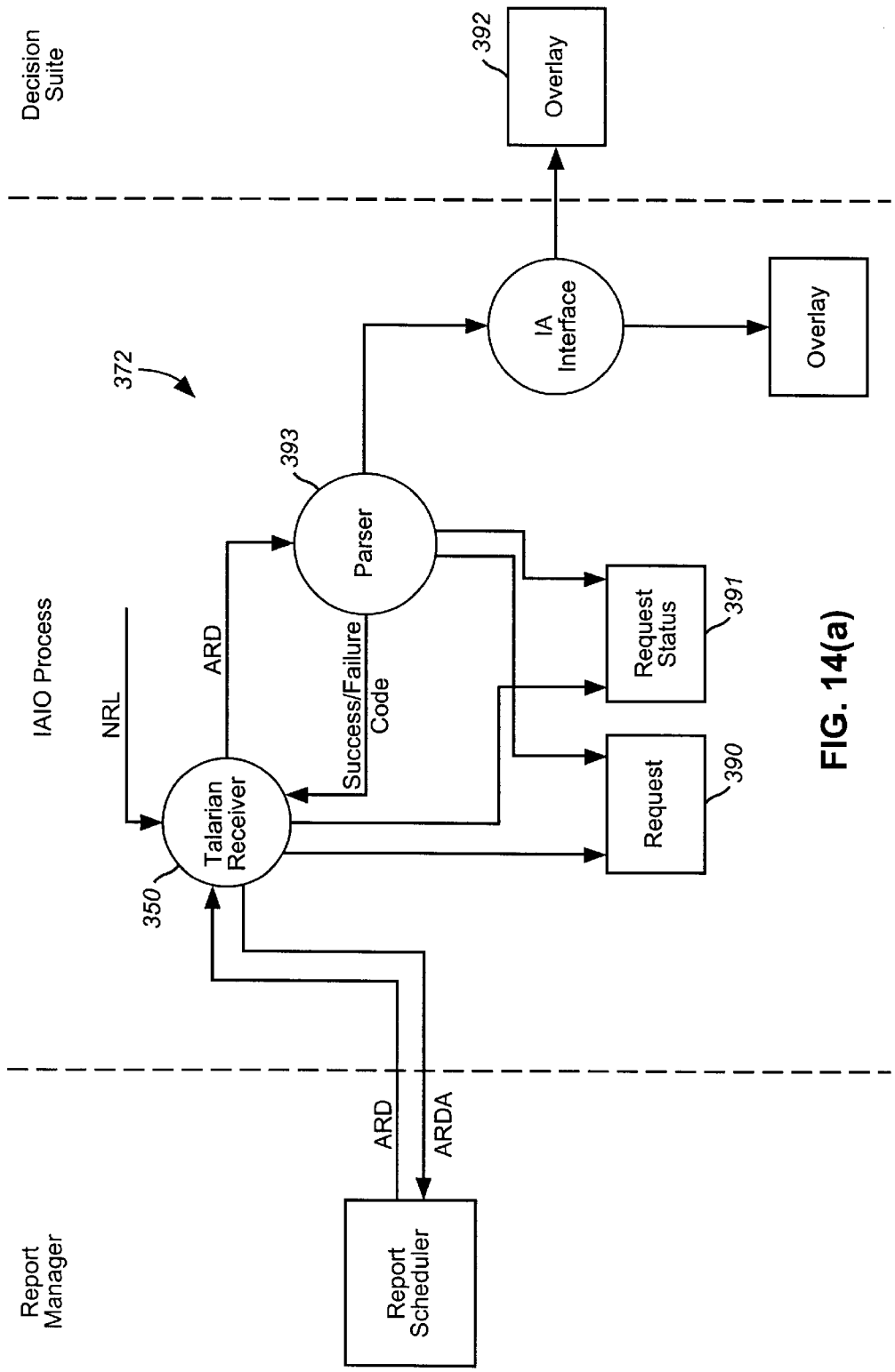
FIGS. 14(a)–14(b) illustrate an overview of the process performed by the DSS in routing a request.
Figure 14B:
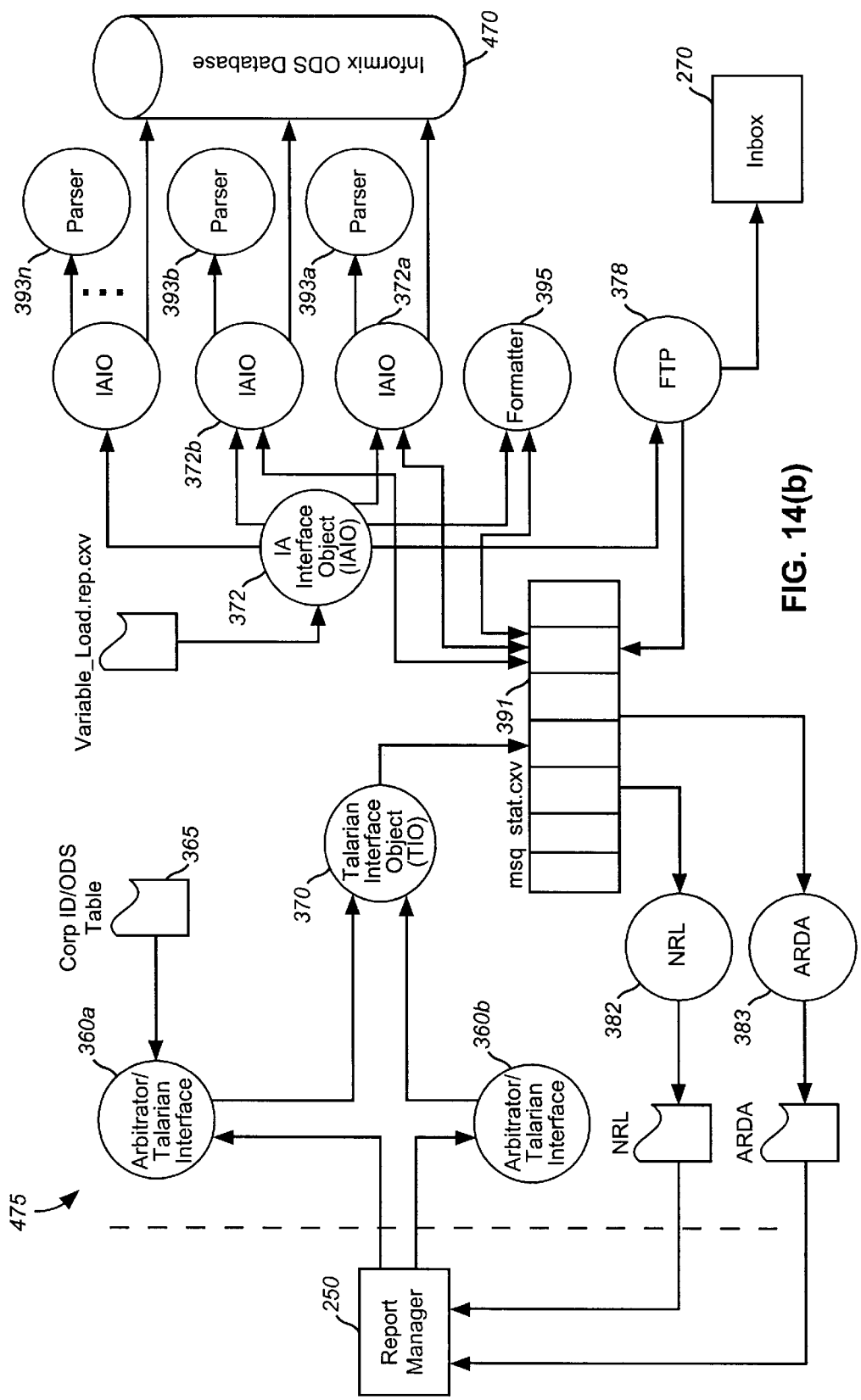

FIG. 14(b) illustrates the implementation of the COTS Information Advantage® Interface Object ("IAIO") 372, which is a process running in the DSS 475 for performing the following functions: 1) publishes and subscribes Talarian messages to Report Scheduler; 2) parses the request metadata ARD (Add Report Definition) message; 3) publishes an ARDA (Add Report Definition Acknowledgment); 4) populates a request table 390 with total, sub-total and sort information according to the received report request; 5) transforms the ARD tokens from the metadata request into an overlay file 392 which is a text file that is submitted to IA's Decision Suite™ process to generate the corresponding SQLs; 6) updates a Request Status table 391 with appropriate status, e.g., process complete, failed, in progress, etc.; and, 7) if a failure occurs, it updates an error log (not shown).

More particularly, in view of FIG. 14(b), ARD metadata request messages are received into the ODS system via arbitrator processes 360a,b which are responsible for routing the request message to the appropriate ODS database according to a Corp/ODS mapping table 365. Report Manager publishes a single message subject "Arbitrator" having the above-mentioned request, Corp_ID, and Priority field information. Report Manager uses a round robin message delivery mechanism complemented by Talarian's GMD to publish messages to the subject Arbitrator 360a,b. The arbitrator extracts the Corp_ID field from the message and maps the Corp_ID to corresponding ODS DataMart in the table 365 it maintains. The arbitrator then republishes the message with the ODS#. As shown in the FIG. 11(b), a second arbitrator process 360b is provided to assure failover capabilities.

In FIGS. 14(a) and 14(b), a Talarian receiver, referred to herein as a Talarian Interface Object ("TIO") 370, is a process that receives the Talarian message, manages the GMD functionality, and posts updates to the request table 390 and request status table 391. As shown in FIG. 14(b), the TIO receivers 370 subscribe to a subject "ODS#." The receiver inserts the message received from the arbitrator into the request table 390 and request status table 391 along with the priority, timestamp and status fields. The request status table resides on the ODS database and the messages are stored in the queue to provide queuing, log and tolerance from the failures. To determine the pending messages to be processed, status field and history_stat flags are used. Appendix "J" illustrates the contents of the ODS Request table 390 and Request Status tables 391, which are part of the ODS database.

In the preferred embodiment, the tables provided in Appendix J include: an "informix".request table 390 (FIG. 14(a)) which is the table maintained for the purpose of holding specific report request information from the received ARD message, and, an "informix".req_status for holding status of DSS processes for the current request.

Thus, for the example ARD message provided in Appendix J, the request table 390 will be populated to include: a "request_id," which is the unique identifier for the request; a "msg_desc," representing a copy of the ARD message; "unique_fname," which is the unique name assigned to each request to enable tracking of individual report requests and is additionally assigned to the report returned to the report manager; a "report_dir" indicating the location of the report that Decision Suite™ generates (which may be a tab delimited report file); "format_dir" indicating the location where the report formatter generates (comma delimited file); "inbox_dir" indicating the location on the Inbox (Report Manager) where the report is sent; "inbox_fsize" indicating the size of the file; "entpid," indicating the Enterprise id which may consist of one or more corporate id's; "userid" which is an identifier assigned to each user of the system; "stdrptid" which identifies each report and is similar to column id's but on the report level; "userptid" which is the user-assigned identifier for a report request; "compress" having possible values '1'=yes, '2'=no indicating if a report is to be compressed, e.g., using a standard zip routine; "threshold" defining the number of lines that shall appear on the report; "totalmode" which defines how the report shall be totaled, subtotaled as indicated by possible values '0'=No total, No subtotal; '1'=Only Subtotal; '2'=Only Total; '3'= Total and Subtotal; "nrl_totals" indicating the formatter to total the columns specified in the "*.hdr" file. These columns are numeric and have a subtotal flag='y' in a column id table; "format_columns" which define derived columns on which percentages are to be calculated; "error_code" for indicating parser failure or system failure. If it's a parser failure condition, the code is returned to Report Manager; "error_desc" indicating the error description; and, "rpmgr_columns" which are the columns sent to the DSS by Report Manager. The formatter checks this list against the list in the .hdr file.

Similarly, the Request_Status table 391 provided in Appendix J is populated to include the status of the different processes including: "Request_Id," i.e., the unique identifier for the request, "Priority," e.g., having a value of "1," for example, meaning adhoc; a "timestamp" which is the Informix Date Time that will be used when two or more messages have same priority; and "Status" which is a char message including the following status fields: "new_message" indicating that a new message has arrived, yet to be processed; "in_IAIO" status indicating that the message is being processed by interface process IAIO; "parser_failed" status indicating an Invalid message from RM. NRL process sends a ARDA error message; "parser_success" status indicating that the message from RM is a valid message. NRL process would send a ARDA message to RM; "IAIO_complete" status indicating that the report has been generated and directory and file name fields are modified. Formatter can pick up this message; "IAIO_failed" status indicating that IA has failed to generate a report, i.e., an error has occurred generating a report; "in_formatter" status indicating that the formatter is converting the text file generated by IA to a comma delimited format. The formatter may also, if required, does the percent (%) calculations, e.g., subtotals etc.; "format_success" status indicating that the formatter successfully completed translation of the file. It also populates the inbox file name, inbox file directory, nrltotal (optional) fields in the table; "format_failed" status indicating that the formatter failed to translate the text file generated by IA; "in_ftp". status indicating that the ftp process is currently sending the file to inbox; "ftp_success" status indicating that the file generated by formatter is ftp'd to inbox; "ftp_failed" status indicating that the formatted file could not be ftped to inbox; "in_NRL" status indicating that the NRL process is trying to send either ARDA message or NRL message to RM; "NRL_sent" status and "ARDA-sent" status indicating that the respective NRL or ARDA message has been sent to RM. Each DSS process updates the request status table as it processes.

A further "history_stat" field may be provided in the request_status table 391 having a value, e.g., 'A' (Active) indicating that the record needs to be processed, or, indicating 'H' (History), when the record is no longer active and needs to be archived in a separate database set up for archival purposes (not shown).

As further shown in Appendix J, there are two more tables that are defined for DSS sorting and formatting processes: a Column ID Table, and a Translation table which are tables configured for the formatter process, as will be described.

As further shown in FIG. 14(b), in operation, each Information Advantage® Interface Object ("IAIO") 372a,b, ... n reads the status table 391 for new entries. When a new entry is posted, it invokes a parser process 393, and invokes the Information Advantage® SQL generator engine which retrieves the requested data from the database, and updates the status table 391.

Particularly, the Decision Suite™ tool receives the overlay file (FIG. 14(a)) and performs the following functions: 1) generates SQL; 2) submits the SQL to the appropriate datamart (ODS database); 3) generates a Report file with a *.txt extension; 4) updates Request Status table 391 with appropriate status; and, 5) if a failure occurs, updates the error log. Following generation of the *txt file, a sort process is invoked to perform the following functions: 1) reads the Request table 390 for column(s) on which to sort the Report; 2) reads the *.txt file; 3) sorts the *.txt file and generates two files: i. a file with a *.hdr extension which file contains the header information, consisting only of only column id's, and, ii. a file with a *.data extension which file contains sorted data provided in the *.txt file and is the body of the Report; 4) it further updates the request status table with a 'success' or 'failure' code; and, 5) if a failure occurs, updates the error log.

As further shown in FIG. 14(b), continuously running FTP, NRL and ARDA processes are provided to take appropriate actions in accordance with the request status table entries. For example, an FTP process 378 performs the following functions: 1) reads the status table 391 for entries ready to be sent to the Inbox and FTP's the .csv or .txt to the inbox 270; 2) Determines success or failure of file transfer; 3) Updates the Request Status table 391; and, if a failure occurs, updates an error log.

The NRL (Notification of Report Location) process 382 performs the following functions: 1) reads the Request Status table 391 for any success status or failure of any process; 2) Invokes a receiver process with appropriate status and file location populated in the NRL; and, 3) If failure occurs, updates the error log are text files. Particularly, should an error occur in any of the DSS processes, an error log is updated. Error log directories may be delineated by process and day of week. Each new error generated by the same process in the same day appends the log with the new message. In either event, the NRL process returns the NRL message to Report manager indicating the status and location of any generated files.

As further shown in FIG. 14(b), an ARDA process 383 reads the status table 391 for parser failures. Should the parser fail due to insufficient or missing data, ARDA process will return an ARDA message to the Report Manager with the appropriate error code. In particular, the types of conditions that result in error messages being sent to the report manager and/or local log include: i) when the request message received from the Report Manager can not be parsed due to bad data or invalid format; ii) when the SQL can not be generated due to invalid request format or parameters; iii) system or process failure; iv) cannot query database due to a database failure; etc.

Figure 16A:
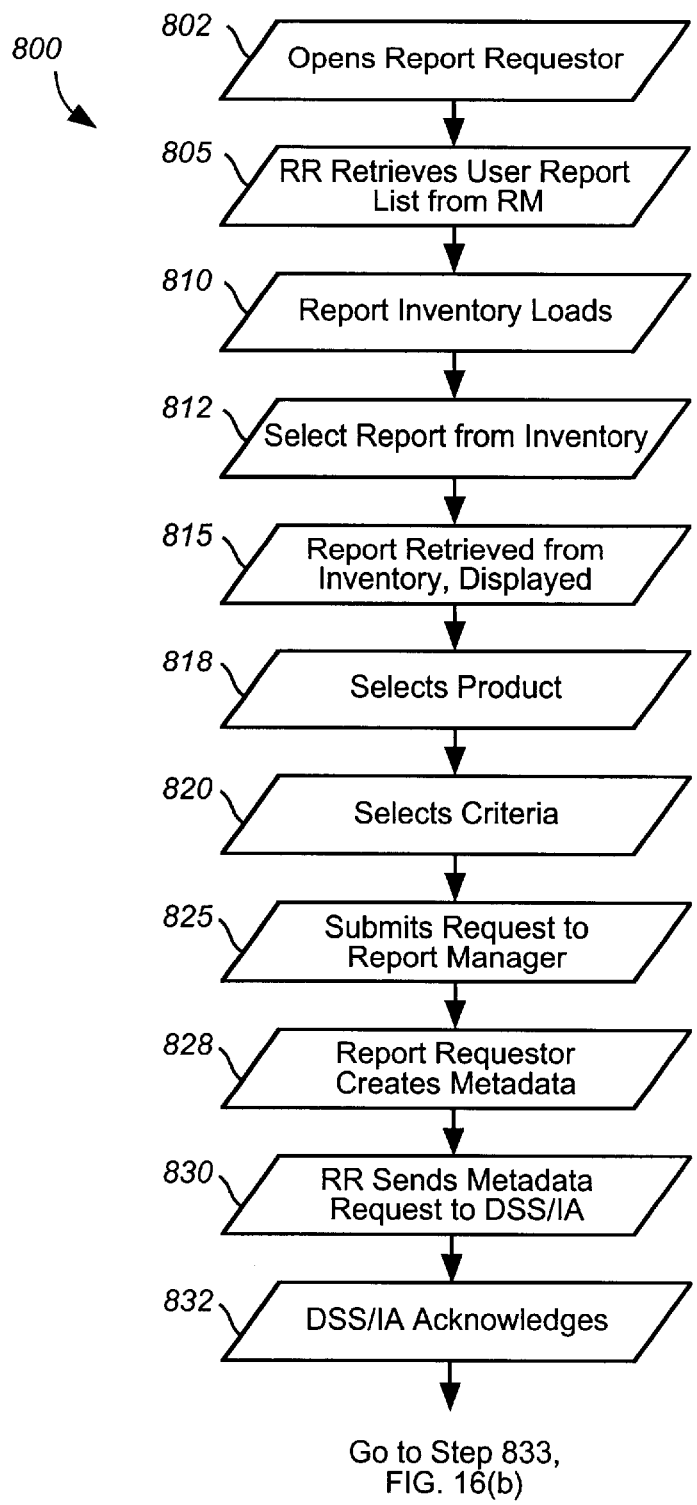
FIGS. 16(a)–16(c) illustrate the end-to-end process 800 for fulfilling priced report request.
Figures 16B, 16C:
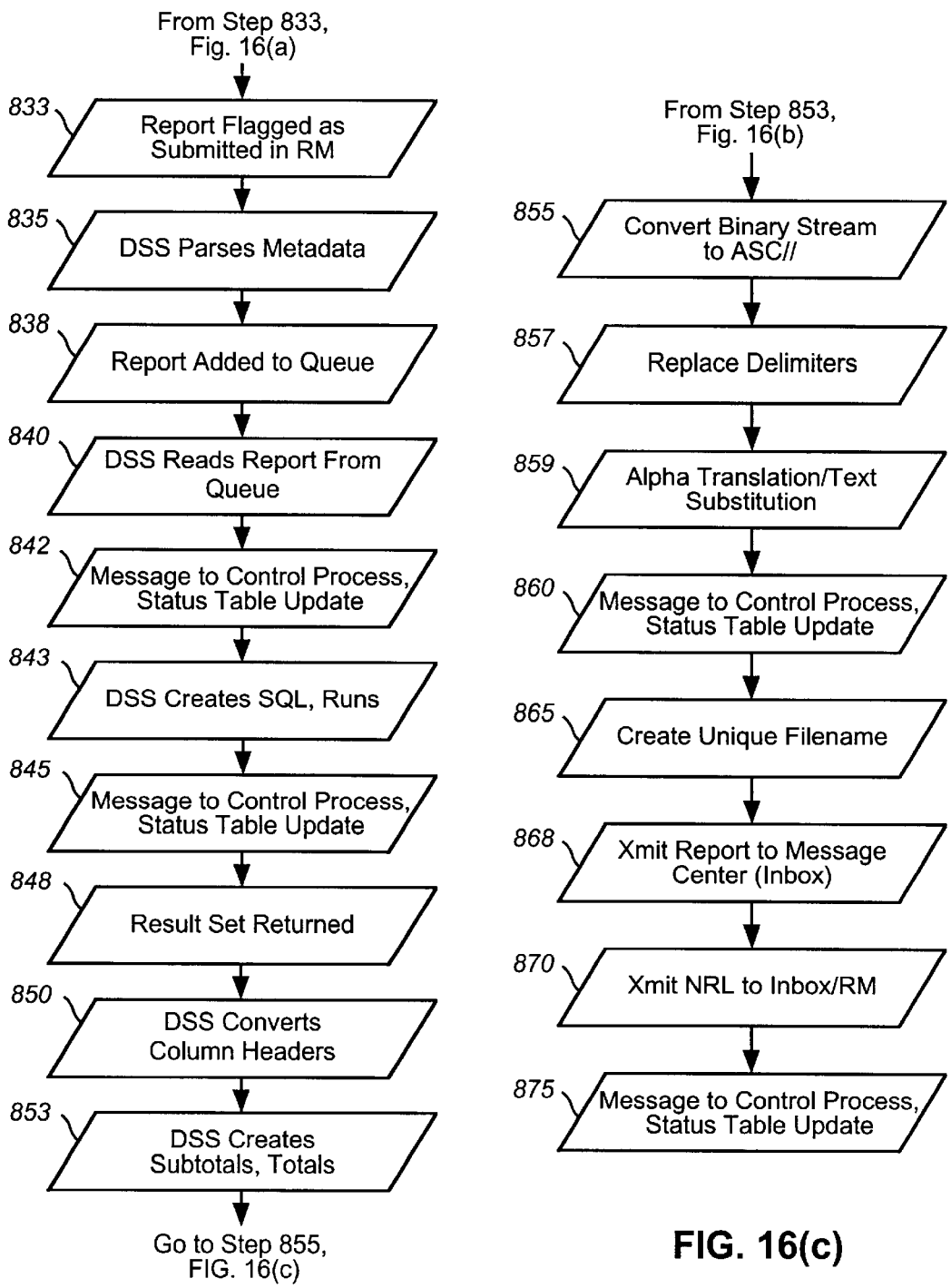

For Priced Reporting, the StarWRS report requestor functionality is invoked as described in above-referenced, co-pending U.S. patent application Ser. No. 09/159,409, filed Sep. 24, 1998 . Particularly, the end-to-end process 800 from a priced report request to report delivery is shown in FIGS. 16(a)–16(c). Specifically, a user first establishes communication with the DMZ Web server 44 and logs on to the nMCI Interact system by entering the user's name and password onto a logon dialog box. Then, an application running on the backplane directs a "Validate User Message" common object to the StarOE server 280 via the web server and dispatcher servers (FIG. 3) to direct the StarOE server 280 to perform security validation and authenticate the user ID and password in the manner as described in commonly owned, co-pending U.S. patent application Ser. No. 09/159,514, filed Sep. 24, 1998 , entitled AUTHENTICATION AND ENTITLEMENT OF WEB BASED DATA MANAGEMENT PROGRAMS, the contents and disclosure of which is incorporated by reference herein. It is understood that all communication to the StarOE server is via TCP/IP with a Unix process listening on a known TCP port. The StarOE server acts as a proxy when messages are sent from the Dispatcher server 46 and supports synchronous transactions. All data and security information is accessed by direct queries to a StarOE server database 283, such as provided by Informix. Once a user is logged on, the Web Server 44 (FIGS. 3 and 12) requests a current list of authorized applications from the StarOE server 285. Particularly, as described in co-pending U.S. patent application Ser. No. 09/159,408, filed Sep. 24, 1998, the contents and disclosure of which is incorporated by reference herein, a "Get User Application Request" message is communicated to the StarOE server via the backplane from the report requester which queries the Informix database to obtain a list of authorized applications, i.e., services, for the user and which determines which buttons on the home page are active, thus controlling their access to products. This information is downloaded by a GUI applet that is executed via the Backplane (FIG. 4) and incorporated into the home page that is presented to the user. An exemplary home page screen display 80 is shown in FIG. 5 which provides a list of icons 70 representing the possible options available to the user according to that customer's entitlements.

Appendix H of co-pending U.S. patent application Ser. No. 09/159,409, filed Sep. 24, 1998 provides the format and content of the nMCI Interact common objects downloaded to the Report Requestor client application to enable web-based reporting. As shown in above-referenced Appendix H, the Report Requestor first asks for common objects for a user's default timezone, language and currency. The Report Requestor objects are invoked to retrieve from StarOE the various customer entitlements relating to security, geographical hierarchy, billing hierarchy, and paging and e-mail notification, as further shown in Appendix H.

In response to selection of the Report Requestor icon, a display is generated to present the reporting options to a user in accordance with that user's entitlements as previously determined. It should be understood that in the preferred embodiment, the icons for applications the user has security access to are shown bolded. Thus, for a customer subscribing to nMCI Interact Priced Reporting, a Priced Reporting icon is automatically enabled when the home page appears.

Thus, upon selection of a Report Requestor icon 76 from the home page screen display 80 of FIG. 5, a StarWRS report requestor web page is presented to the customer. The backplane object allows the user access to the Report Requestor front end if the user is so authorized, and a client priced reporting application is downloaded to the customer who is presented with the Priced reporting dialog screen (not shown), as indicated at step 802 in FIG. 16(a). It is from this screen that the user is presented with priced reporting options to view/retrieve completed reports via the StarWRS Inbox, or create a new report or, modify an existing Priced call detail data report.

Particularly, from the Priced reporting dialog screen, the user is enabled to edit an existing report maintained in the report manager inventory, generate a new report, copy an existing report, or delete an existing report. For example, as indicated at step 805 (FIG. 16(*a*)), a user may initiate retrieval of the user report list containing existing user reports from the RM inventory, which process entails invoking the Report Requestor to initiate generation of a metadata request to download the report inventory from RM as indicated at step 810. The Report inventory for the specific user is loaded and displayed for the user on the user report request display screen, enabling the user to select a report, as indicated at step 812. Then, at step 815, the selected report is retrieved from StarWRS Report Manager and displayed for the customer.

Then, as indicated at steps 818 and 820, the customer may enter the desired reporting options and reporting criteria including: 1) the report product including toll-free, MCI Vision, and MCI Vnet options; 2) the report category which includes options for: analyzing traffic, call center, call detail, checking calling frequencies, financial, marketing, monitoring usage, and telecommunications categories for toll-free, Vnet and Vision customers; 3) the report type which includes priced call detail data or traffic data options; and 4) a report direction and which includes inbound, outbound, or both directions. Additionally, the user may select the report format associated with a reporting category.

Whether creating a new report or editing an existing report, the user is enabled to select customization options from successive dialog screens (not shown) that are presented to the user showing all the report customization categories for building a new report and/or editing an existing report. From this screen and related report building dialog boxes, all of the initial values for retrieving the MetaData, customization options and GUI builder options from the report manager server 250 necessary to build (edit) a report are provided in accordance with the user's entitlements. As described in greater detail in co-pending U.S. patent application Ser. No. 09/159,409, filed Sep. 24, 1998, a user may provide the following customization and report builder options: general customization options; layout customization options; access customization options; hierarchy customization options; geographic customization options; and, notification customization options.

In performing the report request process, as shown in FIG. 12, the Report Requestor client application 212 gains access to the Metadata stored at the Report Manager server 250 through messaging, as indicated at step 825. Particularly, as hereinafter described, a message generated by the Report Requestor in accordance with the user request is first received by the report manager proxy 250'. In the preferred embodiment, the report manager proxy comprises a set of tools in the form of reusable objects, preferably written in C++ code, or the like. For example, a parser object tool is employed to decompose the Metadata messages sent by the report requestor 212 to validate the message. If errors are found in the Metadata input, the RM will return an error message to the requesting client. If the Metadata passes the validation tests, the request type is then determined and the appropriate service will be invoked after which a standard response is sent back to the requesting client or and/or fulfilling server.

The Report Manager 250 implements stored procedures to translate the message, perform the request, and send the information back to the Report Requestor 212 which uses the metadata to determine what a standard report should look like, the customization options the user has, and the types of screens that should be used for the various options (i.e., single selection, multiple selections, etc.). It is understood that the selection of available standard template reports is based on the user's entitlements.

The following list provides the types of requests that may be initiated by the Report Requestor 212 and the responses performed by the Report Manager 250: 1) Get/Send report template list (GRTL/SRTL)—which request retrieves the list of all standard report templates for all products and is used only to obtain general report information, e.g., report title, description, etc.; 2) Get/Send report template detail (GRTD/SRTD)—which request retrieves the details of a specific standard report template; 3) Get/Send user report list (GURL/SURL)—which request retrieves the list of all user reports for the report format selected from a user report table and is used only as a request for general report information, e.g., report title, status, etc.; 4) Get/Send user report detail (GURD/SURD)—which request retrieves the details of a specific user's report; 5) Add report definition/Acknowledgment (ARD/ARDA)—which requests addition of a user-created report to a user report table. If the report is a scheduled report, this request is also communicated to the fulfilling server at the time the report is due; 6) Delete report definition/Acknowledgment (DRD/DRDA)—which request deletes a user-created report from the user table; 7) Copy report definition/Acknowledgment (CRD/CRDA)—which request creates a duplication of the report the user is editing (other than the report title) and creates a new report ID for it; 8) Update Reporting Schedule/Acknowledgment (URS/URSA)—which request updates the scheduling information on a report without having to send a Delete and Add request; and, 9) Get Pick List/Acknowledgment (GPL/GPLA)—which request enables the Report Requestor 212 to get a pick list provided by StarOE server.

In a preferred embodiment, as shown in Table 1, the interface message sent to the RM server 250 from the report requester via the Dispatcher server 46 comprises a three to four character message acronym followed by request specific parameters.

TABLE 1

| Parameter Name | Parameter Type | Required | Acceptable Value |
| --- | --- | --- | --- |
| Request | 3 or 4 Characters | Yes | Msg acronym |
| Data parms . . . | Characters | No | |

Table 2 illustrates the interface message format returned by the RM server 250.

TABLE 2

| Parameter Name | Parameter Type | Required | Acceptable Value |
| --- | --- | --- | --- |
| Response | Char (4) | Yes | Msg acronym |
| Error Code | Char (4) | Yes | 0 = OK or error |
| Data parms . . . | Char # | No | |

As shown in Table 2, the response message to be returned in Metadata format preferably includes a four character message acronym followed by an error code. A successful request (or a request acknowledgment) generates a response with an error code of "0". Additional data specific to the response follows this error code. If any server receives a message which is not known, the response message will echo the message acronym back along with an appropriate error code.

Appendix A provides a series of tables containing the content for each metadata message request that can be sent by the report requestor 212 for each of the enumerated user requests, in addition to the content of the corresponding metadata message responses by the RM server 250. As an example, when a user requests a list of all standard report templates that can be created for a specified product, category, and product type, e.g., toll free unpriced data, an example metadata format is as follows:

---
GRTL<PRODUCT=V,DATATYPE=R,DATACAT=P,IO=O>

--- where GRTL is the message name, the PRODUCT indicates the product type, e.g., V=Vnet, C=CVNS, S=Vision, T=toll free, F=Traffic view, etc. DATATYPE indicates the data type, e.g. R=reports, D=call detail, etc., and DATACAT represents the report category, e.g., P=priced, U=unpriced.

In the hereinafter described manner, the GRTL message is received by the StarWRS proxy server application 250' to enable the RM server 250 to perform the query into the RM Informix database having the data associated with the request. Specifically, after selecting the Report Requester from the browser or the Toolbar, a WRSApp object is launched. At its creation, the WRSApp object creates a DataManager object to guide the data and which initiates a CommunicationManager object to manage all communication between the client and the server. The Communication-Manager utilizes a RptManagerMsg object to create: 1) a GRTL; 2) a WRSCommWrapper for direct communication with the backend; and, 3) a WRSReportManagerUtilParser to format the data returned. In response, the Report Manager creates a Dispatcher object, which contains the business logic for handling metadata messages at the back-end and utilizes the services of a RMParser class. Upon determining that the client has sent a valid message, the appropriate member function is invoked to service the request. Upon receiving the message, the Report Manager creates the Parser object (RMParser) which takes the message apart and invokes a validation object which validates the message.

In response to the GRTL message, the data returned by the Report Manager server 250 for this particular request may include the following data in metadata format as follows:

---
SRTL<ERROR=0, REPORTS = <RptCategoryDescription1
=<RptTitle1.1, RptTemplateID1.1, RptCategoryType1.1>,
<RptTitle1.2, RptTemplateID1.2, RptCategoryType1.2>>,
<RptCategoryDescription2 =<RptTitle2.1,
RptTemplateID2.1, RptCategoryType2.1>, <RptTitle2.2,
RptTemplateID2.2, RptCategoryType2.2>>, . . .
<RptCategoryDescription#n=<RptTile#n.n,
RptTemplateID#n.n, RptCategoryType#n.n>, <RptTitle#n.n,
RptTemplateID#n.n, RptCategoryType#n.n>>>

--- wherein RptID# indicates a standard report template ID, RptTitle# indicates the standard report template title, Rpt-Category# indicates the report category, e.g. Monitor Usage, Analysis Traffic, Historical, Executive Summary, Call Detail, etc.; and, RptDescript indicates the standard report template description displayed to the user. Thus, for each Report Template Category, there will be the list of reports with each entry containing a Report Template Title, a Report Template Description and the Report Template ID.

The SRTL message is sent from the StarWRS RM proxy server to the report requestor for presentation to the customer. Specifically, the SRTL response is built inside the esql wrapper function after obtaining the necessary information through the stored procedure from the Report Manager Informix database. The Report Manager creates the RMServerSocket object and sends the SRTL message back to the client.

To retrieve details of the standard report template, the GRTD request message request is sent having content shown in the table in Appendix A. When specified, the Report ID field indicates an existing report that a user may wish to edit.

The SRTD response generated by the RM server is formatted in metadata as follows:

---
< Report Template ID=ID#,
NODE1=<node level1, label value1, assigned unique screen
identification1, >,
NODE2=<node level2, label value2, assigned unique screen
identification2, <control ID2.1, field value2.1, data
location2.1>, <control ID2.2, field value2.2, data
location2.2>, <..,..,..>>,
NODE#n<node level#n, label value#n, assigned unique
screen identification#n, <control ID#n.1, field
value#n.1, data location#n.1>, <control ID#n.2, field
value#n.2, data location#n.2>>

---

In the SRTD message, the MetaTreeData Label fields include such values as General, Report Name, Report Description, Scheduled Execution, etc. The MetaCtrlInfo MetaField Value fields may be blank or may contain the selection options available to the user. This information is taken from the report template database.

As another example, when a report request is submitted to retrieve a full list of user created reports from a user report table, i.e., a template list for a particular report product, category, and type, the example metadata format is as follows:

---
GURL<USERID=jeanvnet2,RPTTMPID=1,ENTPID=00022924,
PRODUCT=T,DATACAT=U>

--- with UserID and ReportTemplateID fields specified. Specifically, this process entails invoking the Communication Manager object to communicate with the RM server in order to obtain a SURL metadata message. The CommunicationManager utilizes the RptManagerMsg object to create: 1) a GURL, 2) a WRSCommWrapper for direct communication with the backend, and, 3) a WRSReportManagerUtil-Parser to format the data returned. The parser returns a hash table containing the User Report List. At the RM server, the Report Manager creates an Dispatcher object that contains the business logic for handling metadata messages at the back-end and utilizes the services of the RMParser class. Upon determining that the client has sent a valid message, the appropriate member function is invoked to service the request. The Report Manager, upon receiving a message, creates a Parser object (RMParser) which takes the message apart and invokes a validation object which validates the message.

In response to the GURL request, the data returned is taken from a user report table in the RM server database. The generic SURL message in Metadata format returned by the RM server 250 includes the following information:

```
REPORTS = <UserRptCategory1 = <UserRptTitle1,
UserRptID1, activeflag, report type, statusdate >>,
<UserRptCategory2 = <UserRptTitle2, UserRptID2,
activeflag, report type, statusdate>>, ...
<UserRptCategory#n = <UserRptTitle#n, UserRptID#n,
activeflag, report type1 statusdate>>>
``` wherein for each user report category, there is a list of reports where each entry contains a UserRptID# indicating a user-defined report template ID, a UserRptTitle# indicating the user's report template title, and a UserRptCategory# indicating the user report category. Specifically, the SURL response is built inside an esql wrapper function after obtaining the necessary information through a stored procedure from the Informix database. The Report Manager creates the RMServerSocket object and sends the SURL message back to the client.

To retrieve the details of a specific user's report, the GURD message is sent having data as contained in the table shown in Appendix A. Specifically, when the user selects a report from the Inventory List on the Report Requestor, a Communication Manager object is invoked to communicate with the RM server in order to obtain a SURD metadata message. The CommunicationManager object first utilizes the RptManagerMsg object to create: 1) a GURD metadata message, 2) a WRSCommWrapper for direct communication with the backend, and 3) the RSReportManagerUtil-Parser to format the data returned. The parser organizes the data into a series of nodes which are utilized to create the report builder tree on the report requester customization screen. Later this data will be extracted from the node and used to construct the screen related to the node. The Report Manager server creates the MCIDispatcher object which contains the business logic for handling metadata messages at the back-end and utilizes the services of the RMParser class. Upon determining that the client has sent a valid message, the appropriate member function is invoked to service the request. The Report Manager, upon receiving a message, creates the Parser object (RMParser) which takes the message apart, invokes a validation object which validates the message and builds a response inside the esql wrapper function after obtaining the necessary information through the stored procedure from the Informix database. The Report Manager creates the RMServerSocket object and sends the SURD/SRTD message back to the client. The responsive SURD metadata message corresponding to a retrieve user report detail (GURD) request has the following metadata syntax:

```
< Report Template ID=ID#,
NODE1=<node level1, label value1, assigned unique screen
identification1, >,
NODE2=<node level2, label value2, assigned unique screen
identification2, <control ID2.1, field value2.1, data
location2.1>, <control ID2.2, field value2.2, data
location2.2>, <..,..,..>>,
NODE#n=<node level#n, label value#n, assigned unique
screen identification#n, <control ID#n.1, field
value#n.1, data location#n.1>, <control ID#n.2, field
value#n.2, data location#n.2>, <..,..,..>>,
```

This response thus may include the report information having detailed items including: UserReportID (UserID), User's report name (UserName), product (UserProd), Threshold (UserThreshold), User Report Description (UserDescript), Report Columns (UserFields), Report column headings (UserHeaders), and, in addition, customization options with fields indicating, inter alia, columns to display (UserHeaders), user-defined criteria (UserCriteria), a sort order (UserOrder) and scheduling selections (UserSched), the last update of this report (UserLastUpdate) and, the Report status (if adhoc) (UserStatus), etc.

If a request is made to add a user-created report to a User_report table maintained by the RM Server 250 and the RS server 260, the ARD metadata message having fields defined in the table provided in Appendix A is processed by the RM server 250, as indicated at step 828, FIG. 16(a). An example message in metadata format to initiate the addition of a user-created report for ODS (Inbound/Outbound) reporting data is as follows:

```
ARD<USERID=jeanvnet2,ENTPID=00022924,STDRPTID=90,NAME=Ci
ty Summary Outbound,PRODUCT=S,CATEGORY=Analyze Traffic,
THRESHOLD=<RECCOUNT=20>,SCHEDULE=A<START=199806020000,EN
D=199807151200>,RANGETYPE=1,SCHEDTYPE=A,TIMEZONE=45,BILL
ING=INBOUND<<90000003,90000003><NA,NA><NA,NA>>INBOUND<<9
0000004,90000004><NA,NA><NA,NA>>,CARDNO=<654654*~5465465
465465465>,IDAC=<46546546*~1246>,GEO=GEO<<001,001
USA/WORLDZONE1><NA,NA><NA,NA><NA,NA><NA,NA>>GEO<<001,001
USA/WORLDZONE1><CO,CO><NA,NA><NA,NA><NA,NA>>,OACCESS=<4~
1>,ODISTRANGE=<A~F>,OUSAGE=<5~4>,SORTBY=<54D>,DESCRIPTIO
N=This report summarizes call detail by the terminating
city and state (USA) / province (CA). The report is
based on the date/time ranges and report criteria
selected.,COLUMNS=<54~55~67~62~36~61~58~63~64~66~65>,ACT
IVE=1,TOTALMODE=0,EMAIL=0,PAGE=0, LANG=1234, CURR=2345>
```

In this example, the "NAME" field refers to the Report Name (e.g., city summary); the "PRODUCT" field refers to the report product (Vision); the "THRESHOLD" field refers to the record count; the "DESCRIPTION" field refers to the report description; the "COLUMNS" refers to the number of columns specified for a report by the user; the "BILLING" field refers to the specified report billing entitlement, i.e., billing hierarchy; the "IACCESS" field refers to the inbound access type and the "OACCESS" refers to the outbound access; the "SORTBY" field indicates the report column sorting customization with "A" indicating column(s) having data to be sorted in ascending order and, "D" indicating column(s) having data to be sorted in descending order; the "SCHEDULE" field referring to the scheduling type, e.g., with "A" indicating an ad-hoc report, and the user specified date range on which to report as indicated by the "START" and "END" fields, and additionally, the scheduling frequency information in the case of a recurring report; the SUBTOTALCOLUMNS field, referring to the report columns having data to be subtotaled; and, the "EMAIL" and "PAGE" fields indicating reporting notification via e-mail or paging, respectively.

Furthermore, for each of the metadata messages in Appendix A, including the Delete Report Definition (DRD), copy report definition (CRD), and update report scheduling (URS) messages, the report manager server 250 responds to the Report Requestor with the processing results. In the case of a copy report, a new User Report ID is assigned and returned by RM. When editing an existing StarODS (priced call data) report, the user may make changes to the Report Title, the Report Description, the Report scheduling, the 800 numbers and thresholds, and may customize number of rows, report columns, access codes, access types, billing location, geographic location, paging notification, and e-mail notification. More specifically, when the user selects a report from the inventory list or a new report, an WRSEdit Screen is launched to provide the editing capabilities which are available for the report format. WRSedit guides the screens through the process of retrieving the screens' data. Some of the screens need data which has not yet been retrieved, such as 800 numbers or geographic locations. These screens manage the requests to the DataManager object to create the get pick list (GPL) message (Appendix A), which launches the CommunicationManager object to perform this task. The CommunicationManager utilizes the RptManagerMsg object to create the GPL, the WRSCommWrapper for direct communication with the backend, and the WRSReportManagerUtilParser to format the data returned. In response, the Report Manager server creates the MCIDispatcher object and invokes the MCIRMParser class. Upon determining that the client has sent a valid message, the appropriate member function is invoked to service the request. The Report Manager, upon receiving a message, creates the Parser object (RMParser) which takes the message apart and a validation object is invoked which validates the message. The response is built inside the esql wrapper function after obtaining the necessary information through the stored procedure from the Informix database. The Report Manager creates the RMServerSocket object and sends the GPLA message back to the client.

Having described the functionality of selecting and/or generating a report and customizing it, reference is now had to the process for running the report request in StarODS. Particularly, in the preferred embodiment, the user may select a save and exit report option, or a save and run report option. In either scenario, an WRSEdit object enables a WRSScnMgr object to save the report to the RM server. The WRSScnMgr object launches each screens save method which communicates with the DataManager object to place the screens data in its corresponding WRSNode. Once all of the WRSNode objects have been updated, the WRSScnMgr object calls the DataManager object's SaveReport method to build a hash table to contain all of the report's data. The CommunicationManager utilizes the RptManagerMsg object to create the ARD metadata message from the hash table, the WRSCommWrapper for direct communication with the backend, and the WRSReportManagerUtilParser to handle any errors thrown by the server. The Report Manager creates the Dispatcher object, and utilizes the services of the RMParser class and validation objects. Upon determining that the client has sent a valid message, the appropriate member function is invoked to service the request. The response is built inside the esql wrapper function after obtaining the necessary information through the stored procedure from the RM database. The Report Manager creates the RMServerSocket object and sends the ARDA message back to the client.

As illustrated in FIG. 16(*a*), at step 830, in reference to user selection of a Save and Run report option, the report is marked as scheduled and saved in a user_table in the Report Scheduler server 260 via the Report Manager. Subsequently, as indicated at step 630, the Report Scheduler server 260 generates an ARD message (Appendix D) and sends the ARD message to StarODS DSS server for which the DSS has a predefined interface, as described herein.

Next, as indicated at step 832, the DSS receives the request and acknowledges receipt. Specifically, when the request is received it is first validated with StarOE to ensure that the user is entitled to receive information about the selected product corp and number(s). Once the request passes validation, the DSS IAIO reads the header to determine which Data Mart will ultimately be queried. It then parses the metadata into a format which the COTS software can readily convert into a SQL statement, as indicated at step 835, FIG. 16(*b*), and adds the report to the DSS report queue based upon type (Daily, Weekly, Monthly, Adhoc) and associated DataMart, as indicated at step 638. It should be understood that at this point, the request has been flagged as submitted in the RM database, as indicated at step 633.

From this point forward, DSS activity is controlled by a control process and progress or errors are logged internally in the DSS system. This control process includes logic enabling the prioritization of report requests and application of rules defining the order in which they should be executed. Thus, at the appropriate time, depending on the type or report, reporting period and other parameters, the Information Advantage query engine selects the report from the queue, as indicated at step 840, which action is logged in the report status table (Appendix J) as indicated at step 842. The SQL statement is then built by Decision Suite™ and routed to the appropriate data mart for execution in the manner as described herein, as indicated at step 843. The query engine generates the SQL statement from the metadata and executes the report which action is logged in the report status table as indicated at step 845. Next, as indicated at step 848, the query results are returned, and, a post-SQL formatting process is invoked.

Figure 15B:
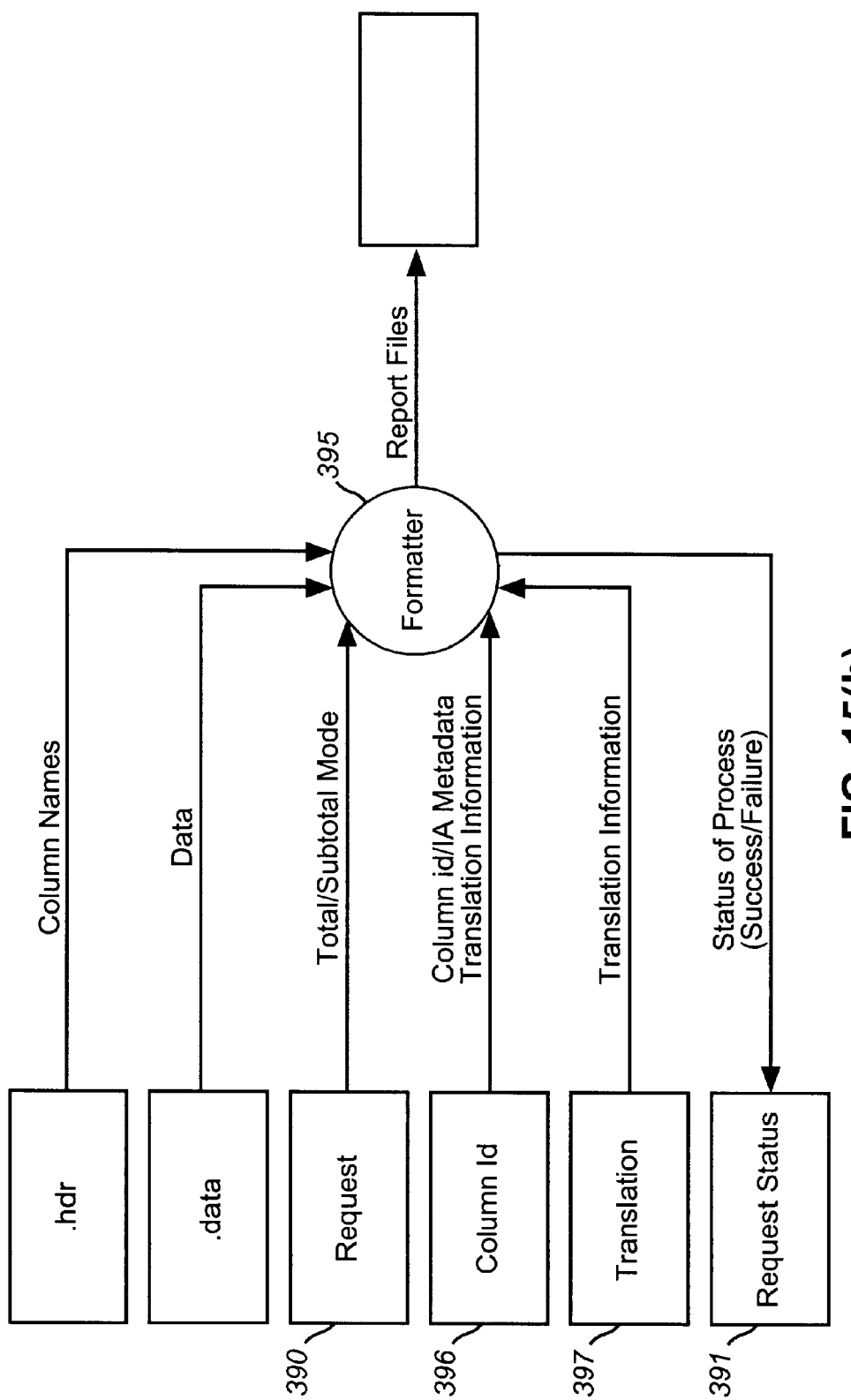
FIG. 15(b) illustrates the formatter process implemented in the DSS server.

More particularly, as shown in FIG. 15(*b*), a Formatter module 395 may perform various report result transformations including: 1) Converting of column headers generated by Information Advantages into appropriate column ids that are recognizable to the StarWRS client viewer functionality (as indicated at step 850, FIG. 16(*b*)); 2) Provide subtotaling for specific requested "subtotal by" columns in the format required by the StarWRS client interface (as indicated at step 853, (FIG. 16(*b*)) and provides report-based totals as requested by customer; 3) converting binary stream data file to ASCII text file (as indicated at step 855, FIG. 16(*c*)); 4) implementing Replace logic, e.g., replacement of "TAB" delimiters with appropriate "Comma" field delimiters (as indicated at step 857 FIG. 16(*c*)); 5) implementing Repeat/Padding logic, i.e., identifying compressed columns/values and decompressing (or repeating) the values that were compressed; 6) providing alphanumeric translations for any encoded data elements returned in the result set data file (as indicated at step 859, FIG. 16(*c*)); and, 7) adding new computed/derived columns, e.g., percents, averages of column data values, etc., as requested by customers on specific reports.

Particularly, as shown in FIG. 15(*b*), the Formatter process 395 reads the *.hdr files and *.data files from the Decision Suite™ result set to obtain respective column names and report data. Particularly, the formatter process for converting Column Headers from Information Advantage® column header names to column ids implements a lookup of column ids in a column_id's table, shown in Appendix J, based on column header names.

Then, the formatter process reads the request table 390 for total/subtotal, threshold, etc. information associated with the current report request and determines any other formatting features to be enabled for a particular result set. As shown in the example Request Table of Appendix J, parameters passed to the formatter module indicate any report request specific details that are required by the Formatter. For example, for report totals, a "total-mode" variable is used to indicate if report totals and/or sub-totals should be included. Particularly, Column IDs representing the data columns upon which subtotaling is based are passed as parameters to the Formatter process 395 and are referred to as "Break Columns". At appropriate changes in values for these break columns, the formatter generates a subtotal line for subtotaling the applicable additive facts including, for example, Call Amount, Call Duration, and Call Count.

Furthermore, the formatter reads a Column id table 396 (detailed in Appendix J) to determine data types and if any data translations are needed.

As computed/derived columns may be included or excluded from customer report requests, the Formatter process 395 for calculating new computed/derived columns on specific customer-requested reports are provided on a report request basis. Example types of derived columns include: 1) Percents, e.g., based on the additive data facts pertinent to the report request and are typically based on report totals and row amounts for Call Amount, Call duration, and Call Count; 2) Row-wise derived data elements as requested, which represent data elements computed based on original additive data elements on a row by row basis (i.e., column x/column y for each row in the result data file) and typically include average calculations such as Average # of Minutes per Call, Average Amount per Call, and Average Amount per Minute. Appendix J illustrates a derived column "percent" calculation indicated in the Column ID table showing an equation for calculating a value of a particular value (C36) divided by a column total (CT36)×100.

The Formatter process 395 may additionally perform alphanumeric translations for any encoded data elements returned in the result set data file by implementing appropriate lookup in a Translation table 397, such as the example Translation Table provided in Appendix J, and replacing the code.

Referring back to FIG. 16(c), after formatting the report, as indicated at step 860, a message is sent to the control process to update the request status table 391. It should be understood that, if a failure occurs during formatting, the error log is updated and a status message sent to the request status table 391, as well. Then, as indicated at step 865 (FIG. 16(c)), the formatter 395 creates a *.csv (Comma Separated Value) or .txt file, gives the file a unique name and saves the file. Preferably, a *.csv is the file generated if the report is successfully generated.

As indicated at step 868, the *.csv report/data file is then "pushed", implementing FTP, to the StarODS server's directory on the Inbox server 270. The StarODS server 400 is responsible for generating unique file names within their directory on the Inbox server 270. For example, the following directory and file naming conventions used for reports generated by the StarODS server are labeled inbox\files\ods with text files having the suffix *.txt or *.txt zip (compressed), and comma separated files having a suffix *.csv or *.csv_zip (compressed).

Finally, as indicated at step 870, once the file has been successfully transferred to the Priced reporting directory on the Inbox server, and the request status table 391 appropriately updated at step 875, the NRL process (FIG. 14(b)) generates and transmits an NRL message to the RM Server 250 notifying it of the report file name and location in the Inbox, requester information, and if the transfer was successful. This is accomplished by using a "NRL" metadata message.

Appendix B provides a table comprising the Notify Report Location parameters used for the NRL Metadata messaging sent by StarODS fulfilling server to the RM Server 250 when a requested report is complete. An example NRL message sent from the ODS server 400 to the RM server 250 is as follows:

NRL<TYPE=Sim-Msg-40,ENTPID=00022924,USERID=dorod,
STDRPTID=40,USERRPTID=3415,REQUESTID=20341,COMPRESS=0,
LOC=/inbox/files/testODS/STDRPTID43TM_082598_084920.CSV,
FSIZE=389,PRESORTED=0>

An NRLA response is sent back to the DSS as shown in Appendix B.

Once the RM server 250 has received the NRL message from the fulfilling server, it verifies the file's presence and builds a metadata file, e.g., by compressing the appropriate metadata (for displaying the report) into a .MTD file. This .MTD file is utilized by the Report Viewer to know how to display the report. The Report Manager server creates a file including the metadata using the same file name as the report/data file, but having the following suffix: *.mtd or *.mtd_zip indicating a metadata or compressed metadata file, respectively.

Appendix F details the parameters that are passed in the GET METADATA messaging for indicating to the Report Viewer how to display a requested report. For example, a GET METADATA message corresponding to an Priced TVS fulfilling server report is as follows:

<METADATA=<CRITERIA=<Name=UsageSummary292^ADescription=
This report summarizes calls based on call type.^A
Report_Level=<INBOUND<<90000001,90000001><NA,NA><NA,NA>>
INBOUND<<90000002,90000002><,><,>>>^AOptions=^AScheduling
_Information=^AOne_Time=^ADates=<06/01/199800:00/~07/01/1
99800:00,>^ATimezone=EST,Lang=1234,Curr=2345>DEFAULT_GRAP
H_MODE=0^ADEFAULT_GRAPH_TYPE=0^ADEFINE_X_AXIS=0
^AX_AXIS_COLUMN=^ADEFAULT_Y_COLUMNS=<>^A
COLUMN_DISPLAY_ORDER=<105^A114^A67^A62^A36^A61^A58^A63^A6
4^A66^A65>^ASORT_ALLOWED=1^APRESORTED=0^A -continued

```
PRESUBTOTALED=1^ATOTALMODE=0^ASORT_COLUMN S=<105A>^A
SUBTOTAL_COLUMNS=<>^ASELECTED_SECTION=0^A
METACOLUMN=<META_COLUMN_ID=105^A
COLUMN_LABEL=Usage Description^ADATATYPE=S^ADECIMAL=0^A
HIDEABLE=1^AGRAPHABLE=0^AWIDTH=20^ACALCULATE=0^A
CALCULATE_EXPRESSION=>^AMETACOLUMN=<META_COLUMN_ID=114^A
COLUMN_LABEL=Range/DistanceDescription^ADATATYPE=S^ADECIM
AL=0^AHIDEABLE=1^AGRAPHABLE=0^AWIDTH=20^ACALCULATE=0^A
CALCULATE_EXPRESSION=>^AMETACOLUMN=<META_COLUMN_ID=67^A
COLUMN_LABEL=Calls^ADATATYPE=I^ADECIMAL=0^AHIDEABLE=1^A
GRAPHABLE=1^AWIDTH=7^ACALCULATE=0^ACALCULATE_EXPRESSION=>
^AMETACOLUMN=<META_COLUMN_ID=62^ACOLUMN_LABEL=% Calls^A
DATATYPE=N^ADECIMAL=1^AHIDEABLE=1^AGRAPHABLE=1^AWIDTH=7^A
CALCULATE=0^ACALCULATE_EXPRESSION=>^A
METACOLUMN=<META_COLUMN_ID=36^ACOLUMN_LABEL=Minutes^A
DATATYPE=N^ADECIMAL=1^AHIDEABLE=1^AGRAPHABLE=1^AWIDTH=8^A
CALCULATE=0^ACALCULATE_EXPRESSION=>^A
METACOLUMN=<META_COLUMN_ID=61^ACOLUMN_LABEL=% Min^A
DATATYPE=N^ADECIMAL=1^AHIDEABLE=1^AGRAPHABLE=1^A
WIDTH=5^ACALCULATE=0^ACALCULATE_EXPRESSION=>^A
METACOLUMN=<META_COLUMN_ID=58^ACOLUMN_LABEL=Amount^ADATAT
YPE=C^ADECIMAL=2^AHIDEABLE=1^A
GRAPHABLE=1^AWIDTH=7^ACALCULATE=0^ACALCULATE_EXPRESSION=>
^AMETACOLUMN=<META_COLUMN_ID=63^ACOLUMN_LABEL=% Amt^A
DATATYPE=N^ADECIMAL=1^AHIDEABLE=1^AGRAPHABLE=1^AWIDTH=5^A
CALCULATE=0^ACALCULATE_EXPRESSION=>^A
METACOLUMN=<META_COLUMN_ID=64^ACOLUMN_LABEL=Avg Min/Call
^ADATATYPE=N^ADECIMAL=2^AHIDEABLE=1^AGRAPHABLE=1^A
WIDTH=12^ACALCULATE=0^ACALCULATE_EXPRESSION=>^A
METACOLUMN=<META_COLUMN_ID=66^ACOLUMN_LABEL=Avg
Amt/Call^A
DATATYPE=N^ADECIMAL=2^AHIDEABLE=1^AGRAPHABLE=1^AWIDTH=12
^A CALCULATE=0^ACALCULATE_EXPRESSION=>^A
METACOLUMN=<META_COLUMN_ID=65^ACOLUMN_LABEL=Avg Amt/Min^A
DATATYPE=N^ADECIMAL=2^AHIDEABLE=1^AGRAPHABLE=1^A
WIDTH=11^ACALCULATE=0^ACALCULATE_EXPRESSION=>>>
*<METADATA= <CRITERIA= <Name=My Report, Total=Totals are
located at the bottom of the report., Description=My
report description, Number_Dialed=<800#1, 800#2, 800#n>,
Scheduling_Information= Recurring, Dates= Monthly>>
DEFAULT_GRAPH_MODE=1, DEFAULT_GRAPH_TYPE=1,
DEFINE_X_AXIS=1, X_AXIS_COLUMN=2,
DEFAULT_Y_COLUMNS=<5,6>,
COLUMN_DISPLAY_ORDER=<1,2,3,4,5,6>,
COLUMN_STORED_ORDER=<4,3,2,5,6,1>, SORT_ALLOWED=1,
PRESORTED = 1, TOTALMODE=3, SUBTOTCOL=<5,6>, SELECTED
SECTION=1, METACOLUMN=<META_COLUMN_ID=1,
COLUMN_LABEL=name, DATATYPE=S, DECIMAL=0, HIDEABLE=1,
GRAPHABLE=0, WIDTH=10, CALCULATE=1,
CALCULATE_EXPRESSION=<4 / 7>>>>
```

Once the metadata file corresponding to the requested report is build by the Report Manager, the RM ftp's the .MTD file to the Inbox server. The RM server additionally updates a User_report table status field with a status "C" indicating completion.

Once the Report Manager has updated the status field, the RM server 250 then adds the report to the user's Inbox.

Appendix C provides a table showing the fields for the metadata messaging between the RM server 250 and the Inbox server 270 for adding an item into the StarWRS system Inbox server 270, and the respective acknowledgment message format back from the Inbox server. In the "A" message found in Appendix C, the "LOC" field includes information about where the report data is located. For example, a metadata message indicating to the Inbox server that a priced ODS server report is available is shown as:

```
A<CATEGORY=R,TYPE=traffic,REQUESTID=32197,USERID=
LynneLevy2,RPTID=150,PRIORITY=,COMPRESS=0,UNOTIFY=
0,MMADDR=,MMTEXT=,PGT=,PGPIN=,PGTXT=,RPTCATEGORY=
Service Location & Hour,
LOC=/inbox/files/ods/902512294STDRPTID10.CSV,ENTP
ID=10324488,RQSTDT=1998-01-02
15:18,FSIZE=3705,RPTTITLE=Summary by Service
Location and Hour,MSIZE=3322>
```

Particularly, the RM server supplies a metadata "A" message to the Inbox indicating the FTP file location. Via the report viewer, the report is now available for viewing, downloading, saving, or printing by the user, and as described in further detail in co-pending U.S. patent application Ser. No. 09/159,512, filed Sep. 24, 1998, entitled MULTI-THREADED WEB BASED IN-BOX FOR REPORT MANAGEMENT, the contents and disclosure of which are incorporated by reference as if fully set forth herein. Particularly, as shown in the exemplary nMCI home page in FIG. 4, the nMCI Interact Message Center icon 77 may be selected which will cause the display of a web page including the message center dialog window. From the message center dialog window, a user may select from among three tabs, one of which, a reports tab, enables the retrieval of both a data file and a metadata file from the Inbox Server corresponding to those reports that have been run and available for customer viewing. Information provided for display by the message center display 325 is provided by the User_table which keeps track of the status of all reports for a particular user. By double-clicking a chosen report, a report viewer application is enabled to display the chosen report on a web-page. To view the report the user selects the report and, the report metadata and the appropriate viewer are uploaded to the user (client) workstation.

Figure 17:
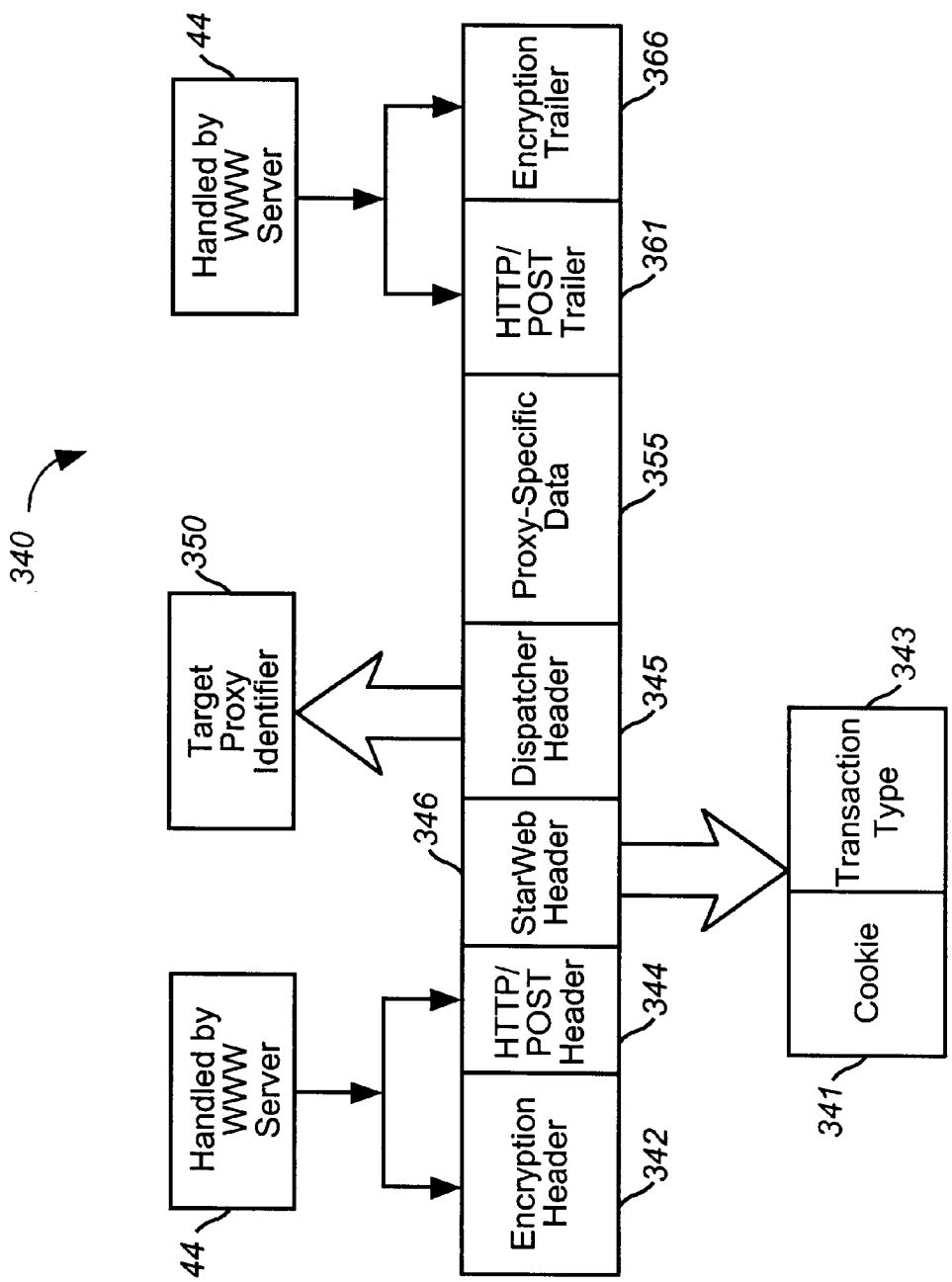
FIG. 17 illustrates a logical message format sent from the client browser to the desired middle tier server for a particular application.

As mentioned herein with respect to FIG. 3, the messages created by the client Java software are transmitted to the StarWeb (DMZ) Server 44 over HTTPS. For incoming (client-to-server) communications, the DMZ Web servers 44 decrypt a request, authenticate and verify the session information. The logical message format from the client to the Web server is shown as follows:

| || TCP/IP || encryption || http || web header || dispatcher header || proxy-specific data || |
| --- | where "||" separates a logical protocol level, and protocols nested from left to right. FIG. 17 illustrates a specific message sent from the client browser to the desired middle tier server for the particular application. As shown in FIG. 17, the client message 340 includes an SSL encryption header 342 and a network-level protocol HTTP/POST header 344 which are decrypted by the DMZ StarWeb Server(s) 44 to access the underlying message; a DMZ Web header 346 which is used to generate a cookie 341 and transaction type identifier 343 for managing the client/server session; a dispatcher header 345 which includes the target proxy identifier 350 associated with the particular type of transaction requested; proxy specific data 355 including the application specific metadata utilized by the target proxy to form the particular messages for the particular middle tier server providing a service; and, the network-level HTTP/POST trailer 361 and encryption trailer 366 which are also decrypted by the DMZ Web server layer 44.

After establishing that the request has come from a valid user and mapping the request to its associated session, the request is then forwarded through the firewall 55b over a socket connection 33 to one or more decode/dispatch servers 46 located within the corporate Intranet 60. The messaging sent to the Dispatcher will include the user identifier and session information, the target proxy identifier, and the proxy specific data. The decode/dispatch server 46 authenticates the user's access to the desired middle-tier service.

As shown in FIG. 17, the StarWeb server forwards the Dispatcher header and proxy-specific data to the Dispatcher, "enriched" with the identity of the user (and any other session-related information) as provided by the session data/cookie mapping, the target proxy identifier and the proxy-specific data. The dispatch server 46 receives the requests forwarded by the Web server(s) 44 and dispatches them to the appropriate application server proxies. Particularly, as explained generally above with respect to FIG. 12, the dispatch server 46 receives request messages forwarded by the DMZ Web servers and dispatches them to the appropriate server proxies. The message wrappers are examined, revealing the user and the target middle-tier service for the request. A first-level validation is performed, making sure that the user is entitled to communicate with the desired service. The user's entitlements in this regard are fetched by the dispatch server from Order Entry server 280 at logon time and cached. Assuming that the Requestor is authorized to communicate with the target service, the message is then forwarded to the desired service's proxy, which, in the accordance with the principles described herein, comprises: 1) a report manager proxy 250' corresponding to the RM Server 250, 2) a report scheduler proxy 260' corresponding to the RS Server 260, and 3) an inbox server proxy 270' corresponding to the Inbox Server 270. Each of these proxy processes further performs: a validation process for examining incoming requests and confirming that they include validly formatted messages for the service with acceptable parameters; a translation process for translating a message into an underlying message or networking protocol; and, a management process for managing the communication of the specific customer request with the middle-tier server to actually get the request serviced. Data returned from the middle-tier server is translated back to client format, if necessary, and returned to the dispatch server as a response to the request.

Figure 18A:
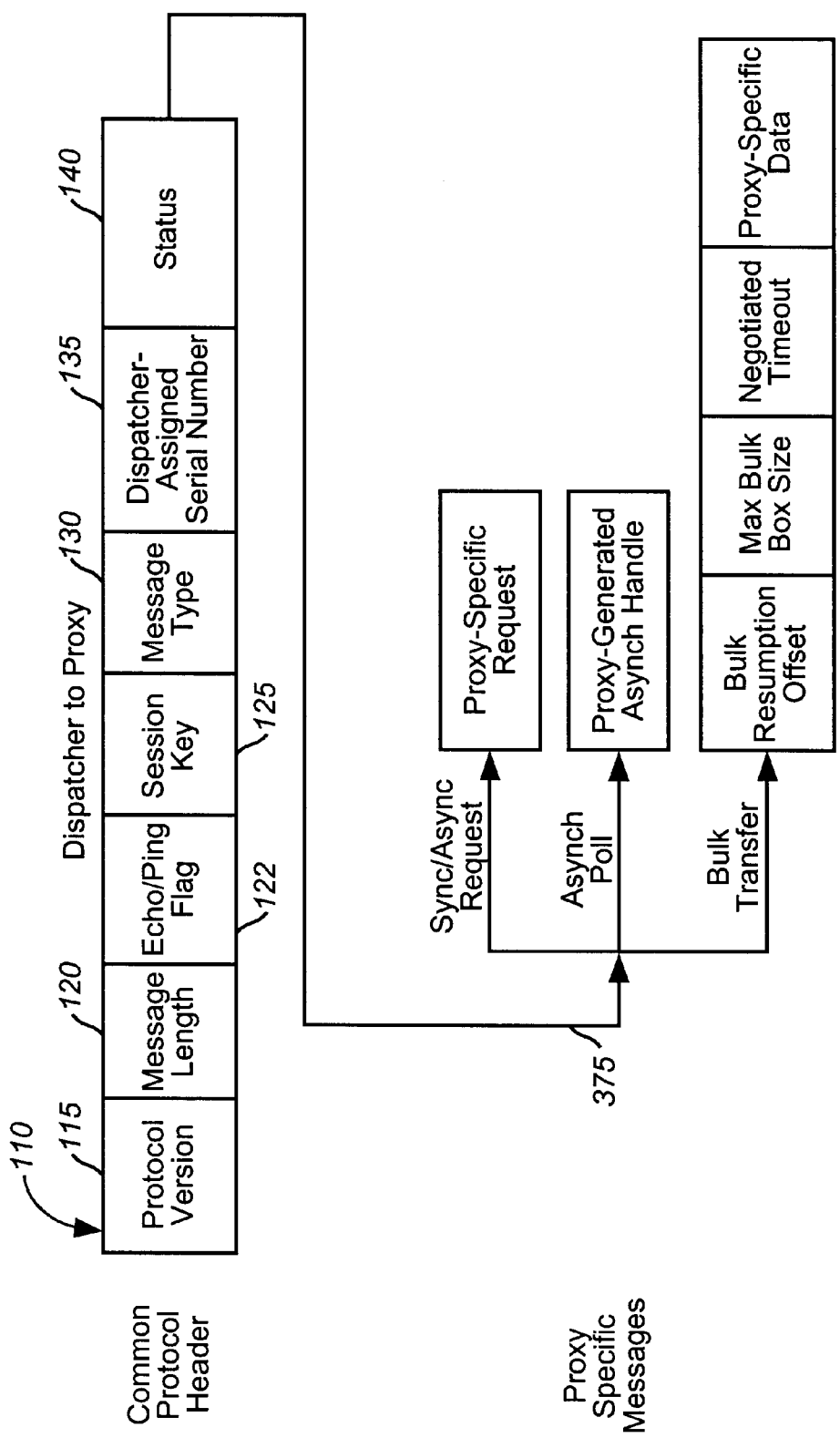
FIGS. 18(a) and 18(b) are schematic illustrations showing the message format passed between the Dispatcher server and the application specific proxy (FIG. 18(a)) and the message format passed between the application specific proxy back to the Dispatcher server (FIG. 18(b)).
Figure 18B:
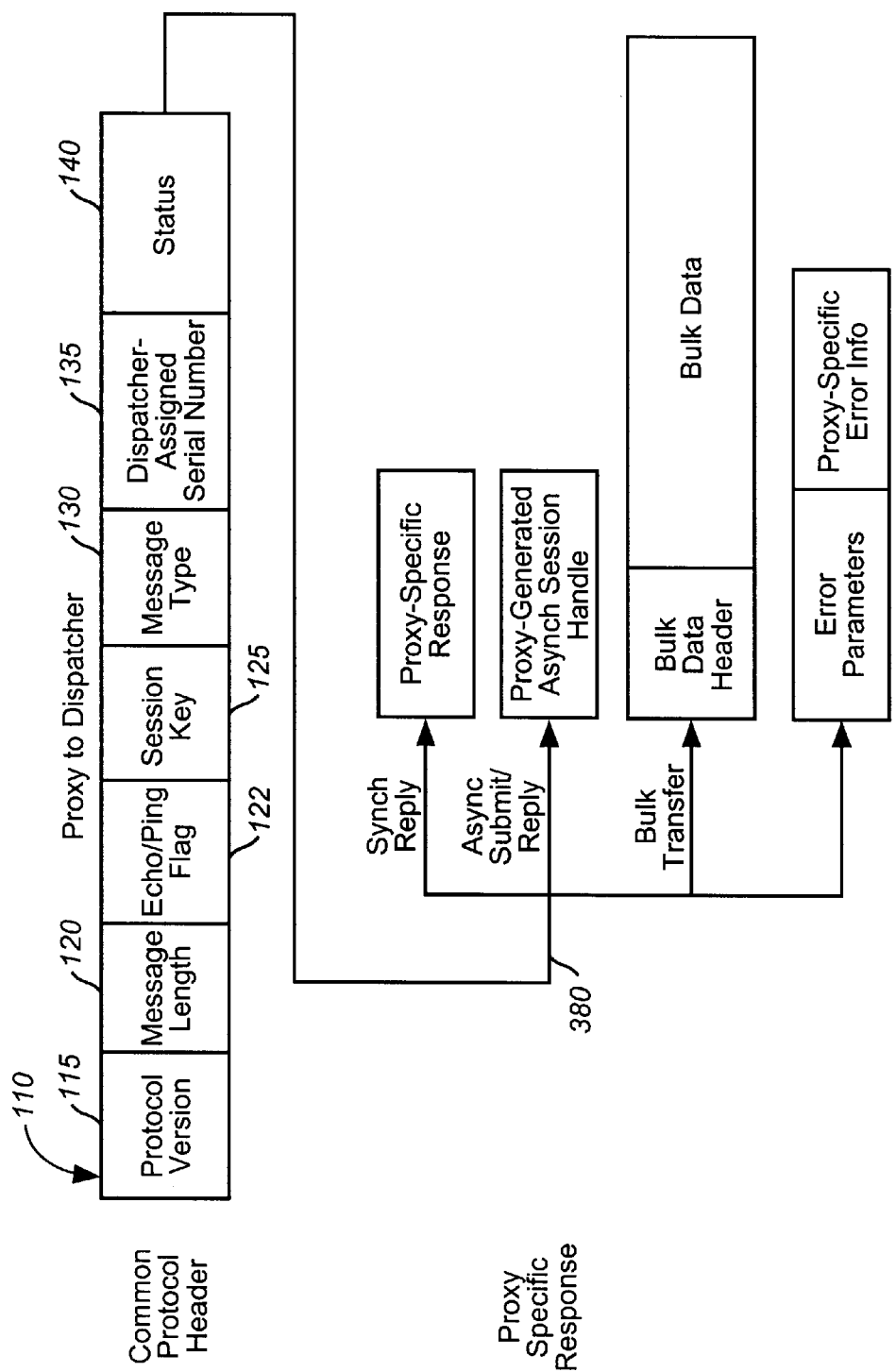

FIGS. 18(a) and 18(b) are schematic illustrations showing the message format passed between the Dispatcher 46 and the application specific proxy (FIG. 18(a)) and the message format passed between the application specific proxy back to the Dispatcher 46 (FIG. 18(b)). As shown in FIG. 18(a), all messages between the Dispatcher and the Proxies, in both directions, begin with a common header 110 to allow leverage of common code for processing the messages. A first portion of the header includes the protocol version 115 which may comprise a byte of data for identifying version control for the protocol, i.e., the message format itself, and is intended to prevent undesired mismatches in versions of the dispatcher and proxies. The next portion includes the message length 120 which, preferably, is a 32-bit integer providing the total length of the message including all headers. Next is the echo/ping flag portion 122 that is intended to support a connectivity test for the dispatcher-proxy connection. For example, when this flag is non-zero, the proxy immediately replies with an echo of the supplied header. There should be no attempt to connect to processes outside the proxy, e.g. the back-end application services. The next portion indicates the Session key 125 which is the unique session key or "cookie" provided by the Web browser and used to uniquely identify the session at the browser. As described above, since the communications middleware is capable of supporting four types of transport mechanisms, the next portion of the common protocol header indicates the message type/mechanism 130 which may be one of four values indicating one of the following four message mechanisms and types: 1) Synchronous transaction, e.g., a binary 0; 2) Asynchronous request, e.g., a binary 1; 3) Asynchronous poll/reply, e.g., a binary 2; 4) bulk transfer, e.g., a binary 3.

Additionally, the common protocol header section includes an indication of dispatcher-assigned serial number 135 that is unique across all dispatcher processes and needs to be coordinated across processes (like the Web cookie (see above)), and, further, is used to allow for failover and process migration and enable multiplexing control between the proxies and dispatcher, if desired. A field 140 indicates the status is unused in the request header but is used in the response header to indicate the success or failure of the requested transaction. More complete error data will be included in the specific error message returned. The status field 140 is included to maintain consistency between requests and replies. As shown in FIG. 18(a), the proxy specific messages 375 are the metadata message requests from the report requester client and can be transmitted via synchronous, asynchronous or bulk transfer mechanisms. Likewise, the proxy specific responses are metadata response messages 380 again, capable of being transmitted via a synch, asynch or bulk transfer transport mechanism.

It should be understood that the application server proxies can either reside on the dispatch server 46 itself, or, preferably, can be resident on the middle-tier application server, i.e., the dispatcher front end code can locate proxies resident on other servers.

As mentioned, the proxy validation process includes parsing incoming requests, analyzing them, and confirming that they include validly formatted messages for the service with acceptable parameters. If necessary, the message is translated into an underlying message or networking protocol. A list of Report Manager and Inbox proxy error messages can be found in Appendix E. If no errors are found, the proxy then manages the communication with the middle-tier server to actually get the request serviced. The application proxy supports application specific translation and communication with the back-end application server for both the Web Server (java applet originated) messages and application server messages.

Particularly, in performing the verification, translation and communication functions, the Report Manager server, the Report Scheduler server and Inbox server proxies each employ front end proxy C++ objects and components. For instance, a utils.c program and a C++ components library, is provided for implementing general functions/objects. Various C++ parser objects are invoked which are part of an object class used as a repository for the RM metadata and parses the string it receives. The class has a build member function which reads the string which contains the data to store. After a message is received, the parser object is created in the RMDispatcher.c object which is file containing the business logic for handling metadata messages at the back-end. It uses the services of an RMParser class. Upon determining that the client has sent a valid message, the appropriate member function is invoked to service the request. Invocation occurs in MCIRMServerSocket.C when an incoming message is received and is determined not to be a talarian message. RMSErverSocket.c is a class implementing the message management feature in the Report Manager server. Public inheritance is from MCIServerSocket in order to create a specific instance of this object. This object is created in the main loop and is called when a message needs to be sent and received; a Socket.c class implementing client type sockets under Unix using, e.g., TCP/IP or TCP/UDP. Socket.C is inherited by ClientSocket.C:: Socket (theSocketType, thePortNum) and ServerSocket.C:: Socket (theSocketType, thePortNum) when ClientSocket or ServerSocket is created. A ServerSocket.c class implements client type sockets under Unix using either TCP/IP or TCP/UDP. ServerSocket.C is inherited by RMServerSocket when RMServerSocket is created. An InboxParser.c class used as a repository for the RM Metadata. The class' "build" member function reads the string which contains the data to store and the class parses the string it receives. After a message has been received, the MCIInboxParser object is created in inboxutl.c which is a file containing the functions which process the Inbox requests, i.e, Delete, List, Fetch and Update (Appendix G). Additional objects/classes include: Environ.c which provides access to a UNIX environment; Process.c which provides a mechanism to spawn slave processes in the UNIX environment; Daemon.c for enabling a process to become a daemon; Exception.c for exception handling in C++ programs; and, RMlog.c for facilitating RM logging. In addition custom ESQL code for RM/database interface is provided which includes the ESQC C interface (Informix) stored procedures for performing the ARD, DRD, DUR, URS, GRD, CRD, and GPL messages. The functions call the stored procedures according to the message, and the response is build inside the functions depending on the returned values of the stored procedures. A mainsql.c program provides the ESQL C interface for messages from the report manager and report viewer.

A list of Report Manager and Inbox proxy error messages can be found in Appendix E.

Outgoing (server-to-client) communications follow the reverse route, i.e., the proxies will feed responses to the decode/dispatch server, which will encrypt the client-bound messages and communicate them to the DMZ Web servers over the socket connection. The Web servers will forward the information to the client using SSL. The logical message format returned to the client from the middle tier service is shown as follows:

|| TCP/IP || encryption || http || web response || dispatcher response || proxy-specific response || where || separates a logical protocol level, and protocols nested from left to right.

The foregoing merely illustrates the principles of the present invention. Those skilled in the art will be able to devise various modifications, which although not explicitly described or shown herein, embody the principles of the invention and are thus within its spirit and scope.

What is claimed is:

1. A Web/Internet based reporting system for providing timely delivery of a customer's priced telecommunications call detail data to a client workstation running a web browser application, said system comprising:

a data warehousing infrastructure comprising:
process for generating a current customer list on a daily basis comprising customers entitled to receive daily telecommunications call detail data;
device for receiving customer's raw telecommunications call detail data records from one or more telecommunications network switch mechanisms, and extracting certain call detail records for predetermined customers;
harvest device for receiving said extracted call detail data records and replacing a call detail data item therein with a corresponding dimension key found in an associated dimension build table for that call detail item; and,
device for generating an output fact table comprising customer records having unique key structures for enabling consolidated storage of specific customer call detail data;
at least one secure server for managing client sessions over the Internet, the secure server supporting secure communication of customer request messages between the browser application client and the secure server; and,
device for receiving said customer requests from said secure server and generating corresponding database queries implementing said dimension keys for application against said output fact table to obtain a specific call customer's call detail data, said call detail data being transmitted back to said client web browser via said secure server;

whereby expedient and updated web/Internet-based access to said customer's daily call detail data is assured.

2. The system as claimed in claim 1, wherein said dimension build tables are continuously generated and updated with key structures for each extracted telecommunications call detail data record having a call detail item in which no associating match is found.

3. The system as claimed in claim 1, wherein said harvest device applies look-ups to each of said one or more dimension build tables having said unique dimension keys, said harvest device further replacing a call detail data item therein with a corresponding key structure when a match is found.

4. The system as claimed in claim 2, wherein a dimension table includes a dimension key associated with a particular billing/customer, said system further comprising process for updating said billing/customer dimension table prior to inputting a received modified call detail record to said harvest device.

5. The system as claimed in claim 3, wherein said updating of said billing/customer dimension includes process for comparing said current customer list with a customer list from a prior point in time, wherein new customers in said current daily list is added to said billing/customer dimension build table.

6. The system as claimed in claim 3, further including a device for organizing said fact table and dimension tables in one or more operational data storage devices, said operational data storage devices comprising a database server for facilitating expedient retrieval of customer's daily call detail data upon received customer requests.

7. The system as claimed in claim 3, further including a tranlation process for converting call detail data in said fact table from a first character format to a second character format, and transferring said fact table data to said operational data storage devices via ftp protocol.

8. The system as claimed in claim 1, wherein said output fact table and said dimension build tables are organized according to a star schema structure.

9. The system as claimed in claim 2, wherein said dimension build tables include dimension keys associated with a particular calling area.

10. The system as claimed in claim 5, further including dispatch server for communicating with said secure server through a firewall over a second socket connection, the first and second secure sockets forming a secure communications link, said dispatch server enabling forwarding of a report request message and an associated report response message comprising requested call detail data back to the client browser over the secure communications link.

11. The system as claimed in claim 9, further including a report manager server for maintaining an inventory of priced call detail reporting items associated with a customer and managing the reporting of daily call-detail data information in accordance with a customer request message, the report manager initiating access to said customer daily call detail data from said operational data stores.

12. The system as claimed in claim 5, wherein said data warehousing infrastructure further includes process for totaling each customer's daily call detail data for a predetermined period of time.

13. The system as claimed in claim 12, further including process for verifying data harvesting and database load totals.

14. The system as claimed in claim 12, wherein said data warehousing infrastructure is further capable of providing output fact table associated with customer's monthly call detail data that has been repriced, said system further including process for reconciling a customer's daily call detail data totals in said operational data storage device with that customer's repriced monthly call detail data.

15. The system as claimed in claim 14, wherein said reconciling process includes process for fragmenting blocks of call detail data included in said operational data storage devices with repriced monthly call detail data.

16. A method for providing timely delivery of a customer's priced telecommunications call detail data to a client workstation running a web browser application comprising the steps of:

generating a current customer list on a daily basis comprising customers entitled to receive daily telecommunications call detail data;

receiving customer's daily raw telecommunications call detail data records from one or more telecommunications network switch mechanisms, and extracting those call detail data records for only those customers entitled to receive said call detail data;

receiving said extracted call detail data records and replacing one or more call detail data items therein with a corresponding dimension key found in a dimension build table associated with said call detail item; and, generating an output fact table comprising customer records having said unique key structures for enabling consolidated storage of specific customer call detail data;

implementing a secure server to manage client sessions over the Internet, the secure server supporting secure communication of customer request messages between the browser application client and the secure server; and, receiving said customer requests from said secure server and generating corresponding database queries implementing said dimension keys for application against said output fact table to obtain a specific customer's call detail data, said call detail data being transmitted back to said client web browser via said secure server, whereby expedient and updated web/Internet-based access to said customer's daily call detail data is assured.

17. The method as claimed in claim 16, wherein said step of replacing a call detail data item therein with a corresponding dimension key includes implementing a dimension table look-up of the call detail item for a key structure corresponding to said call detail item and replacing said key in said record when a match is found.

18. The method as claimed in claim 17, wherein said step of replacing said call detail item with said corresponding dimension key further includes the step of generating a new key to replace said call detail item and providing said new key to said dimension build table when no match is found.

19. The method as claimed in claim 18, wherein a dimension table includes a dimension key associated with a particular billing/customer, said method further updating said billing/customer dimension table prior to inputting a received modified call detail record to a harvest device.

20. The method as claimed in claim 19, wherein said step of updating said billing/customer dimension includes comparing said current daily customer list with a customer list from an immediate prior day, wherein new customers in said current daily list is added to said billing/customer dimension build table.

21. The method as claimed in claim 20, wherein said output fact table is capable of being loaded into storage/ retrieval devices, said method further including the step of organizing said fact table and dimension tables in one or more operational data storage devices, said operational data storage devices comprising a database server for retrieving customer's daily call detail data upon received customer requests.

22. The method as claimed in claim 21, further including the step of converting call detail data in said fact table from a first character format to a second character format, and transferring said fact table data to said operational data storage devices via ftp protocol.

23. The method as claimed in claim 21, wherein said fact table and dimension tables are organized according to a star schema structure.

24. The method as claimed in claim 23, wherein a dimension table includes dimension keys associated with a particular calling location.

25. The method as claimed in claim 24, further including the step of forwarding a report request message and an associated report response message containing requested call detail data back to the client browser over a secure communications link.

26. The method as claimed in claim 25, further including maintaining an inventory of priced call detail reporting items associated with a customer and managing the reporting of daily call-detail data information in accordance with a customer request message, and initiating access to said customer daily call detail data stored in said operational data stores.

27. The method as claimed in claim 26, further including the step of totaling one or more call detail data item values for a predetermined period of time.

28. The method as claimed in claim 26, further providing an output fact table associated with customer's monthly call detail data that has been repriced, said method further including reconciling a customer's daily call detail item value totals in said operational data storage device with that customer's repriced monthly call detail data.

29. The method as claimed in claim 28, wherein said reconciling step includes fragmenting blocks of call detail data included in said operational data storage devices with repriced monthly call detail data.

30. The method as claimed in claim 26, further including interfacing with a report manager server for retrieving the customer-specific data from the operational data stores in accordance with a customer identity and report name.

31. The method as claimed in claim 26, further including generating a report utilizing the retrieved data and the metadata description of call detail reporting items.

32. A Web/Internet based reporting system for providing timely delivery of a customer's priced telecommunications call detail data to a client workstation running a web browser application, said system comprising:
- a data warehousing infrastructure comprising:
    - a traffic component to receive raw telecommunications call detail records from one or more telecommunications switches and to sort the call detail records into billing detail records;
    - a billing system to perform pricing in connection with one or more billing detail records;
    - an extraction component to extract selected customer billing detail records;
    - a harvesting component to transform the selected billing detail records based on a set of business rules into transformed billing detail records;
    - a data store component to store the transformed billing detail records into one or more data marts;
- at least one secure server for managing client sessions over the Internet, the secure server supporting secure communication of customer requests between the browser application client and the secure server; and,
- a device for receiving the customer requests from the secure server and generating corresponding database queries to obtain a specific customer's call detail data, the call detail data being transmitted back to said client web browser via the secure server.

33. The system of claim 32 wherein the traffic component comprises a module to convert the raw telecommunications call detail records into a format that is readable by a mainframe.

34. The system of claim 32 wherein the traffic component comprises a module to determine if records are billable and drops unbillable records.

35. The system of claim 32 wherein the extraction component comprises a file transfer protocol pull of a list of selected customers.

36. The system of claim 32 wherein the set of business rules for transforming the selected customer billing detail records comprises a star schema data model which incorporates a central fact table and a plurality of referenced dimension tables.

37. The system of claim 32 wherein the data warehousing infrastructure comprises a component to provide incremental, daily updates to the transformed billing detail records stored in the one or more data marts.

* * * * *